US012703778B2

(12) United States Patent
Fu et al.

(10) Patent No.: US 12,703,778 B2
(45) **Date of Patent: *Aug. 11, 2026**

(54) MULTI-MATERIAL SHEATHING SYSTEM WITH SUSTAINED THERMAL INSULATION PERFORMANCE

(71) Applicant: Owens Corning Intellectual Capital, LLC, Toledo, OH (US)

(72) Inventors: Hai Fu, Pataskala, OH (US); Shu Situ-Loewenstein, Lake Elmo, MN (US); Xiaomin Guo, New Albany, OH (US); Chase Boudreaux, Canton, OH (US); Jeff Thomas, Mogadore, OH (US); Mitchell Weekley, Tallmadge, OH (US); Christine Heppe, Norton, OH (US); Laura Frazier, Kent, OH (US); Ty Rogers, Akron, OH (US); Saul Salgado, Tallmadge, OH (US)

(73) Assignee: Owens Corning Intellectual Capital, LLC, Toledo, OH (US)

( * ) Notice: Subject to any disclaimer, the term of this patent is extended or adjusted under 35 U.S.C. 154(b) by 30 days.

This patent is subject to a terminal disclaimer.

(21) Appl. No.: 18/452,160

(22) Filed: Aug. 18, 2023

(65) Prior Publication Data

US 2024/0059856 A1 Feb. 22, 2024

Related U.S. Application Data

(60) Provisional application No. 63/510,815, filed on Jun. 28, 2023, provisional application No. 63/492,391,
(Continued)

(51) Int. Cl.
*C08J 9/36* (2006.01)
*B32B 5/18* (2006.01)
(Continued)

(52) U.S. Cl.
CPC ................ *C08J 9/365* (2013.01); *B32B 5/18* (2013.01); *B32B 27/065* (2013.01); *C08J 9/122* (2013.01);
(Continued)

(58) Field of Classification Search
CPC ... C08J 9/365; C08J 9/122; C08J 9/127; C08J 9/142; C08J 9/147; C08J 2203/06;
(Continued)

(56) References Cited

U.S. PATENT DOCUMENTS 4,786,547 A 11/1988 St-Michel
5,304,590 A * 4/1994 Merz .................. C08K 5/0016 521/64
(Continued)

FOREIGN PATENT DOCUMENTS

CA 2370863 A1 11/2000
CA 2572395 A1 1/2006
(Continued)

OTHER PUBLICATIONS

International Search Report and Written Opinion received for PCT Patent Application No. PCT/US2023/072502, mailed on Nov. 17, 2023, 7 pages.
(Continued)

*Primary Examiner* — Travis M Figg
(74) *Attorney, Agent, or Firm* — Calfee, Halter & Griswold LLP

(57) ABSTRACT

A sheathing system that envelops a building structure is provided, combining lightweight structural layers and a high R-value insulation layer. The insulation layer includes a coated insulation product with a reduced fluorinated blowing agent concentration, while maintaining acceptable thermal properties. The coated insulation product includes a foam product that is coated with a barrier coating. The barrier
(Continued)

coating includes a polymer having a minimum degree of crystallinity and at least one additive. The collective layers of the sheathing system offer the benefits of decreased thickness, reduced weight, improved thermal insulation, improved structural strength, improved nailability, improved fire performance, and enhanced energy efficiency.

41 Claims, 34 Drawing Sheets

Related U.S. Application Data filed on Mar. 27, 2023, provisional application No. 63/385,158, filed on Nov. 28, 2022, provisional application No. 63/383,689, filed on Nov. 14, 2022, provisional application No. 63/399,546, filed on Aug. 19, 2022.

(51) Int. Cl.
*B32B 27/06* (2006.01)
*C08J 9/12* (2006.01)
*C08J 9/14* (2006.01)
*C09D 109/06* (2006.01)
*C09D 127/08* (2006.01)
*C09D 129/04* (2006.01)
*E04C 2/296* (2006.01)

(52) U.S. Cl.
CPC ............... *C08J 9/127* (2013.01); *C08J 9/142* (2013.01); *C08J 9/147* (2013.01); *C09D 109/06* (2013.01); *C09D 127/08* (2013.01); *C09D 129/04* (2013.01); *E04C 2/296* (2013.01); *B32B 2250/03* (2013.01); *B32B 2255/102* (2013.01); *B32B 2255/26* (2013.01); *B32B 2264/108* (2013.01); *B32B 2266/0228* (2013.01); *B32B 2266/06* (2013.01); *B32B 2307/304* (2013.01); *B32B 2307/3065* (2013.01); *B32B 2307/54* (2013.01); *B32B 2307/7376* (2023.05); *B32B 2607/00* (2013.01); *C08J 2203/06* (2013.01); *C08J 2203/12* (2013.01); *C08J 2203/162* (2013.01); *C08J 2203/202* (2013.01); *C08J 2325/06* (2013.01)

(58) Field of Classification Search
CPC .............. C08J 2203/12; C08J 2203/162; C08J 2203/202; C08J 2325/06; B32B 5/18; B32B 27/065; B32B 2307/7376; B32B 2250/03; B32B 2255/102; B32B 2255/26; B32B 2264/108; B32B 2266/0228; B32B 2266/06; B32B 2307/304; B32B 2307/3065; B32B 2307/54; B32B 2607/00; C09D 109/06; C09D 127/08; C09D 129/04; E04C 2/296
See application file for complete search history.

(56) References Cited

U.S. PATENT DOCUMENTS 5,462,794 A * 10/1995 Lindemann ........... B29C 44/507
428/317.1
5,810,961 A * 9/1998 Andersen .................. B32B 9/00
264/282
6,083,586 A * 7/2000 Andersen ................ C04B 26/02
106/206.1
6,637,213 B2 10/2003 Hutchison et al.
6,637,497 B2 10/2003 Herron
6,708,504 B2 3/2004 Brandt et al.
7,017,352 B2 3/2006 Hutchison et al.
7,488,530 B2 2/2009 Curtis et al.
7,658,040 B2 2/2010 Bennett et al.
7,677,002 B2 3/2010 Bennett et al.
7,765,756 B2 8/2010 Bontrager, II
7,870,694 B2 1/2011 Bennett et al.
7,895,796 B2 3/2011 Baldock et al.
8,088,477 B2 1/2012 Curtis et al.
8,112,950 B2 2/2012 Bennett et al.
8,112,966 B2 2/2012 Bowe et al.
8,287,997 B2 10/2012 Paradis et al.
8,397,465 B2 3/2013 Hansbro et al.
8,470,436 B1 6/2013 Paradis et al.
8,474,197 B2 7/2013 Bennett et al.
8,475,700 B2 7/2013 O'Brien et al.
8,590,267 B2 11/2013 Jaffee
8,597,779 B2 12/2013 Paradis et al.
8,950,137 B2 2/2015 Ciuperca
8,966,845 B1 3/2015 Ciuperca
9,010,044 B2 4/2015 Bennett et al.
9,315,663 B2 4/2016 Appleby et al.
9,382,713 B2 7/2016 Bennett et al.
9,409,347 B2 8/2016 Nelson et al.
9,476,202 B2 10/2016 Clancy et al.
9,528,260 B2 12/2016 Daems et al.
9,546,479 B2 1/2017 Bennett et al.
9,752,326 B2 9/2017 Kraus, Jr. et al.
9,869,089 B2 1/2018 Thomas et al.
9,909,317 B2 3/2018 Johnson et al.
10,072,415 B2 9/2018 Bennett et al.
10,087,634 B2 10/2018 Johnson et al.
10,167,629 B2 1/2019 Ciuperca
10,316,515 B2 6/2019 Budinscak, Jr. et al.
10,357,906 B2 7/2019 Johnson, Sr.
10,414,074 B2 9/2019 Luukko et al.
10,415,245 B2 9/2019 Bennett et al.
10,570,616 B2 2/2020 Sealock et al.
10,711,453 B1 7/2020 Jordan et al.
11,225,790 B1 * 1/2022 Lambach ................ B32B 15/18
2003/0033775 A1 * 2/2003 Nordgren .................. B32B 7/12
52/309.8
2003/0041544 A1 * 3/2003 Rusek, Jr. ............... E04C 2/246
52/481.1
2003/0180344 A1 * 9/2003 Wise ....................... A61L 27/58
424/423
2004/0048689 A1 * 3/2004 Nesbitt .............. A63B 37/0003
473/367
2004/0148965 A1 8/2004 Hutchison et al.
2004/0157945 A1 * 8/2004 Barber ............... C08G 18/6637
521/155
2004/0162359 A1 * 8/2004 Barber ............... C08G 18/4219
521/159
2006/0010884 A1 1/2006 Hutchison et al.
2006/0012066 A1 1/2006 Hutchison et al.
2006/0051595 A1 3/2006 Gaudeus et al.
2006/0096205 A1 5/2006 Griffin et al.
2006/0111513 A1 * 5/2006 Slansky ................ F25D 23/066
428/521
2007/0045886 A1 3/2007 Johnson
2007/0062419 A1 3/2007 Stevens
2007/0141316 A1 6/2007 McGrath et al.
2007/0208094 A1 * 9/2007 Handa ...................... C08J 9/142
521/79
2007/0222105 A1 9/2007 Brown
2007/0222106 A1 9/2007 Brown
2008/0120932 A1 5/2008 Paradis
2009/0098357 A1 * 4/2009 Bergtold ................... B32B 7/02
428/218
2009/0113831 A1 * 5/2009 DeWildt ................... B32B 5/20
52/309.4
2009/0178355 A1 7/2009 Pugh et al.
2009/0220717 A1 9/2009 Wilczak et al.
2009/0295021 A1 12/2009 Brown
2009/0305008 A1 12/2009 Nichols et al.
2010/0160470 A1 * 6/2010 Smiecinski ........ C08G 18/4072
521/137
2010/0160473 A1 * 6/2010 Neff .................. C08G 18/4072
521/159

(56) References Cited

U.S. PATENT DOCUMENTS

2010/0210745 A1* 8/2010 McDaniel ................ C09D 7/48 521/55
2010/0296361 A1 11/2010 Brown
2011/0094175 A1* 4/2011 Groft .................. E04D 13/1625 52/302.1
2011/0240064 A1* 10/2011 Wales ...................... C09D 7/65 428/116
2011/0250626 A1* 10/2011 Williams ................. C12Q 1/34 106/4
2012/0073228 A1 3/2012 Fork et al.
2012/0097194 A1* 4/2012 McDaniel .............. A01N 63/50 435/197
2015/0298400 A1 10/2015 Maliszewski et al.
2016/0046779 A1* 2/2016 Neff ....................... C08J 9/0038 521/107
2016/0067949 A1 3/2016 Peltola
2016/0273221 A1 9/2016 Ciuperca
2016/0361894 A1* 12/2016 Ciuperca ................... E04B 1/80
2017/0050395 A1 2/2017 Vos et al.
2017/0051502 A1 2/2017 Wolf et al.
2017/0241135 A1 8/2017 Budinscak, Jr. et al.
2017/0355893 A1* 12/2017 Ling ...................... C11D 7/264
2017/0368785 A1* 12/2017 Fox ......................... B32B 3/085
2018/0016781 A1* 1/2018 Fox ........................... E04B 1/10
2018/0147776 A1 5/2018 Kotani
2018/0311931 A1 11/2018 Wodzinski et al.
2019/0091968 A1* 3/2019 Nandi ................. E04D 13/1643
2019/0092917 A1* 3/2019 Nandi ................ C08G 18/4202
2019/0144627 A1* 5/2019 Treat ........................ C08J 3/201 521/91
2019/0153726 A1 5/2019 Miks et al.
2019/0264440 A1 8/2019 Grant et al.
2019/0344531 A1 11/2019 Baldwin et al.
2020/0147930 A1 5/2020 Shake et al.
2020/0173165 A1* 6/2020 Nandi ....................... B32B 5/18
2020/0284749 A1* 9/2020 Nicholas ................ B41M 3/006
2020/0340237 A1* 10/2020 Jordan .................. B32B 27/302
2021/0115184 A1 4/2021 Diloreto
2021/0189083 A1 6/2021 Joncheray et al.
2021/0396010 A1* 12/2021 Rudisill .................. E04B 2/707
2022/0049489 A1* 2/2022 Espada ..................... B32B 5/20
2023/0405979 A1 12/2023 Rofrano et al.
2024/0059052 A1* 2/2024 Fu ........................... B32B 33/00
2024/0060303 A1 2/2024 Fu et al.
2024/0327593 A1 10/2024 Boudreaux et al.
2024/0327594 A1 10/2024 Boudreaux et al.

FOREIGN PATENT DOCUMENTS

CA 2852270 A1 11/2014
CA 2892291 A1 11/2016
CA 2904667 C 3/2021
EP 1622990 B1 10/2007
EP 3794062 A1 3/2021
JP 2002138109 A 5/2002
WO 9921712 A1 5/1999
WO 2019/056117 A1 3/2019

OTHER PUBLICATIONS

Invitation to Pay Additional Fees received for PCT Patent Application No. PCT/US2023/072505, mailed on Nov. 15, 2023, 4 pages.
Invitation to Pay Additional Fees received for PCT Patent Application No. PCT/US2023/072506, mailed on Dec. 8, 2023, 4 pages.
Office Action from U.S. Appl. No. 18/452,148 dated May 30, 2025.
Office Action from U.S. Appl. No. 18/452,148 dated Jan. 26, 2026.
Office Action from U.S. Appl. No. 18/452,148 dated Aug. 26, 2025.
Office Action from U.S. Appl. No. 18/452,210 dated Oct. 22, 2025.
Maes et al., "Recent Updates on the Barrier Properties of Ethylene Vinyl Alcohol Copolymer (EVOH): A Review," Polymer Reviews, 2018, vol. 58, No. 2, 209-246.
Office Action from U.S. Appl. No. 18/452,148 dated May 28, 2026.
Extended European Search Report from EP Application No. 23855725.0 dated Jun. 9, 2026.

* cited by examiner 4.
302
302
300
302
308
306
304

4.
300
308
306
304
319
318
317
316
315
314

MULTI-MATERIAL SHEATHING SYSTEM WITH SUSTAINED THERMAL INSULATION PERFORMANCE

CROSS-REFERENCE TO RELATED APPLICATIONS

This application claims priority to U.S. Provisional Application Ser. No. 63/510,815, filed on Jun. 28, 2023; U.S. Provisional Application Ser. No. 63/492,391, filed on Mar. 27, 2023; U.S. Provisional Application Ser. No. 63/385,158, filed on Nov. 28, 2022; U.S. Provisional Application Ser. No. 63/383,689, filed on Nov. 14, 2022; and U.S. Provisional Application Ser. No. 63/399,546, filed on Aug. 19, 2022, the entire contents of each being incorporated by reference herein.

TECHNICAL FIELD

Aspects hereof relate to a building product, and more specifically a sheathing system for use in building construction. The sheathing system comprises layered panels having both structural and insulative properties.

BACKGROUND

In contemporary building construction, wall sheathing systems are employed to provide structural support, insulation, and protection against external environmental factors. Conventional wall sheathing materials, such as plywood and oriented strand board (OSB), have been widely used and are typically seen as capable of providing structural support or rigidity to a structure; however, these materials generally lack sufficient thermal insulation properties. Among other shortcomings, the inadequate insulating properties of conventional wall sheathing translates into greater energy expenditures required to maintain the temperature and humidity levels of conditioned spaces.

To address the insulation challenge, conventional practice involves the application of separate insulation layers in conjunction with conventional wall sheathing materials. While this approach can enhance energy efficiency, it adds complexity to the construction process and increases material and labor costs. In addition to its limited ability to insulate, conventional wall sheathing materials are also susceptible to moisture infiltration and degradation over time, which can compromise both the structural integrity and thermal performance of the building envelope. To address the moisture problem, conventional building practices call for wrapping sheathing with a water-resistant wrap. Applying wrap is a labor intensive task, however, which can increase labor and material costs. Moreover, wraps are generally susceptible to being displaced during construction and can lead to trapped moisture between the wrap and sheathing.

As one of ordinary skill in the art may appreciate, the insulation layer in conventional wall sheathing systems can include a variety of materials, including polymer foams. Polymer foams, such as extruded polymer foams or "XPS" foam, are generally manufactured by melting a polymer matrix composition to form a polymer melt and incorporating one or more blowing agents and other additives into the polymer melt under conditions that provide for the thorough mixing of the blowing agent and the polymer. The incorporation of blowing agents and additives to the polymer melt facilitates proper mixing while preventing the mixture from foaming prematurely. This mixture is then typically extruded through a single or multi-stage extrusion die to cool and reduce the pressure on the mixture, allowing the mixture to foam and produce a foamed product. As will be appreciated, the relative quantities of the polymer(s), blowing agent(s), and additives; the temperature; and the manner in which the pressure is reduced will impact the quality of the resulting foam product. As will also be appreciated, the foamable mixture is maintained under a relatively high pressure until it passes through an extrusion die and is allowed to expand in a region of reduced pressure.

The solubility of conventional blowing agents, such as chlorofluorocarbons ("CFCs") and certain alkanes, in a polymer melt tends to reduce the melt viscosity and improve cooling of expanded polymer melts. For example, the combination of pentane and a CFC, such as Freon 11 or 12 is partially soluble in polystyrene and has been used for generating polystyrene foams that exhibited a generally acceptable appearance and physical properties such as surface finish, cell size and distribution, orientation, shrinkage, insulation property (R-value), and stiffness.

However, in response to the environmental concerns regarding the use of such CFC compounds, the widespread use and accompanying atmospheric release of such compounds in applications, such as aerosol propellants, refrigerants, foam-blowing agents and specialty solvents, has been drastically reduced or eliminated by government regulation. The divergence away from the use of CFCs has led to utilization of alternative blowing agents, such as hydrogen-containing chlorofluoroalkanes ("HCFCs"). HCFCs, however, still contain some chlorine and are therefore said to have an ozone depletion potential ("ODP").

Another class of blowing agents, hydrofluorocarbons (HFC's), have been used as more ozone friendly options, offering desirable improvements, such as zero ODP and lower (but still potentially significant) global warming potential (GWP). However, these compounds are expensive, tend to be less soluble in polystyrene, and can still have significant GWP. For example, HFC-134a has a GWP of 1430.

Hydrofluoroolefin ("HFO") blowing agents, which are a type of fluorinated alkene, are more environmentally friendly than traditional halogenated blowing agents ((e.g. cis and/or trans)-1,1,1,4,4,4-hexafluoro-2-butene (HFO-1336mzz) and (cis and/or trans)-1,3,3,3 -tetrafluoropropene (HFO-1234ze)). For example, HFOs have reduced ODP and GWP values when compared to traditional fluorocarbon and hydrofluorocarbon blowing agents. However, these compounds tend to be expensive and there exists a need to minimize the amount of these compounds that is required to produce a polymer insulation layers with desirable physical properties.

Carbon dioxide is a particularly attractive candidate as a blowing agent, from both an environmental and economic standpoint. Carbon dioxide is inexpensive and has a low (negligible) global warming potential. However, the technical challenges that have thus far been associated with successfully using carbon dioxide as a blowing agent are significant. Technical problems such as the relatively low solubility, high diffusivity, and poor processability of carbon dioxide in polystyrene resins remain a challenge. Further, carbon dioxide does not contribute to thermal insulation performance. Thus, although the thermal conductivity of carbon dioxide is comparable to that of HFC-134a, it has previously been found to rapidly diffuse out of foam, which results in a lowered insulation or "R-value."

Accordingly, there exists a need for a sheathing system that incorporates foam insulation products formed with environmentally friendly blowing agents, including those foamed insulation products formed with reduced or eliminated usage of halogenated blowing agents, while having superior insulative properties.

BRIEF SUMMARY

The present disclosure is directed to a high strength but lightweight multi-material sheathing system that, when utilized to envelope at least a portion of a building structure, provides enhanced thermal insulation and weather resistant properties. The disclosed wall sheathing system combines lightweight structural layers and a high R-value insulation layer to provide a unique solution. Embodiments of the present disclosure relate to a sheathing system that utilizes one or more thin layers of strong yet lightweight material, combined with a high R-value insulation layer. The collective layers of the sheathing system offer the benefits of decreased thickness, reduced weight, improved thermal insulation, improved structural strength, improved nail ability, improved fire and smoke performance, and enhanced energy efficiency. All aspects of the disclosed sheathing system can contribute to the overall improved performance and sustainability of a building structure.

In accordance with aspects herein disclosed, a sheathing system is provided that includes one or more structural layers and an insulation layer. The structural layer comprises a polycarbonate material and has a first surface and an opposing second surface. In an exemplary aspect, the structural layer is substantially bulk water resistant and substantially water vapor permeable. The insulation layer comprises an extruded polystyrene and has a third surface and an opposite fourth surface. The third surface of the insulation layer is secured to the second surface of the structural layer. In some further aspects, the sheathing system also comprises an additional structural layer comprising the polycarbonate material and having a fifth surface and an opposing sixth surface. The fifth surface of the additional structural layer can be at least partially secured to the fourth surface of the insulation layer.

In accordance with the disclosed aspects, the sheathing system weighs less than conventional systems with a weight between 10 to 45 pounds, has a thickness of no greater of 1.5 inches, preferably a thickness no greater than one inch, and has an R-value of at least 3.5, preferably an R-value of at least 4.5. Thus, the disclosed sheathing system is superior to conventional systems, which are generally heavier, thicker, and have a lower R-value.

In accordance with further disclosed aspects, the insulation layer can comprise a coated insulation product formed with a low global warming potential ("GWP") blowing agent composition (e.g., having a reduced fluorinated blowing agent concentration) and having a 180-day R-value per inch of total thickness ("R/in") value of at least 4.8. The coated insulation product includes a foam product having a first major surface, an opposing second major surface, and a plurality of minor surfaces extending there between. The foam product is formed from a foamable composition comprising a matrix composition, and a blowing agent composition having less than 3.5 wt. % of a fluorinated alkene, based on a total weight of the foamable composition. The foam product is coated with a barrier coating composition on at least one surface between 3 $g/m^2$ and 225 $g/m^2$. The barrier coating composition includes 40 wt. % to 99.9 wt. % of a barrier polymer having a minimum degree of crystallinity of 10%, and 0.1 wt. % to 20 wt. % of at least one additive. The barrier coating composition, as applied, has a surface tension no greater than 40 mN/m.

Additional disclosed aspects are directed to a coated polymeric insulation layer comprising a polymer foam product. The polymer foam product has a foamable polymer composition comprising a polymer matrix composition and a blowing agent composition, the blowing agent composition comprising 3 wt. % or less of a fluorinated alkene and at least 1.5 wt. % $CO_2$, based on a total weight of the foamable composition. The foam product is coated on at least one surface. For example, each surface is coated with a barrier coating composition in a total amount between 3 $g/m^2$ and 225 $g/m^2$. The barrier coating composition comprises a semi-crystalline polymer and at least one surfactant and, as applied, has a surface tension no greater than 10 mN/m above a surface energy of the polymer foam product and a viscosity between 50 cP and 175 cP at 30% solids or less. The coated insulation layer has a 180-day R/in value of at least 4.8 and a compressive strength between 10 and 110 psi, measured in accordance with ASTM C578. In some exemplary aspects, the coated polymeric insulation layer has an R-value after 180 days of at least 5.0 per inch.

In any of the exemplary aspects, the blowing agent composition can comprise at least 2 wt. % of $CO_2$ and less than 3 wt. % of a fluorinated alkene, based on the total weight of the foamable composition. The blowing agent can further comprise methyl formate.

In any of the exemplary aspects, the barrier coating composition can have a viscosity no greater than 250 cP at 30% solids, such as no greater than 150 cP at 30% solids, and no greater than 115 cP at 30% solids.

The barrier polymer can comprise, for example, any one or more of poly(vinylidene chloride), polyvinyl alcohol, poly(ethylene-co-vinyl alcohol), poly(vinylidene fluoride), polyurethane, styrene butadiene, polyvinyl chloride, poly (acrylates), polyamides, polyesters, polystyrene, polyglycolic acid, poly(ethylene 2,5-furandicarboxylate), poly (butylene succinate), bio-based ethylene, and copolymers thereof.

The barrier polymer is preferably at least semi-crystalline and has a minimum degree of crystallinity of 20%.

The barrier coating composition includes at least one additive, such as a processing aid, wetting agent, rheology modifier, defoaming agent, silicone, polydimethylsiloxane, pH adjuster; UV stabilizer; and hydrophobized silica.

In any of the exemplary aspects, the additive can include a rheology modifier present in an amount between 0.1 and 15 wt. %, based on the total solids content of the barrier coating.

In any of the exemplary aspects, the additive can include at least one wetting agent present in an amount between 0.005 and 8 wt. %, based on the total solids content of the barrier coating.

The present disclosure is also directed to a method of manufacturing a coated insulation layer with reduced fluorinated blowing agent content. A matrix polymer with a blowing agent composition is mixed to form a foamable polymer composition. The foamable polymer composition is then blown to produce a foam product having a first major surface, an opposing second major surface, and a plurality of minor surfaces extending there between. A barrier coating is applied to at least one surface of the foam product in a total amount between 3 $g/m^2$ and 225 $g/m^2$. The barrier coating is formed from a barrier coating composition comprising 40 wt. % to 99.9 wt. % of a barrier polymer based on a total solids content of the barrier coating composition, and 0.1 wt. % to 20 wt. % of at least one additive. The barrier coating composition has a surface tension, as applied, no greater than 40 mN/m, and wherein the coated insulation layer has an 180-day R/in value of at least 4.8.

This summary is provided to introduce and not limit the scope of methods and systems provided hereafter in complete detail.

DESCRIPTION OF THE DRAWINGS

The present invention is described in detail herein with reference to the attached drawing figures, wherein.

DETAILED DESCRIPTION

Figures 1A, 1B:
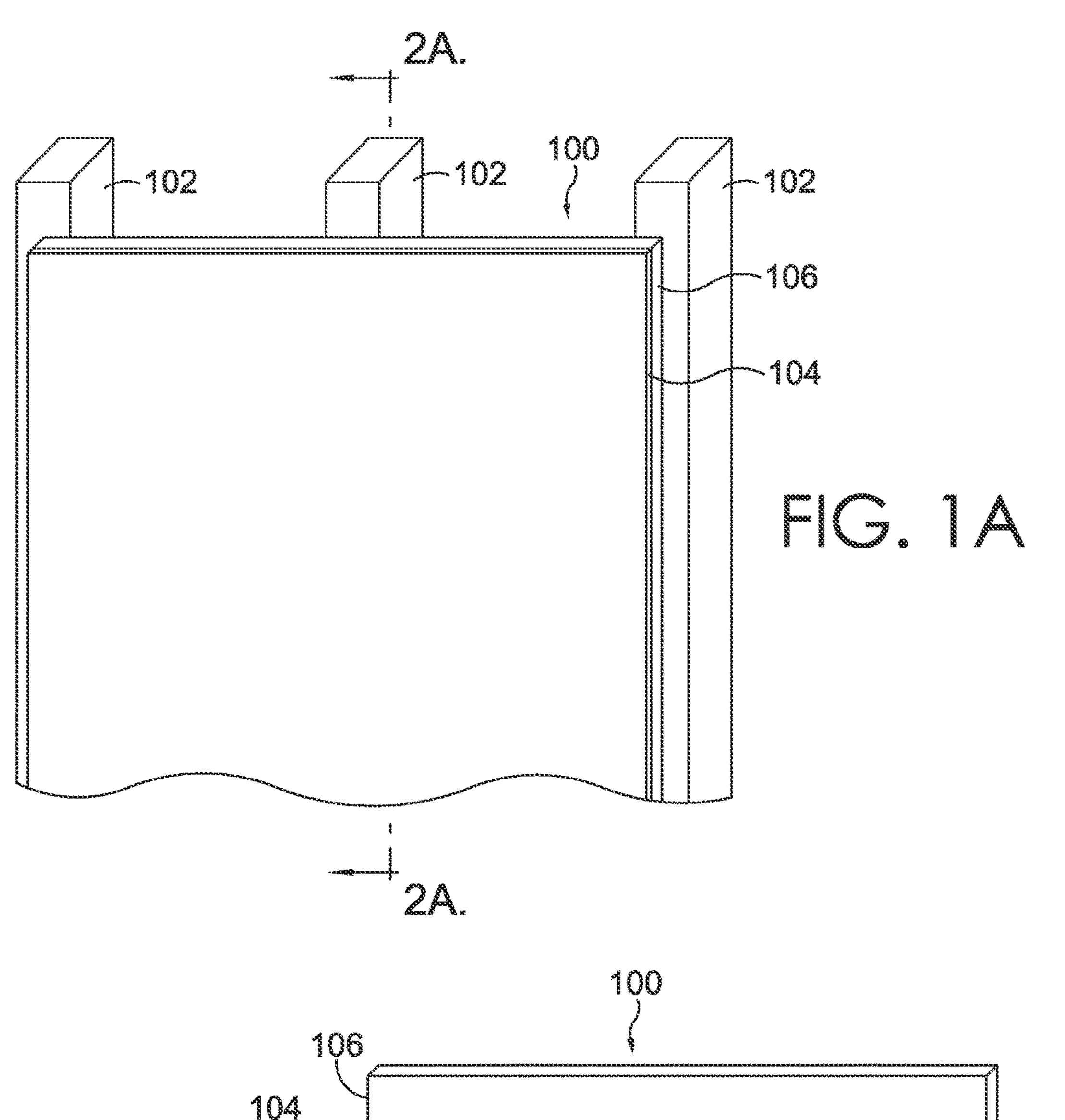
FIG. 1A depicts a perspective view of a three-dimensional sheathing system, in accordance with aspects hereof.
FIG. 1B depicts an exploded view of a three-dimensional sheathing system, in accordance with aspects hereof.

Unless defined otherwise, all technical and scientific terms used herein have the same meaning as commonly understood by one of ordinary skill in the art to which the embodiments belong. Although any methods and materials similar or equivalent to those described herein can be used in the practice or testing of the various embodiments, the preferred methods and materials are described herein. In the drawings, the thickness of the lines, layers, and regions can be exaggerated for clarity. It is to be noted that like numbers found throughout the figures denote like elements.

As used in the specification and the appended claims, the singular forms "a," "an," and "the" are intended to include the plural forms as well, unless the context clearly indicates otherwise.

Unless otherwise indicated, all numbers expressing quantities of ingredients, chemical and molecular properties, reaction conditions, and so forth used in the specification and claims are to be understood as being modified in all instances by the term "about." Accordingly, unless indicated to the contrary, the numerical parameters set forth in the specification and attached claims are approximations that can vary depending upon the desired properties sought to be obtained by the present exemplary embodiments. At the very least, each numerical parameter should be construed in light of the number of significant digits and ordinary rounding approaches.

Unless otherwise indicated, any element, property, feature, or combination of elements, properties, and features, can be used in any embodiment disclosed herein, regardless of whether the element, property, feature, or combination of elements, properties, and features was explicitly disclosed in the embodiment. It will be readily understood that features described in relation to any particular aspect described herein can be applicable to other aspects described herein provided the features are compatible with that aspect.

Every numerical range given throughout this specification and claims will include every narrower numerical range that falls within such broader numerical range, as if such narrower numerical ranges were all expressly written herein.

The term "R-value" is the unit used to measure the effectiveness of thermal insulation and is the reciprocal of thermal conductivity, which for foam board materials having substantially parallel faces, is defined as the rate of flow of thermal energy (BTU/hr. or Watt) per unit area (square foot, i.e. $ft^2$ or square meter, i.e. $m^2$) per degree of temperature difference (Fahrenheit or Kelvin) across the thickness of the slab material (inches or meters). The thermal performance of a polymeric insulation layer is based on the R-value of the insulation layer, which is a measure of the product's resistance to heat flow. The R-value is defined by Equation (1):

$$R=T_I/k$$

where "$T_I$" is the thickness of the insulation layer expressed in inches, "k" is the thermal conductivity of the insulation layer expressed in $BTU \cdot in/hr \cdot ft^2 \cdot ° F.$, and "R" is the R-value of the insulation expressed in $hr \cdot ft^2 \cdot ° F./BTU$.

As used herein, an insulation layer's thickness ($T_I$) can be determined in accordance with ASTM C167-18 and both k-value and area weight (in $lb/ft^2$) can be determined in accordance with ASTM C518-21 or ASTM C177-19.

As used herein, the term "blowing agent" is understood to include physical (e.g., dissolved gaseous agents) or chemical blowing agents (e.g., a gas generated by decomposition). A blowing agent is generally added to a molten polymer, e.g., in an extruder, and under the proper conditions, to initiate foaming to produce a foamed product. The blowing agent expands the resin and forms cells (e.g., open or closed pores). As the resin hardens or cures, foam is produced with either the blowing agent trapped in the cells or ambient air displaces the blowing agent in the cells. The blowing agents discussed herein preferably consist of or comprise environmentally acceptable blowing agents (i.e., "low GWP" blowing agents) as would be recognized by one of ordinary skill in the art. Such low GWP blowing agents have a GWP value of no greater than 500, such as GWP values of no greater than 250, no greater than 200, no greater than 150, no greater than 125, no greater than 100, no greater than 75, no greater than 50, no greater than 25, no greater than 20, no greater than 15, no greater than 10, no greater than 8, no greater than 5, and no greater than 3.

As used herein, unless specified otherwise, the values of the constituents or components of the blowing agent or other compositions are expressed in weight percent or % by weight of each ingredient in the composition.

As it pertains to the present disclosure, "closed cell" refers to a foam having a plurality of cells, at least 95% of which are closed. However, in the present application, cells can be "open cells," closed cells, or a mixture thereof (i.e., certain embodiments disclosed herein can exhibit an "open cell" foam structure or a blend of open cells and closed cells).

The present disclosure relates in part to a foam and foam insulation layers, such as extruded or expanded polymer foams, formed from a composition that contains a foamable material, a blowing agent composition, and a barrier coating or barrier additive that stops or slows the diffusion rate of the blowing agent composition, thereby enabling the use of a lower concentration of conventional halogenated blowing agents, such as hydrofluorocarbons (HFCs), hydrochlorofluorocarbons, hydrofluoroethers, hydrofluoroolefins (HFOs), and hydrochlorofluoroolefins (HCFOs), and replacing this removed amount of halogenated blowing agent with carbon dioxide. The produced foam insulation surprisingly achieves an R-value comparable to that of insulation products not including the subj et barrier coating or additive and including a conventional concentration of fluorinated blowing agent. Accordingly, such foam insulation layers can provide sheathing systems with improved insulation values and maintenance of such insulations values over time.

The following describes select aspects relating to a sheathing system for use in constructing a building structure (e.g., a residential home, a commercial building, an industrial building). The disclosed sheathing system can comprise panels capable of being attached to a frame of a building structure, thereby forming a sheath that envelopes at least a portion of the building structure. The sheath formed by the disclosed sheathing system can correspond to a wall portion (e.g., vertical surface) or a roofing portion of the building structure, by way of example.

The multi-material sheathing system disclosed herein provides for various improvements over conventional sheathing systems. The unique collection of individual layers (also referenced herein as "components") utilized in the production of the disclosed sheathing system provide for a stronger, thinner, and lighter sheathing panel having a higher R-value per inch of total thickness, which offers several advantages over conventional sheathing systems.

The materials used in the novel sheathing system herein provide a thinner structural layer that maintains or exceeds the structural performance of conventional systems. As one of ordinary skill in the art can appreciate, thinner materials generally take up less space within the building envelope, allowing for more efficient utilization of interior space. This can be especially crucial in applications where maximizing usable area is essential, such as in residential homes or commercial buildings. Thinner materials are also generally lighter in weight, which can simplify handling, transportation, and installation. Additionally, the utilization of alternative materials for sheathing systems, as will be described, greatly reduces weight. Reduced weight can also have positive implications for the structural load on the building's foundation and framing. Thin materials provide architects and builders with greater flexibility in designing and implementing various architectural elements, such as curves, angles, and intricate details. This can also lead to faster construction times due to easier handling and installation. The thin materials can subsequently result in reduced labor costs and faster project completion.

The materials utilized and described herein provide an insulated sheathing system with a high R-value or with reduced or eliminated usage of halogenated blowing agents while maintaining sufficient insulation or R-values. The higher the R-value, the more effective insulative characteristics are attributed to the sheathing system. More specifically, a sheathing system with a high R-value generally indicates that the sheathing system is effective at reducing heat flow through walls, roofs, and floors. This translates to lower energy consumption for heating and cooling, lower utility bills and a smaller carbon footprint. High R-value sheathing systems also help maintain more consistent indoor temperatures by reducing drafts, cold spots, and heat loss, further providing occupants with a comfortable living or working environment year-round. As is generally known in the building industry, minimum insulation R-values on external sheathing of a building structure can be required by code. In this regard, conventional sheathing systems can require a builder add insulation after a sheathing panel is affixed to the building structure in order to obtain the adequate R-value, further complicating the construction process and leading to additional resource expenditures.

Turning to FIG. 1A and FIG. 1B, examples of a sheathing system for externally enveloping at least a portion of a building structure are illustrated in accordance with an exemplary aspect hereof. FIG. 1A depicts a sheathing system 100 joined to a building frame structure 102. The sheathing system 100 comprises a structural layer 104 and an insulation layer 106 (i.e., a "2-layer system"). As seen in FIG. 1B, the structural layer 104 comprises a first surface 114 and a second surface 115 opposite the first surface 114. The structural layer 104 can have a thickness measured as a distance from the first surface 114 to the second surface 115 opposite the first layer 114. The insulation layer 106 comprises a third surface 116 and a fourth surface 117 opposite the third surface 116. A thickness of the insulation layer 106 can be measured as a distance from the third surface 116 to the fourth surface 117.

The sheathing system 100 is formed by coupling the second surface 115 of the structural layer 104 to the third surface 116 of the insulation layer 106, wherein the sheathing system 100 has an overall thickness of a distance measured from the first surface 114 to the fourth surface 117. More specifically, the structural layer 104 can be coupled to the insulation layer 106 by bonding, adhering, applying, or mechanically fastening one layer to the other. By way of example, the sheathing system 100 can be formed by applying a glue layer to the second surface 115 of the structural layer 104 or the third surface 116 of the insulation layer 106 and adhering one surface to the other. In some embodiments, the glue layer can have a weight range from about 4.885 $gm/cm^2$ (1 lbs./MSF) to about 244.5 $gm/cm^2$ (50 lbs./MSF). The glue layer can comprise any variety of adhesive, such as a resin (e.g., phenol-formaldehyde, polyvinyl acetate), hot-melt, isocyanate-based adhesive, tar, or other adhesives, by way of non-limiting example.

Figure 2A:
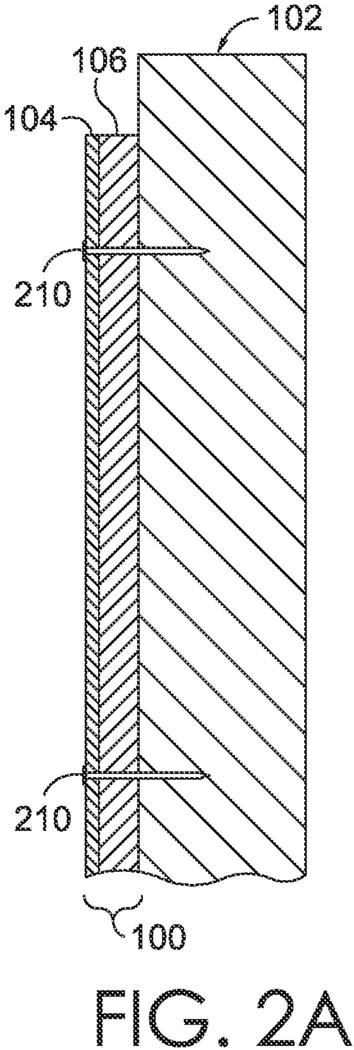
FIG. 2A depicts a cross-sectional view of a three-dimensional sheathing system, in accordance with aspects hereof.
Figure 2B:
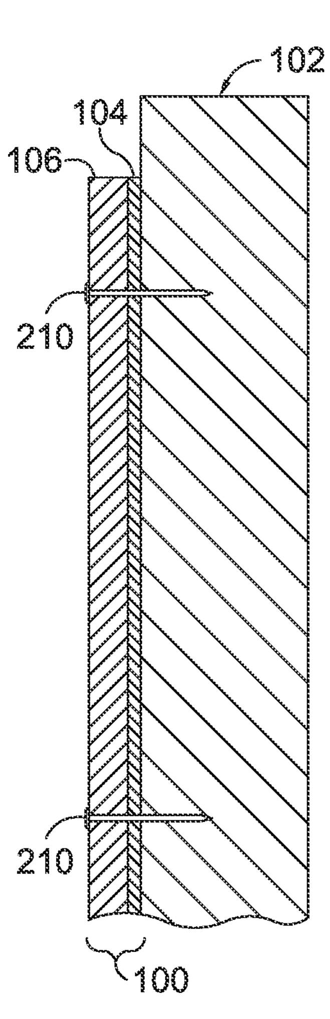
FIG. 2B depicts a cross-sectional view of a three-dimensional sheathing system, in accordance with aspects hereof.

Continuing with FIGS. 2A-2B, different arrangements for coupling the sheathing system 100 to the building frame structure 102 are illustrated. Turning to FIG. 2A, a cross-sectional view of the sheathing system 100 of FIG. 1A, is depicted along a cutline (2A. of FIG. 1A). The configuration shown in FIG. 2A contemplates that the sheathing system 100 has the insulation layer 106 adjacent the building frame structure 102. The configuration shown in FIG. 2B contemplates that the sheathing system 100 has the structural layer 104 adjacent the building frame structure 102. The sheathing system 100 can be fastened to the building frame structure 102 by use of a fastener 210. A fastener 210 can comprise any variety of fastener, such as a nail, screw, bolt, adhesive, anchor, rail molding, cleat, magnet, pegboard, suction, hook and loop, or any other suitable fastener generally known in the art.

Figure 12A:
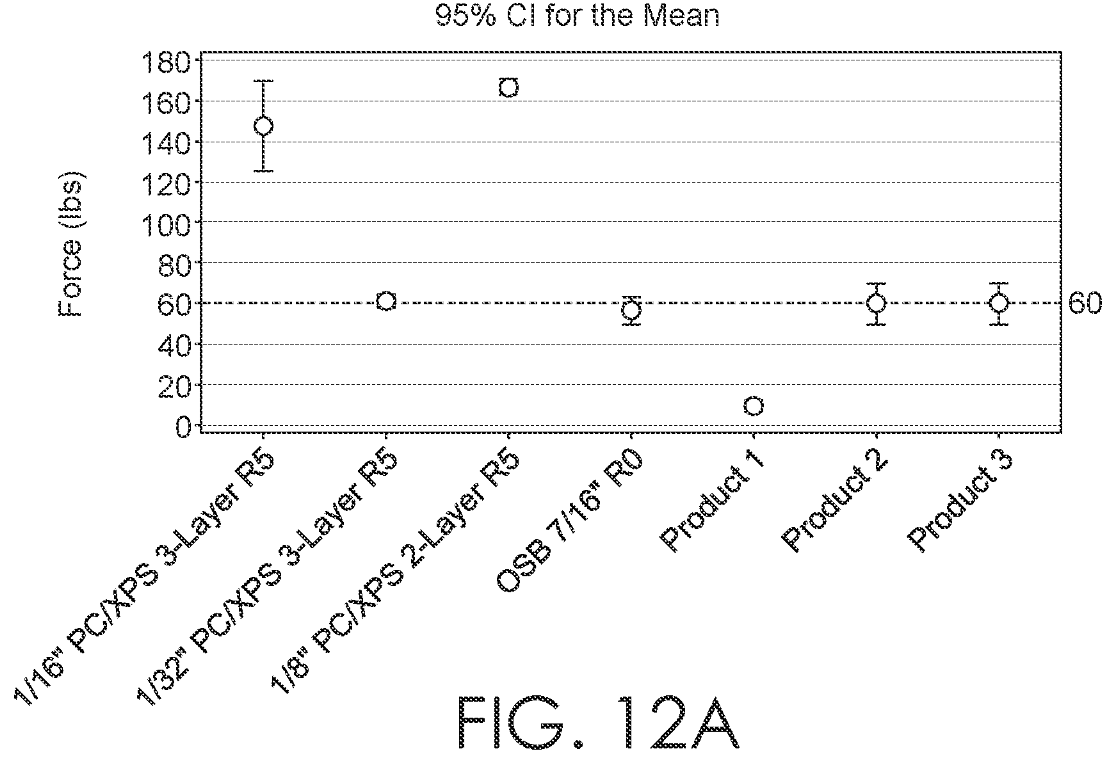
FIG. 12A through FIG. 12G depict exemplary physical data, in accordance with aspects hereof.

The fastener 210 can be used to secure the sheathing system 100 to the building frame structure 102. It is preferable that the sheathing system 100 provides resistance such that the fastener 210 is prevented from being withdrawn from the sheathing system 100. The sheathing system 100 comprises a unique layered panel system with specific materials chosen for each layer. The materials chosen for each layer leads to the sheathing system 100 meeting or exceeding current industry standard sheathing systems with respect to nail withdrawal force. For example, in an exemplary embodiment, the sheathing system 100 can be comprised of a panel having a ⅛ inch thick structural layer 104 comprised of polycarbonate material. The use of a polycarbonate as the structural layer 104 gives the sheathing system 100 an ability to resist nail withdrawal better than industry standard sheathing systems. With brief reference to FIG. 12A, embodiments described herein meet or exceed industry standard products. The 2-layer system shown in FIG. 12A has a thickness of ⅞ inch and a nail withdrawal force of greater than 160 lbs. or 180 lbs. per inch as measured in accordance with ASTM D1037 standards. The 2-layer system is comprised of a polycarbonate structural layer 104 and an insulation layer 106 comprising extruded polystyrene (XPS). In comparison, an industry standard wall sheathing comprised of oriented strand board (OSB) at a thickness of 7/16 inch has a nail withdrawal force of 60 lbs., or 137 lbs. per inch.

Continuing with FIGS. 2A and 2B, different thicknesses of the sheathing system 100 are described and can vary based on its intended use. In implementations where better insulating properties are desirable, the overall thickness of the sheathing system 100 can be greater. For example, the sheathing system 100 can have an R-value of 10 when the overall thickness of the sheathing system 100 is two inches. In implementations where lower insulative properties is acceptable, the sheathing system 100 can have an overall thickness of one inch or less while still preserving an R-value of at least 3.5. One skilled in the art will appreciate that many other thicknesses can be used (e.g., the sheathing system 100 can have an R-value of 7 when the overall thickness is 1.5 inches), though the overall thickness of the sheathing system 100 is preferably in the range of 0.5-2 inches. It is contemplated that values beyond that range for the overall thickness can be used depending on the partner needs of a project. As with conventional sheathing solutions, the R-value of the sheathing system 100 increases with its overall thickness. Accordingly, the sheathing system 100 can have an R-value ranging at least from 3.5 to 10. In various embodiments, the total R-value of the sheathing system 100 can vary depending on the proportion of the insulation layer 106 to the structural layer 104.

As noted above, the proportion of thickness of structural layer 104 to the thickness of insulation layer 106 can vary based on the particular needs of a project. For example, when greater structural strength is desired in areas prone to high winds or seismic forces, one can want to increase the relative structural thickness. In a further example, when greater insulation is desired and strength can be sacrificed, such as in less temperate climates, one can want to increase the relative thickness of the insulation layer 106. In a preferred arrangement, the ratio of insulation layer 106 thickness to structural layer 104 thickness is about 3:1. As an example, a sheathing system 100 having a 3:1 ratio and an overall thickness of 1 inch would have ¼ inch structural layer 104 and ¾ inch insulation layer 106. In other exemplary embodiments, the ratio of insulation layer 106 thickness to structural layer 104 thickness can be 6:1, 5:1, 4:1, 2:1, 1.5:1, or 1:1, by way of non-limiting example. Additional ratios not disclosed herein are considered within the purview of the present disclosure.

The structural layer 104 can have a variety of thicknesses based on structural needs of the building. By way of example, the structural layer 104 can have a thickness of ⅛ inch. Additionally, the structural layer can have a thickness in a range of 1/64 inch and 1 inch. To accommodate the differing insulation needs described above, the insulation layer 106 can have a thickness in a range of ¼ inch and 1½ inches. As such, the combined thickness of the structural layer 104 and the insulation layer 106 can be in a range of ½ inch and 2 inches. In an exemplary configuration, the thickness of the structural layer 104 and the insulation layer 106 is equal to or less than 1 inch, having an R-value of 3.5 or greater. In another exemplary configuration, the thickness of the structural layer 104 and the insulation layer 106 is equal to or less than 1 inch, having an R-value of 5 or greater. Furthermore, alternative embodiments have an R-value-to-thickness ratio of at least 5, resulting in a 2-inch system with an R-value of 10.

As described herein, the purpose of the insulation layer 106 is to provide enhanced thermal resistance. The insulation layer 106 of the sheathing system 100 can comprise materials selected to have a high R-value or, in the instance of a polymer foam insulation layer, produced with reduced or eliminated usage of halogenated blowing agents as a whole, while maintaining sufficient insulation or R-values (e.g., an 180-day R/in value of at least 4.8). In one exemplary embodiment, the insulation layer 106 comprises extruded polystyrene (XPS). It is contemplated that insulation layer 106 can comprise any insulating material, including but not limited to fiberglass, cellular glass, wood, foam, polymers, wood composite materials, expanded polystyrene (EPS), foamed polyurethane, polyisocyanurate board, fiber-reinforced polymer, thermoplastic, polymer-based materials, mineral wool, closed cell thermoplastic, thermoplastic polystyrene, polyethylene terephthalate, polyester resin, phenolic foam, aerogel blanket, aerogel board, cellulosic insulation, rock wool insulation, or any combination thereof. Polymer-based insulation materials, which can also or alternatively be utilized in insulation layer 106, can include polyurethane, phenolic foam, TPO, thermoplastic polyolefin (TPO), and ethylene propylene diene monomer (EPDM), among other things.

In any of the exemplary embodiments, a barrier coating composition can be applied to one or more surfaces of a foam insulation layer 106, wherein the barrier coating can reduce blowing agent diffusion and increase the foam's thermal insulation performance. The barrier coating composition can be applied, for example, to one or more surfaces of the insulation layer 106 using any one of a variety of coating methods. For example, the barrier coating composition can be applied via a roller, brush, spray coating method, dip coating, spin coating, flow coating, curtain coating, and the like. Other coating methods known and used in the art can be employed, and are contemplated within the subject disclosure.

In some embodiments, the barrier coating composition is preferably applied to a foam insulation layer 106 post-production (i.e., post extrusion, expansion, or other foam production method). The barrier coating composition can be applied to the insulation layer 106 shortly following production, such as within 12 hours, 6 hours, 3 hours, 2 hours, 1 hour, or 30 minutes of production. Following application, the coating is dried to form a barrier coating on at least one surface of the insulation layer 106. Although described as being applied to one or more of the third surface 116 of the insulation layer 106 and the fourth surface 117 of the insulation layer 106, it should be appreciated that the barrier coating composition can additionally, or alternatively, be applied to each surface of the insulation layer 106. For example, the barrier coating composition can be applied to one or more edges of the insulation layer 106. In some embodiments, the barrier coating can be applied such that it forms a continuous coating on the one or more surfaces of the insulation layer 106. In other embodiments, the barrier coating can form only a partial, discontinuous coating on one or more surfaces of the insulation layer 106.

In any of the exemplary embodiments, the barrier coating composition can be applied directly to the surface of the insulation layer 106 with no intervening layers between the insulation layer 106 surface and the barrier coating composition. Additional coating layers, including additional layers of the barrier coating composition, can optionally be applied on a first barrier coating composition layer. However, it is contemplated that, in some instances, one or more optional primer layers can be applied between the barrier coating composition and the surface of the insulation layer 106 such that the barrier coating composition is applied indirectly to the surface of the insulation layer 106.

Further, it is contemplated that, in any of the exemplary embodiments, the barrier coating composition described herein may be incorporated into the foamable composition. For example, instead of applying the barrier coating composition as a coating on at least one surface of the insulation product, (or in addition to) the barrier coating composition can be injected into the screw extruder. In embodiments in which the polymer of the barrier coating composition is a resin, the polymer may be introduced into the feed hopper in pellet form. It should be appreciated that, when injected into the extruder, certain properties of the barrier coating composition may differ from those of a barrier coating composition intended for coating on a surface of the polymer insulation product, including, but not limited to, the viscosity of the coating composition and the solids loading of the barrier coating.

The barrier coating composition can comprise a dispersion, solution, or emulsion comprising one or more polymers. The polymers can comprise one or more barrier polymers, such as poly(vinylidene chloride) (PVdC) and PVdC-based copolymers, polyvinyl alcohol (PVOH), poly(ethylene-co-vinyl alcohol) (EVOH), poly(vinylidene fluoride) (PVdF), polyurethane, styrene butadiene (SBR), polyvinyl chloride (PVC), poly(acrylates) and copolymers, polyamides (e.g., Nylon-6), polyesters (e.g., PET), polystyrene (PS), polyglycolic acid (PGA), poly(ethylene 2,5-furandicarboxylate) (PEF), poly(butylene succinate) (PBS), bio-based ethylene (Bio-PE), wax, such a natural wax (carnauba and montan wax), petroleum-based wax (paraffins, microcrystalline wax), or synthetic wax, derived from petroleum distillates or residues (polyethylene, polypropylene, Fischer-Tropsch wax), and combinations or copolymers thereof. Other polymers can be incorporated, provided they are capable of imparting gas barrier properties to the coating.

In any of the exemplary embodiments, the barrier polymer can be a homopolymer or a copolymer comprising one or more co-monomers, such as vinyl chloride, vinyl alcohols, vinyl esters, for example, vinyl acetate, vinyl ethers, acrylic acids, acrylic esters, acrylamides, methacrylic acids, methacrylic esters, methacrylamides, acrylonitrile, N-vinylpyrrolidone, methacrylonitrile, styrene, styrene derivatives, butadiene, olefins, ethylene and propylene, itaconic acid, and maleic anhydride, by way of non-limiting example. Co-monomers can also include copolymerizable surfactants, such as sodium salt of an allyl ether sulfonate (e.g., odium 1-allyloxy-2-hydroxypropyl sulfonate), 2-acrylamido-2-methylpropanesulphonic acid (AMPS) or one of its salts, 2-sulphoethylmethacrylic acid (2-SEM) or one of its salts, the phosphate ester of methacrylate-terminated polypropylene glycol or one of its salts, poly(ethylene oxide) methyl ether acrylate (PEOA), or poly(ethylene oxide) methyl ether methacrylate (PEOMA), by way of non-limiting example.

In any of the exemplary embodiments, the barrier polymer is at least a semi-crystalline polymer, with a minimum degree of crystallinity of 5%. Particularly, a barrier polymer having a degree of crystallinity of at least 10%, or at least 15%, or at least 20%, or at least 25%, or at least 30%, can provide a barrier coating composition with sufficient barrier properties. In any of the exemplary embodiments, the barrier polymer can comprise a degree of crystallinity of at least 20%, such as at least 25%, at least 30%, at least 35%, at least 40%, at least 45%, at least 50%, at least 55%, at least 60%, at least 65%, at least 70%, at least 75%, at least 80%, at least 85%, at least 90%, or at least 95%, by way of example.

The barrier polymer can be added in solid (e.g., resin) form, or in melted (e.g., liquid) form as a dispersion, solution, or emulsion (the "barrier polymer material"). When the barrier polymer is added in the form of a dispersion, the dispersion can be an aqueous dispersion (e.g., the polymer is dispersed in water), or a solvent-based dispersion.

When provided in the form of a dispersion, the barrier polymer can be present in a solids content of about 20 wt. % to about 100 wt. % based on the weight of the dispersion, including, for example, a solids contents from about 25 wt. % to about 85 wt. %, from about 30 wt. % to about 75 wt. %, from about 35 wt. % to about 65 wt. %, from about 40 wt. % to about 60 wt. %, from about 45 wt. % to about 56 wt. %, or any other endpoints or subrange included therein.

The polymer can also be characterized by the amount of barrier polymer present in the barrier coating composition, based on the total amount of solids present in the barrier coating composition. For example, the polymer can be included in an amount from about 40 wt. % to about 100 wt. %, based on the total amount of solids present in the barrier coating composition. The barrier coating composition including, for example, from about 50 wt. % to about 98 wt. %, from about 60 wt. % to about 96 wt. %, from about 70 wt. % to about 93 wt. %, and from about 75 wt. % to about 91 wt. %, including any other endpoints or subrange included therein.

The barrier coating composition can comprise one or more additives, whether added as part of the barrier polymer material or directly to the composition. Additive scan include, for instance, processing aids, surfactants (wetting agents), rheology modifiers, flame retardants, defoaming agents (e.g. emulsions and/or dispersions of mineral, paraffin, or vegetable oils), silicone, dispersions of polydimethylsiloxane (PDMS) fluids, pH adjusters, UV stabilizers, and silica that has been hydrophobized with polydimethylsiloxane or other materials.

Exemplary rheology modifiers can include, for example, glycerol, 1,2,4-butanetriol, 1,4-butanediol, 1,2-propanediol, 1,3-propanediol, poly(ethylene glycol), clays, fumed silica, cellulose and derivatives thereof, polysaccharides, alkali-swellable polymers (ASE, HASE), hydrophobically modified urethane associative polymers (HEUR) (e.g., Rheobyke® 7600, available from BYK), alkali-acrylic; emulsions, polyurea, polyamides and calcium sulfonates, and combinations thereof.

The viscosity of the barrier coating composition is important for ensuring the coating can be applied in the particular method intended, such as spraying, painting, dip coating, etc. Thus, a rheology modifier can be included in such a concentration to achieve a coating viscosity of less than about 400 cP at 30% solids or less, including less than about 300 cP at 30% solids or less, and less than about 200 cP at 30% solids or less. In any of the exemplary embodiments, the viscosity of the barrier coating composition can be no greater than 250 cP at 30% solids or less, such as between 50 cP to 225 cP, 75 cP to 200 cP, 90 cP to 175 cP, or 95 cP to 150 cP, including all subranges and endpoints there between. Such viscosity is particularly important to achieve a sprayable coating composition.

Thus, in various aspects of the present disclosure, the rheology modifier is included in the barrier coating composition in an amount between 0 to 20 wt. % based on the weight of the total solids content of the barrier coating composition, including between 0.1 wt. % to 18 wt. %, 0.2 wt. % to 15 wt. %, 0.5 wt. % to 12 wt. %, 1 wt. % to 10 wt. %, 1.5 wt. % to 8 wt. %, 2 wt. % to 6 wt. %, or 2.5 wt. % to 5 wt. %, including all subranges and endpoints there between.

As mentioned above, the barrier coating composition can include a pH adjuster in an amount sufficient to adjust the pH to a desired level. For example, organic and/or inorganic bases, can be included to increase the pH of the barrier coating composition. In some exemplary embodiments, the bases can be a volatile or non-volatile base. Exemplary volatile bases can include, for example, ammonia and alkyl-substituted amines, such as methyl amine, ethyl amine or 1-aminopropane, dimethyl amine, and ethyl methyl amine. Exemplary non-volatile bases can include, for example, sodium hydroxide, potassium hydroxide, sodium carbonate, and t-butylammonium hydroxide.

The pH of the barrier coating composition preferably has a pH between about 2-10. For instance, the pH of the barrier coating composition can have values between 3 to 8, or 4 to 7, by way of non-limiting example. In any of the embodiments disclosed herein, the barrier coating composition can have a neutral pH between 6 to 7.

In various aspects of the present inventive concepts, the pH adjuster is included in the barrier coating composition in an amount between 0 and 15 wt. %, based on the weight of the total solids content of the barrier coating composition, including between 0.05 wt. % and 12 wt. %, between 0.1 wt. % and 10 wt. %, between 0.25 wt. % and 8 wt. %, between 0.4 wt. % and 6 wt. %, between 0.5 wt. % and 4 wt. %, between 0.75 wt. % and 2.5 wt. %, and between 0.9 wt. % and 2 wt. %, including all subranges and endpoints therebetween.

As the barrier coating composition can be applied to one or more surfaces of a foam insulation layer 106, it is important that the coating is able to sufficiently wet and spread over the foam surface to achieve a uniform, consistent coating. To achieve sufficient wetting, the surface tension of the barrier coating composition needs to be tailored to the surface energy of the foam product. Namely, the barrier coating composition is particularly formulated to possess a surface tension no greater than 20 mN/m above the surface energy of the foam product. By way of non-limiting example, the surface tension of the barrier coating composition can be no greater than 15 mN/m, 10 mN/m, 8 mN/m, 5 mN/m, 2.5 mN/m, or 1 mN/m above the surface energy of the foam product. In any of the exemplary embodiments, the barrier coating composition has a surface tension approximately (+/−5%) equal to the surface energy of the foam product. In any of the exemplary embodiments, the barrier coating has a surface tension that is equal to or less than the surface energy of the foam product.

The insulation layer 106 can have a surface energy of approximately 35 mN/m to 55 mN/m. By way of non-limiting example, the surface energy of insulation layer 106 can be approximately 37 mN/m to 53 mN/m, 39 mN/m to 51 mN/m, or 40 mN/m to 50 mN, including all endpoints and subranges therebetween.

In various aspects of the present disclosure, the barrier coating composition can have a surface tension that is equal to or less than the surface energy of the insulation layer 106. The surface tension of the barrier coating composition can be approximately 30 mN/m to 55 mN/m, including approximately 34 mN/m to 50 mN/m, 36 mN/m to 48 mN/m, and 38 mN/m to 46 mN, including all endpoints and subranges therebetween. In this or other aspects, the barrier coating composition can have a surface tension of no greater than 50 mN/m, no greater than 48 mN/m, no greater than 47 mN/m, and no greater than 46 mN/m.

In order to tailor the surface tension of the barrier coating composition, the coating can include one or more wetting agents, such as surfactants, oils, and the like. The surfactant(s) can include any one or more of ionic surfactants, non-ionic surfactants, cationic surfactants, amphoteric surfactants, and mixtures thereof. The term "amphoteric" surfactant is often used interchangeably with the term "zwitterionic" surfactant, i.e. each term has the identical meaning of surfactants having both cationic and anionic centers attached to the same molecule.

In accordance with the present disclosure, the one or more surfactants can comprise, or consist of, one or more anionic surfactants. Exemplary anionic surfactants include sulfates (e.g., alkyl sulfates, ammonium lauryl sulfate, sodium lauryl sulfate (SLS), alkyl ether sulfates, sodium laureth sulfate, and sodium myreth sulfate); sulfonates (e.g., dioctyl sodium sulfosuccinate, perfluorooctanesulfonate, perfluorobutanesulfonate, alkyl sulfonates, and alkyl benzene sulfonates); carboxylates (e.g., alkyl carboxylates, fatty acid salts (soaps)), sodium lauroyl sarcosinate, carboxylate fluorosurfactants, perfluorononanoate, and perfluorooctanoate); phosphates (e.g., alkyl aryl ether phosphate, alkyl ether phosphate, mono- and di-phosphate esters of nonyl phenol ethoxylate, phosphate esters of tridecyl alcohol ethoxylate, phosphate esters of isodecyl ethoxylate, and other phosphate esters of aromatic ethoxylates and aliphatic ethoxylates, phosphate esters of C10-C16 alkyl ethoxylates/propoxylates); salts of fluorinated fatty acids; silicones, stearates; and the like and mixtures thereof.

In accordance with the present disclosure, the one or more surfactants can comprise, or consist of, one or more cationic surfactants. Exemplary cationic surfactants include alkylamine salts such as laurylamine acetate; permanently charged quaternary ammonium cations (e.g., alkyltrimethylammonium salts, cetyl trimethylammonium bromide, cetyl trimethylammonium chloride, cetylpyridinium chloride, and benzethonium chloride); and quaternary ammonium salts (e.g., lauryl trimethyl ammonium chloride and alkyl benzyl dimethylammonium chloride), polyoxyethylenealkylamines, and the like and mixtures thereof.

In accordance with the present disclosure, the one or more surfactants comprise, or consist of, one or more amphoteric surfactants. Exemplary amphoteric surfactants include alkyl betaines, such as lauryl-betaine; alkylamidopropylbetaine (APB); cocamidopropyl betaine; alkylamidopropylamine N-oxide (APAO); alkyldimethylamine N-oxide (AO), cocoamphoacetate; cocoamphodiacetate; and the like and mixtures thereof.

In accordance with the present disclosure, the one or more surfactants comprise, or consist of, one or more nonionic surfactants. Suitable nonionic surfactants can include block copolymers based on polyethylene glycol and polypropylene glycol; polyethers (e.g., ethylene oxide and propylene oxide condensates, which include straight and branched chain alkyl and alkaryl polyethylene glycol and polypropylene glycol ethers and thioethers); alkyl polyglucosides (e.g., glycerol fatty acid esters, polyoxyethylene glycerol fatty acid esters, polyoxyethylene sorbitan fatty acid esters, polyethylene glycol fatty acid esters and polyoxyethylene polyoxypropylene block copolymers with terminal hydroxyl groups and combinations thereof); alkylphenoxypoly(ethyleneoxy)ethanols having alkyl groups containing from about 7 to about 18 carbon atoms and having from about 4 to about 240 ethyleneoxy units (e.g., heptylphenoxypoly(ethyleneoxy) ethanols, and nonylphenoxypoly(ethyleneoxy) ethanols); polyoxyalkylene derivatives of hexitol including sorbitans, sorbides, mannitans, and mannides; partial long-chain fatty acids esters (e.g., polyoxyalkylene derivatives of sorbitan monolaurate, sorbitan monopalmitate, sorbitan monostearate, sorbitan tristearate, sorbitan monooleate, and sorbitan trioleate); condensates of ethylene oxide with a hydrophobic base, the base being formed by condensing propylene oxide with propylene glycol; sulfur containing condensates (e.g., those condensates prepared by condensing ethylene oxide with higher alkyl mercaptans, such as nonyl, dodecyl, or tetradecyl mercaptan, or with alkylthiophenols where the alkyl group contains from about 6 to about 15 carbon atoms); ethylene oxide derivatives of long-chain carboxylic acids (e.g., lauric, myristic, palmitic, and oleic acids, such as tall oil fatty acids); ethylene oxide derivatives of long-chain alcohols (e.g., octyl, decyl, lauryl, or cetyl alcohols); and ethylene oxide/propylene oxide copolymers.

Exemplary surfactants can include one or more of Dynol 607, which is a 2,5,8,11-tetramethyl-6-dodecyne-5,8-diol, SURFONYL® 420, SURFONYL® 440, and SURFONYL® 465, which are ethoxylated 2,4,7,9-tetramethyl-5-decyn-4,7-diol surfactants (commercially available from Evonik Corporation (Allentown, Pa.)), Stanfax (a sodium lauryl sulfate), Surfynol 465 (an ethoxylated 2,4,7,9-tetramethyl 5 decyn-4,7-diol), Triton™ GR-PG70 (1,4-bis(2 -ethylhexyl) sodium sulfosuccinate), Triton™ CF-10 (poly(oxy-1,2-ethanediyl), alpha-(phenylmethyl)-omega-(1,1,3,3-tetramethylbutyl)phenoxy), Hydropalat® WE 3135, which is a Difunctional block copolymer surfactant terminating in primary hydroxyl groups, and Hydropalat® WE 3694, a nonionic wetting agent.

The wetting agent(s) can be present in the barrier coating composition in an amount from 0 to about 15% by weight, such as, for example, from about 0.001% to about 8% by weight, from about 0.005% by weight to about 7.5% by weight, from about 0.01% by weight to about 7% by weight, from about 0.05% by weight to about 6.5% by weight, from about 0.075% by weight to about 6% by weight, from about 0.09% by weight to about 5.5% by weight, from about 0.1% by weight to about 5% by weight, from about 0.15% to about 4% by weight, or from about 0.2% to 2.5% by weight, based on the total solids content in the barrier polymer material, including all subranges and endpoints therebetween.

Optionally, the barrier coating composition further comprises one or more film-forming additives. Film-forming additives can include, by way of example and not limitation, graphene, nanoclays, or inorganic layered particles. Suitable film-forming additives can include, by way of example and not limitation, cellulose nanocrystals (CNC), organosilane, perfluoroalkyl ethyl methacrylate (PPFEMA), ormocers, biowaxes/waxes, nanoclays/clays, silicon oxide ($SiO_x$), aluminum oxide films ($Al_2O_3$), graphene/graphene oxide, molybdenum disulfide ($MoS_2$), tungsten disulfide ($WS_2$), niobium selenide ($NbSe_2$), hexagonal boron nitride (hBN), and combinations thereof. The film-forming additives aid the barrier coating composition in forming a continuous film on the surface of the insulation layer 106 and can contribute to the barrier properties of the barrier coating. When included, the film-forming additives can be included in the barrier coating composition in an amount of from 0.1 wt. % to 50 wt. %, including from 0.5 wt. % to 25 wt. %, from 1 wt. % to 20 wt. %, or from 5 wt. % to 15 wt. % of the barrier coating composition based on a total amount of solids present in the composition.

Optionally, the barrier coating composition can include one or more fillers, such as platelet-type additive, such as graphene, nanoclay, inorganic layered particles, including mica, talc, and aluminum flake, or combinations thereof. In some exemplary embodiments, the one or more fillers can be included in at least 0.25 wt. % of the barrier coating composition, based on a total amount of solids present in the composition. The one or more fillers can be included in about 0.5 wt. % to about 50 wt. %, including about 1 wt. % to about 35 wt. %, about 5 wt. % to about 30 wt. % and about 10 wt. % to about 25 wt. % of the barrier coating composition based on a total amount of solids present in the composition, including any endpoints and subranges therebetween.

The barrier coating composition can optionally further comprise one or more other additives, such as UV absorbers/stabilizers, fire retardants, defoamers, pigments, oils, matting agents, etc. Exemplary UV absorbers/stabilizers may include\, for example, benzotriazoles, polypropylene, anti-oxidants, hindered amine light stabilizers (HALS), and the like (e.g. BASF Tinuvin® 479-DW ECO, which is an aqueous preparation of a triazine-based UV absorber from BASF™, 2-[3(2H-benzotriazol-2-yl)-4-hydroxy phenyl] ethyl methacrylate from Sigma Aldrich®, Lowilite™ 26, which is a benzotriazole UV light absorber from SI Group™, liquid hydroxyphenyl-triazine (HPT), such as Omnistab® UV400, available from Partner in Chemicals; a HALS stabilizer based on amino ether functionality, such as Omnistab® LS123, available from Partner in Chemicals, and benzotriazole UV absorbers, such as Eversorb® 81 and Eversorb® 95, available from Everlight™ USA, Inc.). Exemplary fire retardants, can include, for example, halogenated materials, inorganic materials, nitrogen-based materials, intumescent materials, phosphorous materials, and the like (e.g., Tris(2-chloroethyl) phosphate, available from Sigma Aldrich®.) Exemplary defoamers may include, for example, silicone-based defoamers (including silicone emulsions, polysiloxane, and the like), paraffin-based defoamers, diols, oils, etc. (e.g., Foamstar® ST2410, which is a defoamer based on block copolymer, Foamstar® ED 2522 NC, which is an ultra-low SVOC silicone emulsion defoamer, Foamstar® ST 2210 NC, which is a specially modified alcohol and polysiloxane adduct (Old name: Dehydran® 1620), available from BASF™; BYK-035 9, which is a VOC-free mixture of paraffin based mineral oils and hydrophobic components, containing silicone, available from BYK; Surfadol® DF-75, 100% active nonionic defoaming agent based on acetylenic diols, Surfadol® 560 (silicone-containing defoamer), and Surfadol® 532 (acetylenic diol molecular defoamer), available from ACME Tech), and the like. Exemplary matting agents include, for example, silica-based materials and amorphous silica (such an amorphous micronized silica, Gasil® 23F, available from PQ Corporation). Other additives are contemplated and possible. The amounts of any such additives can vary depending on the particular embodiment and, in general, can be (collectively or individually) from 0 wt. % to 30 wt. %, including from 0.01 wt. % to 25 wt. %, from 0.02 wt. % to 22 wt. %, from 0.05 wt. % to 20 wt. %, from 0.1 wt. % to 18 wt. %, from 0.5 wt. % to 15 wt. %, from 1 wt. % to 12 wt. %, from 1.5 wt. % to 10 wt. %, from 2 wt. % to 8 wt. %, from 2.5 wt. % to 6 wt. %, or from 3 wt. % to 5 wt. %, based on the total solids content of the barrier coating composition, including any endpoints and subranges therebetween.

Table 1 provides exemplary barrier coating compositions. It should be appreciated that any compositional range from Exemplary Range A may be combined with one or more of the compositional ranges from Exemplary Range B and vice versa. The compositional ranges below are intended to encompass and include any and all endpoints and subranges within the disclosed range.

TABLE 1

| | Exemplary Range A (in wt. % solids of total barrier coating composition) | Exemplary Range B (in wt. % solids of total barrier coating composition) |
|---|---|---|
| Barrier Polymer | 40-99.9 wt. % | 70-93 wt. % |
| Rheology Modifier | 0-20 wt. % | 0.5-12 wt. % |
| Wetting Agent | 0-15 wt. % | 0.01-7 wt. % |
| pH adjuster | 0-15 wt. % | 0.25-8 wt. % |
| Defoamer | 0-5 wt. % | 0.01-2 wt. % |
| Matting Agent | 0-5 wt. % | 0.01-2 wt. % |
| UV Stabilizer | 0-12 wt. % | 0.5-5 wt. % |
| Flame Retardant | 0-5 wt. % | 0.1-2 wt. % |

The barrier polymer, along with any additives, can be dispersed in water and/or solvent and blended to form the barrier coating composition. As described above, the barrier coating composition is applied to at least one major surface of the insulation layer 106 and is dried to form a barrier coating on the surface. In some exemplary embodiments, the barrier coating is applied directly to a surface of the insulation layer 106, without the use of adhesives, primers, or other layers between the barrier coating and the surface of the insulation layer 106. Thus, in any of the embodiments disclosed herein, the insulation layer 106 is free of any polyamide primer coating that is applied to the insulation layer 106 prior to the barrier coating composition.

The barrier coating composition has a particular crystallinity, based on the crystallinity of the polymer used in the composition, although this crystallinity is impacted by the various additives included in the composition, such as wetting agents, rheology modifiers, and the like. Accordingly, a particular balance must be struck between achieving a coating composition with desirable viscosity and surface tension properties, while also ensuing the coating maintains sufficient crystallinity to provide a barrier functionality to keep the blowing agent from diffusing out of the foam product, or insulation layer 106.

Although not intended to be bound by theory, it is believed that the precise balance struck between coating's overall crystallinity and its rheology and surface tension properties enables the application of the coating in a relatively low coat weight. Particularly, the barrier coating composition is applied at a coat weight of less than 250 $g/m^2$, including coat weights of no greater than 225 $g/m^2$, no greater than 200 $g/m^2$, no greater than 175 $g/m^2$, no greater than 150 $g/m^2$, no greater than 125 $g/m^2$, no greater than 100 $g/m^2$, no greater than 85 $g/m^2$, no greater than 60 $g/m^2$, no greater than 45 $g/m^2$, and no greater than 30 $g/m^2$. In an of the exemplary embodiments, the barrier coating composition can be applied to one or more surfaces of the polymer foam board in a coat weight between 3 $g/m^2$ and 225 $g/m^2$, including between 5 $g/m^2$ and 200 $g/m^2$, between 10 $g/m^2$ and 185 $g/m^2$, between 15 $g/m^2$ and 150 $g/m^2$, between 18

$g/m^2$ and 130 $g/m^2$, between 20 $g/m^2$ and 115 $g/m^2$, between 25 $g/m^2$ and 100 $g/m^2$, between 30 $g/m^2$ and 90 $g/m^2$, between 35 $g/m^2$ and 85 $g/m^2$, and between 40 $g/m^2$ and 80 $g/m^2$, including all endpoints and subranges therebetween.

Optionally, multiple coatings can be applied on one or more surface of the polymer insulation layer 106. Such additional coatings can be added, for example, to enhance the properties of the barrier coating or to protect the barrier coating. In embodiments, the one or more additional coatings can impart hydrophobicity or water resistance to the coated insulation layer 106. It should be appreciated that the at least one additional coating can be formed by applying a coating composition to the surface and allowing the coating composition to dry, thereby forming the at least one additional coating. The coating composition can be, for example, a dispersion (e.g., aqueous or solvent-based), liquid, or the like.

As described above, the one or more additional coatings can be applied on top of the barrier coating, such that the barrier coating is positioned between the one or more additional coatings and the insulation layer 106. In other embodiments, the one or more additional coatings can be applied between the barrier coating and the surface of the polymer insulation layer 106. The one or more additional coatings are not particularly limited and can be the same as or different from the barrier coating. In embodiments, the barrier coating is a first layer of a coating and the at least one additional coating is a second layer of the same coating. In embodiments, the barrier coating comprises a first polymer comprising polyvinylidene dichloride (PVDC), polyvinyl alcohol, polyvinylidene fluoride (PVDF), polyvinyl chloride (PVC), ethylene vinyl alcohol, polyurethane, styrene butadiene (SBR), and combinations or copolymers thereof and the at least one additional coating comprises a different polymer comprising polyvinylidene dichloride (PVDC), polyvinyl alcohol, polyvinylidene fluoride (PVDF), polyvinyl chloride (PVC), ethylene vinyl alcohol, polyurethane, styrene butadiene (SBR), and combinations or copolymers thereof. In embodiments, the at least one additional coating comprises one or more polyurethanes, epoxies, acrylics, or combinations thereof.

In such embodiments an additional coating layer is applied over the barrier coated insulation layer 106, the additional coating preferably has a surface tension that is particularly tailored to the surface energy of the barrier coated insulation layer 106. Accordingly, the one or more additional coatings are particularly formulated to possess a surface tension no greater than 20 mN/m above the surface energy of the barrier coated insulation layer 106, including no greater than 15 mN/m, no greater than 10 mN/m, no greater than 8 mN/m, no greater than 5 mN/m, no greater than 2.5 mN/m, and no greater that 1 mN/m above the surface energy of the barrier coated insulation layer 106. Similarly, if a coating layer is applied between the foam product and the barrier coating composition, the surface tension of barrier coating composition would need to be particularly formulated so as to be no greater than 20 mN/m, no greater than 15 mN/m, or no greater than 10 mN/m above the surface energy of the coated foam product.

Alternatively or additionally to the coating layer described above, the barrier coating composition can be injected into the extruder, such as through a port, and incorporated directly into the foamable composition.

In any of the exemplary embodiments disclosed herein, the foamable composition can comprise any material capable of being foamed ("matrix material"), such as a foamable polymer (referred to herein as the "matrix polymer"), cellular glass, and the like. The matrix polymer can be thermoplastic or thermoset. The particular polymer composition can be selected to provide sufficient mechanical strength and/or to the process utilized to form final foamed polymer products. In addition, the matrix polymer is preferably chemically stable, that is, generally non-reactive, within the expected temperature range during formation and subsequent use in a polymer foam.

As used herein, the term "polymer" is generic to the terms "homopolymer," "copolymer," "terpolymer," and combinations of homopolymers, copolymers, and/or terpolymers. Non-limiting examples of suitable foamable polymers for use as the matrix polymer herein include alkenyl aromatic polymers, polyvinyl chloride ("PVC"), chlorinated polyvinyl chloride ("CPVC"), polyethylene, polypropylene, polycarbonates, polyisocyanurates, polyetherimides, polyamides, polyesters, polycarbonates, polymethylmethacrylate, polyacrylate, polyphenylene oxide, polyurethanes, phenolics, polyolefins, styrene acrylonitrile ("SAN"), acrylonitrile butadiene styrene, acrylic/styrene/acrylonitrile block terpolymer ("ASA"), polysulfone, polyphenylene sulfide, acetal resins, polyamides, polyaramides, polyimides, polyacrylic acid esters, copolymers of ethylene and propylene, copolymers of styrene and butadiene, copolymers of vinyl acetate and ethylene, rubber modified polymers, thermoplastic polymer blends, and combinations thereof.

In some exemplary embodiments, the foamable matrix polymer is an alkenyl aromatic polymer material. Suitable alkenyl aromatic polymer materials include alkenyl aromatic homopolymers and copolymers of alkenyl aromatic compounds and copolymerizable ethylenically unsaturated co-monomers. In addition, the alkenyl aromatic polymer material can include minor proportions of non-alkenyl aromatic polymers. The alkenyl aromatic polymer material can be formed of one or more alkenyl aromatic homopolymers, one or more alkenyl aromatic copolymers, a blend of one or more of each of alkenyl aromatic homopolymers and copolymers or blends thereof with a non-alkenyl aromatic polymer.

Examples of alkenyl aromatic polymers include, but are not limited to, those alkenyl aromatic polymers derived from alkenyl aromatic compounds such as styrene, alpha-methylstyrene, ethylstyrene, vinyl benzene, vinyl toluene, chlorostyrene, and bromostyrene. In at least one embodiment, the alkenyl aromatic polymer is polystyrene.

In some embodiments, minor amounts of monoethylenically unsaturated monomers such as $C_2$ to $C_6$ alkyl acids and esters, ionomeric derivatives, and $C_2$ to $C_6$ dienes can be copolymerized with alkenyl aromatic monomers to form the alkenyl aromatic polymer. Non-limiting examples of copolymerizable monomers include acrylic acid, methacrylic acid, ethacrylic acid, maleic acid, itaconic acid, acrylonitrile, maleic anhydride, methyl acrylate, ethyl acrylate, isobutyl acrylate, n-butyl acrylate, methyl methacrylate, vinyl acetate and butadiene.

In some embodiments, the matrix polymer can be formed substantially of (e.g., greater than 95 percent), and in certain exemplary embodiments, formed entirely of polystyrene. The matrix polymer can be present in the foamable polymer composition in an amount from about 60% to about 99% by weight, in an amount from about 60% to about 96% by weight, in an amount from about 70% to about 95% by weight, or in an amount from about 85% to about 94% by weight. In embodiments, the matrix polymer can be present in an amount from about 90% to about 99% by weight. As used herein, the terms "% by weight" and "wt. %" are used interchangeably and are meant to indicate a percentage based on 100% of the total weight of the dry components.

As indicated above, the foam insulation layer 106 is formed from a composition that contains a blowing agent composition. According to one aspect of the present invention, the blowing agent composition comprises one or more of: $CO_2$, fluorinated blowing agents, such as hydrofluorocarbons (HFCs), hydrochlorofluorocarbons, hydrofluoroethers, hydrofluoroolefins (HFOs), hydrochlorofluoroolefins (HCFOs), hydrobromofluoroolefins, hydrofluoroketones, hydrochloroolefins, and fluoroiodocarbons, alkyl esters, such as methyl formate, ethanol, water, hydrocarbons, or mixtures thereof. In other exemplary embodiments, the blowing agent comprises one or more of $CO_2$, ethanol, HFOs, HCFOs, HFCs, and mixtures thereof.

In any of the exemplary embodiments, the blowing agent composition can comprise a material having a low global warming potential ("GWP"), such as a fluorinated alkene, including, for example, hydrofluoroolefins (HFOs) and hydrochlorofluoroolefins (HCFOs). The hydrofluoroolefin blowing agent in the blowing agent composition of the present invention can include, for example, 3,3,3-trifluoropropene (HFO-1243zf); 2,3,3-trifluoropropene; (cis and/or trans)-1,3,3,3-tetrafluoropropene (HFO-1234ze), particularly the trans isomer; 1,1,3,3-tetrafluoropropene; 2,3,3,3-tetrafluoropropene (HFO-1234yf); (cis and/or trans)-1,2,3,3,3-pentafluoropropene (HFO-1225ye); 1,1,3,3,3-pentafluoropropene (HFO-1225zc); 1,1,2,3,3-pentafluoropropene (HFO-1225yc); hexafluoropropene (HFO-1216); 2-fluoropropene, 1-fluoropropene; 1,1-difluoropropene; 3,3-difluoropropene; 4,4,4-trifluoro-1-butene; 2,4,4,4-tetrafluoro-1-butene; 3,4,4,4-tetrafluoro-1-butene; octafluoro-2-pentene (HFO-1438); 1,1,3,3,3-pentafluoro-2-methyl-1-propene; octafluoro-1-butene; 2,3,3,4,4,4-hexafluoro-1-butene; 1,1,1,4,4,4-hexafluoro-2-butene (HFO-1336mzz); 1,2-difluoroethene (HFO-1132); 1,1,1,2,4,4,4-heptafluoro-2-butene; 3-fluoropropene, 2,3-difluoropropene; 1,1,3-trifluoropropene; 1,3,3 -trifluoropropene; 1,1,2-trifluoropropene; 1-fluorobutene; 2-fluorobutene; 2-fluoro-2-butene; 1,1-difluoro-1-butene; 3,3-difluoro-1-butene; 3,4,4-trifluoro-1-butene; 2,3,3-trifluoro-1-butene; 1,1,3,3-tetrafluoro-1-butene; 1,4,4,4-tetrafluoro-1-butene; 3,3,4,4-tetrafluoro-1-butene; 4,4-difluoro-1-butene; 1,1,1-trifluoro-2-butene; 2,4,4,4-tetrafluoro-1-butene; 1,1,1,2-tetrafluoro-2 butene; 1,1,4,4,4-pentafluoro-1-butene; 2,3,3,4,4-pentafluoro-1-butene; 1,2,3,3,4,4,4-heptafluoro-1-butene; 1,1,2,3,4,4,4-heptafluoro-1-butene; and 1,3,3,3-tetrafluoro-2-(trifluoromethyl)-propene. In some exemplary embodiments, the blowing agent or co-blowing agents include HFO-1234ze and/or HFO-1336mzz.

In some exemplary embodiments, the fluorinated alkene blowing agent includes, for example, 1,1,1,4,4,4-hexafluoro-2-butene (HFO-1336mzz) (including cis (HFO-1336mzz-Z) and/or trans (HFO-1336mzz-E) isomers thereof); and (cis and/or trans)-1,3,3,3-tetrafluoropropene (HFO-1234ze), particularly the trans isomer. HFO-1336mzz-Z has a GWP of 2 and an ozone depletion potential (ODP) of zero. HFO-1336mzz-Z is commercially available under the tradename Opteon™ 1100. Similarly, HFO-1234ze has a GWP of less than 1 and an ODP of zero. In some exemplary embodiments, the low GWP fluorinated alkene has a GWP of less than 50, such as less than 30, less than 25, less than 15, less than 10, less than 5, less than 2.5, or less than 1. In any of the exemplary embodiments, the blowing agent can comprise HFO-1336mzz-Z and is substantially free of additional fluorinated alkenes. In other embodiments, the blowing agent can comprise a blend of HFO-1336mzz and HFO-1234ze.

When present, the fluorinated alkene(s) can be present in the blowing agent composition in at least 0.5 wt. %, including at least 1 wt. %, at least 2 wt. %, at least 3 wt. %, 5 wt. %, at least 7 wt. %, at least 10 wt. %, at least 12 wt. %, at least 15 wt. %, at least 18 wt. %, at least 20 wt. %, at least 23 wt. %, at least 25 wt. %, at least 27 wt. %, and at least 30 wt. %, based on the weight of the blowing agent composition. In any of the exemplary embodiments, the fluorinated alkene is present in the blowing agent composition in an amount no greater than 98%, including amounts no greater than 95 wt. %, no greater than 90 wt. %, no greater than 85 wt. %, no greater than 80 wt. %, no greater than 75 wt. %, no greater than 70 wt. %, no greater than 65 wt. %, no greater than 60 wt. %, no greater than 55 wt. %, no greater than 52 wt. %, no greater than 50 wt. %, no greater than 47 wt. %, no greater than 45 wt. %, no greater than 42 wt. %, no greater than 40 wt. %, no greater than 37 wt. %, no greater than 35 wt. %, no greater than 32 wt. %, no greater than 30 wt. %, and no greater than 25 wt. %. In any of the exemplary embodiments, the fluorinated alkene can be present in the blowing agent composition in an amount between 0.5 wt. % and 98 wt. %, including, for example, between 2 wt. % and 85 wt. %, between 3 wt. % and 75 wt. %, between 5 wt. % and 55 wt. %, between 10 wt. % and 50 wt. %, between 12 wt. % and 45 wt. %, and between 15 wt. % and 40 wt. %, including all endpoints and subranges therebetween.

The amount of fluorinated alkene can alternatively be characterized by the amount present in the foamable polymer composition. Thus, when characterized in this way, the fluorinated alkene can be present in the foamable polymer composition in at least 0.1 wt. %, including at least 0.2 wt. %, at least 0.5 wt. %, at least 0.7 wt. %, at least 1.0 wt. %, at least 1.2 wt. %, at least 1.5 wt. %, at least 2.0 wt. %, at least 2.3 wt. %, at least 2.5 wt. %, at least 2.7 wt. %, at least 3.0 wt. %, at least 3.5 wt. %, at least 3.7 wt. %, at least 3.9 wt. %, and at least 4.0 wt. %. In any of the exemplary embodiments, the fluorinated alkene can be present in the foamable polymer composition in an amount no greater than 10.0 wt. %, including amounts no greater than 8.0 wt. %, no greater than 6.0 wt. %, no greater than 4.5 wt. %, no greater than 4.0 wt. %, no greater than 3.8 wt. %, no greater than 3.5 wt. %, no greater than 3 wt. %, no greater than 2.5 wt. %, no greater than 2.3 wt. %, no greater than 2 wt. %, no greater than 1.8 wt. %, no greater than 1.5 wt. %, no greater than 1.2 wt. %, no greater than 1.0 wt. %, no greater than 0.8 wt. %, and no greater than 0.6 wt. %.

The amount of fluorinated alkene can alternatively be characterized by the molar amount per 100 grams of the of the matrix polymer. Thus, when characterized in this way the fluorinated alkene can be present in the foamable polymer composition in an amount less than 0.1 moles per 100 grams of the of the matrix polymer, including no greater than 0.05 moles, no greater than 0.03 moles, no greater than 0.02 moles, no greater than 0.018 moles, and no greater than 0.01 moles. In any of the exemplary embodiments, the fluorinated alkene can be present in foamable polymer composition in an amount between 0.0005 moles and less than 0.1 moles per 100 grams of the of the matrix polymer, including between 0.001 moles and 0.025 moles, between 0.005 moles and 0.02 moles, and between 0.01 moles and 0.015 moles per 100 grams of the of the matrix polymer, including all endpoints and subranges therebetween.

It has surprisingly been discovered that the concentration of fluorinated alkene can be substantially reduced, and in some embodiments, eliminated from the blowing agent composition, due to the use of the subject barrier coating composition, without negatively impacting the thermal properties of the polymer foam (i.e., still achieving at least an 180-day R/in value of at least 4.8 and preferably at least 5). In such embodiments, the blowing agent composition can be free of fluorinated alkenes or can be included in less than 4 wt. %, less than 3.5 wt. %, less than 3 wt. %, less than 2.5 wt. %, or less than 2 wt. %, based on the total weight of the polymer insulation layer 106.

The blowing agent composition can optionally include one or more blowing agents or co-blowing agents, such as hydrocarbons, hydrofluorocarbons ("HFC"), hydrochlorofluorocarbons ("HCFO"), carbon dioxide, methyl formate, methylal, and water. When present, the co-blowing agents can be included in the blowing agent composition in at least 0.5 wt. %, including at least 1 wt. %, at least 2 wt. %, at least 3 wt. %, 5 wt. %, at least 7 wt. %, at least 10 wt. %, at least 12 wt. %, at least 15 wt. %, at least 18 wt. %, at least 20 wt. %, at least 23 wt. %, at least 25 wt. %, at least 27 wt. %, and at least 30 wt. %. In any of the exemplary embodiments, the fluorinated alkene is present in the blowing agent composition in an amount no greater than 98%, including amounts no greater than 95 wt. %, no greater than 90 wt. %, no greater than 85 wt. %, no greater than 80 wt. %, no greater than 75 wt. %, no greater than 70 wt. %, no greater than 65 wt. %, no greater than 60 wt. %, no greater than 55 wt. %, no greater than 52 wt. %, no greater than 50 wt. %, no greater than 47 wt. %, no greater than 45 wt. %, no greater than 42 wt. %, no greater than 40 wt. %, no greater than 37 wt. %, no greater than 35 wt. %, no greater than 32 wt. %, no greater than 30 wt. %, and no greater than 25 wt. %. In any of the exemplary embodiments, the co-blowing agent(s) can be present in the blowing agent composition in an amount between 5 wt. % and 98 wt. %, including, for example, between 5 wt. % and 85 wt. %, between 5 wt. % and 75 wt. %, between 5 wt. % and 55 wt. %, between 10 wt. % and 50 wt. %, between 12 wt. % and 45 wt. %, and between 15 wt. % and 40 wt. %, including all endpoints and subranges therebetween.

As mentioned above, the blowing agent can comprise one or more hydrocarbons. Suitable hydrocarbons include, but are not limited to, C1 to C6 aliphatic hydrocarbons, such as methane, ethane, propane, n-butane, isobuatane, and neopentane, and C1 to C3 aliphatic alcohols, such as methanol, ethanol, n-propanol, and isopropanol.

The blowing agent can optionally comprise one or more hydrofluorocarbons. The specific hydrofluorocarbon utilized is not particularly limited. A non-exhaustive list of examples of suitable blowing HFC blowing agents include 1,1-difluoroethane (HFC-152a), 1,1,1,2-tetrafluoroethane (HFC-134a), 1,1,2,2-tetrafluoroethane (HFC-134), 1,1,1-trifluoroethane (HFC-143a), difluoromethane (HFC-32), 1,3,3,3-pentafluoropropane (HFO-1234ze), pentafluoro-ethane (HFC-125), fluoroethane (HFC-161), 1,1,2,2,3,3-hexafluoropropane (HFC-236ca), 1,1,1,2,3,3-hexafluoropropane (HFC-236ea), 1,1,1,3,3,3-hexafluoropropane (HFC-236fa), 1,1,1,2,2,3-hexafluoropropane (HFC-245 ca), 1,1,2,3,3-pentafluoropropane (HFC-245 ea), 1,1,1,2,3 pentafluoropropane (HFC-245eb), 1,1,1,3,3-pentafluoropropane (HFC-245fa), 1,1,1,4,4,4-hexafluorobutane (HFC-356mff), 1,1,1,3,3-pentafluorobutane (HFC-365mfc), and combinations thereof. In some exemplary embodiments, the blowing agent comprises HFC-152a. Exemplary HFC blowing agents or blends thereof are commercially available under the tradename FORMACEL™, including but not limited to FORMACEL™ B and FORMACEL™ Z6.

Exemplary blowing agent compositions comprise 15 wt. % to 60 wt. % of a fluorinated alkene selected from HFO-1336mzz, HFO-1234ze, or mixtures thereof, 40 wt. % to 85 wt. % of HFC-152a, and optionally a balance of carbon dioxide, based on the total weight of the blowing agent composition, including all endpoints and subranges therebetween. Stated differently, the exemplary blowing agent compositions can comprise 2.0 wt. % to 4.5 wt. % HFO-1336mzz, 3.5 wt. % to 5.0 wt. % HFC-152a, and optionally a balance of carbon dioxide, based on the total weight of the foamable polymer composition, including compositions comprising 2.5 wt. % to 4.0 wt. % HFO-1336mzz, 4.2 wt. % to 4.9 wt. % HFC-152a, and optionally carbon dioxide, based on the total weight of the foamable polymer composition. Further exemplary blowing agent compositions can comprise 3.0 wt. % to 5.0 wt. % HFO-1234ze, 2.5 wt. % to 4.5 wt. % HFC-152a, and optionally carbon dioxide, based on the total weight of the foamable polymer composition, including compositions comprising 3.5 wt. % to 4.5 wt. % HFO-1234ze, 3.0 wt. % to 3.9 wt. % HFC-152a, and optionally carbon dioxide, based on the total weight of the foamable polymer composition.

The blowing agent can also comprise one or more hydrochlorofluoroolefins (HCFO), such as HCFO-1233; 1-chloro-1,2,2,2-tetrafluoroethane (HCFC-124); 1,1-dichloro-1-fluoroethane (HCFC-141b); 1,1,1,2-tetrafluoroethane (HFC-134a); 1,1,2,2-tetrafluoroethane (HFC-134); 1-chloro-1,1-difluoroethane (HCFC-142b); 1,1,1,3,3-pentafluorobutane (HFC- 365mfc); 1,1,1,2,3,3,3-heptafluoropropane (HFC-227ea); trichlorofluoromethane (CFC-11); dichlorodifluoromethane (CFC-12); and dichlorofluoromethane (HCFC-22).

The term "HCFO-1233" is used herein to refer to all trifluoromonochloropropenes. Among the trifluoromonochloropropenes are included both cis- and trans-1,1,1-trifluo-3,chlororopropene (HCFO-1233zd or 1233zd). The term "HCFO-1233zd" or "1233zd" is used herein generically to refer to 1,1,1-trifluo-3-chloro-propene, independent of whether it is the cis- or trans-form. The terms "cis HCFO-1233zd" and "trans HCFO-1233zd" are used herein to describe the cis- and trans-forms or trans-isomer of 1,1,1-trifluo,3-chlororopropene, respectively.

In some exemplary embodiments, the blowing agent composition includes two or more blowing agents, such as a hydrocarbon and carbon dioxide. In other exemplary embodiments, the blowing agent formulation can be free of carbon dioxide and/or water. In various exemplary embodiments, the blowing agent composition is free of a hydrofluorocarbon.

In any of the exemplary embodiments, the blowing agent can comprise or consist of $CO_2$. Optionally, the $CO_2$ blowing agent can include one or more co-blowing agents (e.g., a hydrocarbon, an HFO, and/or HFC) and, optionally, one or more solubilizers (e.g., methyl formate, methylal, ethanol, isobutane, propylene carbonate, etc.). The $CO_2$ can be present in an amount of 25 wt. % or more, 50 wt. % or more, 55 wt. % or more, 60 wt. % or more, 65 wt. % or more, 70 wt. % or more, 75 wt. % or more, 80 wt. % or more, 85 wt. % or more, 90 wt. % or more, 92 wt. % or more, 95 wt. % or more, 96 wt. % or more, or even 98 wt. % or more based on a total weight of the blowing agent composition.

When present, solubilizers, such as methyl formate, methylal, ethanol, isobutane, propylene carbonate, etc., can be included in the foamable polymer composition in amounts up to 5 wt. %, based on the total weight of the foamable polymer composition, including in amounts between 0.1 wt. % and 4.5 wt. %, 0.25 wt. % and 4 wt. %, 0.5 wt. % and 3.5 wt. %, between 0.75 and 3.25 wt. %, 1 and 3 wt. %, 1.25 and 2.5 wt. %, and 1.3 and 2 wt. %, based on the total weight of the foamable polymer composition.

Exemplary blowing agent compositions comprise 0 to 60 wt. % of a fluorinated alkene selected from HFO-1336mzz, HFO-1234ze, or mixtures thereof, and 40 wt. % to 100 wt. % of carbon dioxide, based on the total weight of the blowing agent composition, including all endpoints and subranges therebetween. Stated differently, the exemplary blowing agent compositions can comprise 0 to 4 wt. % of a fluorinated alkene and 2.5 wt. % to 7 wt. % carbon dioxide, based on the total weight of the foamable polymer composition, including compositions comprising no greater than 3 wt. % of a fluorinated alkene and at least 2 wt. % carbon dioxide, based on the total weight of the foamable polymer composition. Further exemplary blowing agent compositions can comprise 0.2 to 2 wt. % of a fluorinated alkene and 2.5 wt. % to 6 wt. % carbon dioxide, based on the total weight of the foamable polymer composition.

Exemplary blowing agent compositions can comprise 1 to 5 wt. % carbon dioxide and 0.2 to 3.5 wt. % of one or more solubilizer, such as methyl formate, methylal, ethanol, isobutane, propylene carbonate, etc., based on the total weight of the foamable polymer composition, including compositions comprising 1.8 to 4 wt. % carbon dioxide and 0.7 to 2.5 wt. % of one or more solubilizer, and compositions comprising 2 to 3.6 wt. % carbon dioxide and 0.9 to 2 wt. % of one or more solubilizer, based on the total weight of the foamable polymer composition. Further exemplary blowing agent compositions can comprise 2.5 to 3.5 wt. % of a carbon dioxide and 1 to 1.7 wt. % methyl formate (or other suitable solubilizer), based on the total weight of the foamable polymer composition. In these or other embodiments, the blowing agent compositions can include a limited amount of fluorinated alkene, such as no greater than 3 wt. %, based on the total weight of the foamable polymer composition, including amounts between 0 and 2.8 wt. %, between 0.2 and 2.6 wt. %, between 0.5 and 2.4 wt. %, between 0.8 and 2.1 wt. %, between 1 and 1.8 wt. %, between 1.2 and 1.6 wt. %, including all endpoints and subranges therebetween.

Further exemplary blowing agent compositions can include 50 wt. % to 100 wt. % $CO_2$ and 0 wt. % to 50 wt. % of one or more hydrocarbons, such as isobutane, 60 wt. % to 99 wt. % $CO_2$ and 1 wt. % to 40 wt. % of one or more hydrocarbons, 70 wt. % to 98 wt. % $CO_2$ and 2 wt. % to 30 wt. % of one or more hydrocarbons, and 80 wt. % to 96 wt. % $CO_2$ and 3 wt. % to 12 wt. % of one or more hydrocarbons, including all endpoints and subranges therebetween.

When characterizing the blowing agent by its weight percent present in the foamable polymer composition, the blowing agent composition is present in at least 2 wt. %, including at least 2.8 wt. %, at least 3 wt. %, at least 3.3 wt. %, at least 3.5 wt. %, at least 3.8 wt. %, at least 4 wt. %, at least 4.3 wt. %, at least 4.5 wt. %, at least 4.7 wt. %, and at least 5 wt. %. In any of the exemplary embodiments, the blowing agent can be present in the foamable polymer composition in an amount no greater than 10 wt. %, including amounts no greater than 9 wt. %, no greater than 8.5 wt. %, no greater than 8 wt. %, no greater than 7.8 wt. %, no greater than 7.5 wt. %, no greater than 7.2 wt. %, no greater than 7 wt. %, no greater than 6.9 wt. %, no greater than 6.8 wt. %, no greater than 6.65 wt. %, no greater than 6.5 wt. %, no greater than 6 wt. %, no greater than 5.8 wt. %, no greater than 5.5 wt. %, no greater than 5 wt. %, no greater than 4.9 wt. %, and no greater than 4.8 wt. %. In any of the aspects contemplated herein, the blowing agent composition can be present in the foamable composition in an amount between 2 wt. % and 7 wt. %, including between 2.5 wt. % and 6.8 wt. %, between 2.7 wt. % and 6.5 wt. %, between 2.9 wt. % and 6 wt. %, and between 3 wt. % and 5.5 wt. %.

The amount of blowing agent can alternatively be characterized by the molar amount of blowing agent composition per 100 grams of the of the polymer composition. Thus, when characterized in this way the blowing agent composition can be present in the foamable polymer composition in an amount between 0.001 moles and less than 0.1 moles per 100 grams of the of the polymer, including between 0.01 moles and 0.09 moles, between 0.03 moles and 0.08 moles, and between 0.04 moles and 0.075 moles per 100 grams of the of the polymer composition.

In embodiments in which the barrier coating composition is injected into the screw feeder or otherwise incorporated into the foamable polymer mixture, it should be appreciated that water included in the barrier coating composition add to the amount and, thus, the blowing power, of the blowing agent.

It has been surprisingly discovered that the use of the barrier coating composition as described herein can enable the reduction or elimination of fluorinated blowing agents to yield a polymer insulation layer 106 with sufficient insulation value, as compared to an otherwise identical foam product without the barrier coating. For instance, conventionally, to achieve a polymer insulation layer 106 with an R-value of at least 5, a certain minimum level of fluorinated blowing agent was necessary. Although more accessible, cost effective, and environmentally friendly, $CO_2$ could not comprise the majority of a blowing agent composition, as it would diffuse from the foam almost upon production, and thereby have unacceptably low insulation values. However, in some exemplary embodiments, the amount of fluorinated blowing agent can be reduced and replaced with $CO_2$, without negatively impacting thermal performance. Accordingly, although the total amount of blowing agent used in the polymer insulation layer 106 can not change, the amount of fluorinated blowing agent can be reduced by at least 15 wt. %, at least 20 wt. %, at least 25 wt. %, at least 30 wt. %, at least 35 wt. %, at least 40 wt. %, at least 50 wt. %, at least 55 wt. %, or at least 50 wt. %, and replaced with $CO_2$, and still produce a polymer insulation layer 106 with an insulation value of at least R-5.

Optional additives such as infrared attenuating agents, processing aids, nucleating agents, plasticizing agents, pigments, elastomers, extrusion aids, antioxidants, fillers, antistatic agents, biocides, termite-ocide, surfactants, colorants, oils, waxes, flame retardant synergists, and/or UV absorbers/stabilizers can be incorporated into the foamable composition. These optional additives can be included in amounts necessary to obtain desired characteristics of the foamable gel or resultant extruded foam products. The additives can be added to the foamable composition or they can be incorporated in the foamable composition before, during, or after the polymerization process used to make the polymer.

As mentioned above, the foamable composition can further contain at least one infrared attenuating agent (IAA) to increase the R-value of the resulting foam product. Non-limiting examples of suitable infrared attenuating agents for use in the present composition include graphite, including nanographite, carbon black, powdered amorphous carbon, asphalt, granulated asphalt, milled glass, talc, fiber glass strands, mica, black iron oxide, metal flakes (for example, aluminum flakes), carbon nanotube, nanographene platelets, carbon nanofiber, activated carbon, titanium dioxide, and combinations thereof. In some exemplary embodiments, the infrared attenuating agent is present in the foamable composition in an amount from 0 to 5.0% by weight of the total composition. In other embodiments, the infrared attenuating agent can be present in an amount from 0.05 to 3.0% by weight, from 0.08 to 2.0% by weight, or from 0.1 to 1.0% by weight. In some exemplary embodiments, the infrared attenuating agent is present in the composition in an amount less than or equal to 0.5% by weight.

In at least one exemplary embodiment, the infrared attenuating agent is nanographite. The nanographite can be multilayered by furnace high temperature expansion from acid-treated natural graphite or microwave heating expansion from moisture saturated natural graphite. In addition, the nanographite can be a multi-layered nanographite which has at least one dimension with a thickness less than 100 nm. In some exemplary embodiments, the graphite can be mechanically treated such as by air jet milling to pulverize the nanographite particles. The pulverization of the particles ensures that the nanographite flake and other dimensions of the particles are less than 150 microns.

The nanographite may or may not be chemically or surface modified and can be compounded in a polyethylene methyl acrylate copolymer (EMA), which is used both as a medium and a carrier for the nanographite. Other possible carriers for the nanographite include polymer carriers such as, but not limited to, polymethyl methacrylate (PMMA), polystyrene, polyvinyl alcohol (PVOH), and polyvinyl acetate (PVA). In exemplary embodiments, the nanographite is substantially evenly distributed throughout the foam. As used herein, the phrase "substantially evenly distributed" is meant to indicate that the substance (for example, nanographite) is evenly distributed or nearly evenly distributed within the foam.

Although the infrared attenuating agent increases the R-value for foams that include HFO and/or HFC blowing agents, the addition of infrared attenuating agents also tends to decrease the cell size of the cells in the foam, which results in undesirable final foamed products. In particular, small cell sizes tend to increase board bulk density, increase product cost, and reduce the process window during the extrusion process. However, it has been surprisingly discovered that the amount of infrared attenuating agent included in the foamable composition can be reduced, or eliminated when barrier coating compositions are applied to or within the polymer foam. Accordingly, in any of the exemplary embodiments, the foamable polymer composition and resulting foam product include less than 0.25 wt. % of an infrared attenuating agent, such as graphite, including less than 0.2 wt. %, less than 0.15 wt. %, less than 0.10 wt. %, and less than 0.05 wt. %. In any of the exemplary embodiments, the foamable composition and resulting foam product are free of an infrared attenuating agent, such as graphite. It should be appreciated that such embodiments, a nucleator (e.g., inorganic substances such as talc, clay, and/or calcium carbonate) can be included in the foamable composition to control the size of the foam cells.

The foamable composition can further contain a fire retarding agent in an amount up to 5.0% or more by weight. For example, fire retardant chemicals can be added in the extruded foam manufacturing process to impart fire retardant characteristics to the extruded foam products. Non-limiting examples of suitable fire retardant chemicals for use in the inventive composition include brominated aliphatic compounds such as hexabromocyclododecane (HBCD) and pentabromocyclohexane, brominated phenyl ethers, esters of tetrabromophthalic acid, halogenated polymer flame retardant such as brominated polymer flame retardant, phosphoric compounds, and combinations thereof.

Once the blowing agent composition, barrier coating composition, and optional additional additives have been introduced into the foamable polymer composition, the resulting mixture is subjected to some additional blending sufficient to distribute each of the additives generally uniformly throughout the polymer composition to obtain an extrusion or expandable composition.

The foamable polymer composition disclosed herein can produce a rigid, foamed polymer insulation layer 106 via any manufacturing process, such as extrusion, expansion, reaction mixture, spray, bubbling, and the like. Such foam products have a cellular structure with cells defined by cell membranes and struts. Struts are formed at the intersection of the cell membranes, with the cell membranes covering interconnecting cellular windows between the struts.

In some exemplary embodiments, the polymer insulation layer 106 has an average density of less than 10 pcf (pound per cubic foot), including less than 5 pcf, less than 3 pcf, and less than 2.5 pcf when produced at atmospheric conditions. However, the density can be less when the polymer insulation layer 106 is produced under vacuum. In any of the exemplary embodiments, the polymer insulation layer 106 has a density of 2.40 pcf or less, or 2.25 pcf or less, or 2.20 pcf or less, or 2.00 pcf or less, or 1.60 pcf or less. In any of the exemplary embodiments, the polymer insulation layer 106 has an average density between 1.40 pcf and 2.40 pcf, including between 1.40 pcf and 2.25 pcf, between 1.40 pcf and 2.00 pcf, between 1.40 pcf and 1.60 pcf, between 1.45 pcf and 1.55 pcf, between 2.10 pcf and 2.30 pcf, and between 2.20 pcf and 2.28 pcf.

It is to be appreciated that the phrase "substantially closed cell" is meant to indicate that all or nearly all of the cells in the cellular structure of the insulation layer 106 are closed. For example, "substantially closed cell" can be meant to indicate that not more than 30.0% of the cells are open cells, and particularly, not more than 10.0%, or more than 5.0% are open cells, or otherwise "non-closed" cells. The closed cell structure helps to increase the R-value of a formed, foamed insulation layer 106. It is to be appreciated, however, that it is within the purview of various embodiments to produce an open cell structure, although such an open cell structure is not an exemplary embodiment.

The average cell size of the polymer insulation layer 106 can range from 0.005 mm (5 microns) to 0.6 mm (600 microns) and, in some exemplary embodiments, from 0.05 mm (50 microns) to 0.4 mm (400 microns), or from 0.1 mm (100 microns) to 0.2 mm (200 microns).

Once coated with the subject barrier coating composition, the coated insulation layer 106 disclosed herein demonstrates insulation values (R-values) of greater than 4.5 per inch and maintains an R-value of at least 4.5 after 180 days. In any of the exemplary embodiments, the coated insulation layer 106 can have an R-value per inch after 180 days of at least 5, or at least 5.3 or at least 5.5, or at least 5.7, or at least 6. In any of the exemplary embodiments, the R-value per inch can be at least 5, or at least 5.5, or at least 6, or at least 6.5, or at least 7, after 7 days, 25 days, 60 days, or after 180 days. Accordingly, in some embodiments, the insulation layer 106 can comprise an R-value of 5 to greater than 7.0 or 8.0 per inch.

The foamable composition additionally can produce foam products that have a high compressive strength, which defines the capacity of a foam material to withstand axially directed pushing forces. In some exemplary embodiments, the foam have a compressive strength within the range of between about 6 and 120 psi. In some exemplary embodiments, the foam product has a compressive strength between 10 and 110 psi, including between 20 and 100 psi, between 30 and 80 psi, and between 35 and 60 psi. In various exemplary embodiments, the foam product has a compressive strength between 40 and 50 psi.

The insulation layer 106 contemplated herein can be used to form a variety of products, such as a rigid insulation board, insulation foam, packaging product, building insulation (e.g., residential, commercial, industrial building(s)), underground insulation (for example, highway, airport runway, railway, and underground utility insulation), and the like. The insulation layer 106 can further be utilized in multi-material sheathing systems. The sheathing system 100 can include one or more panels capable of being attached to a frame of a structure to form a sheath that envelopes at least a portion of a structure as a wall portion (e.g., vertical surface) and/or as a roofing portion. The panels can comprise any combination of one or more structural portion(s), one or more barrier layer(s), and one or more insulation panels. The structural portion can comprise a single-layer material or a multiple-layer construction. For example, the structural portion of the panel can comprise a variety of different materials, such as fiberglass, wood, wood composite materials (i.e., oriented strand board ("OSB")), magnesium oxide board, a plywood layer, a foil poly structural layer, a high-density polyethylene (HDPE) layer, a polymer-based composite, or any other structural layer. In some embodiments, the structural portion is a structural barrier layer comprising fiberglass, polycarbonate, polypropylene, high-density polyethylene, or wood composite. The insulation layer 106 can comprise or consist of the subject insulation foam product disclosed herein. In any of the exemplary embodiments, the sheathing system 100 can comprise an insulation layer 106 adhered to a structural portion, or a barrier layer adhered to a first surface of an insulation layer 106 and a structural portion adhered to a second surface of the insulation layer 106.

Continuing now with FIG. 2A and FIG. 2B, the structural layer 104 which provides rigidity and structural support to the envelope of the building structure. Accordingly, the structural layer 104 can be comprised of any one or more materials that resist kinetic forces, such as polycarbonate or composites. Additional materials that can provide the rigidity and structural support that the structural layer 104 requires can be one or more of materials such as polypropylene, high density polyethylene (HDPE), or a wood composite. Structural layer 104 can comprise a polymer, polycarbonate, stainless steel, glass, polyester, polypropylene, polyethylene, acrylic, acrylonitrile styrene acrylate, cyclic olefin copolymer, polycyclohexylenedimethylene terephtalate, polyether ketone, polyaryletherketones, polyetherimide, polyethersulfone, polymethyl methacrylate, poly vinyl chloride, polyphthalamide, polyphenylene oxide, polyphenylene sulfide, recycled HDPE, any recycled plastic or polymer, polysulfone, or syndiotactic polystyrene. The polymer can comprise one or more of poly vinyl styrene, plexiglass, high density polypropylene (HDPP), hard plastic, soft plastic, polyethylene terephthalate, acrylonitrile butadiene styrene, thermoplastic, thermosets, elastomer, hemp, shellac, amber, wool, silk, natural rubber, cellulose, silicone, polybutylene terephthalate, styrene-butadiene rubber, or other polymers or co-polymers. In a further example, recycled materials, including recycled polycarbonate, can be used for the structural layer 104. Additionally, other recycled materials can also be considered for the structural layer 104, such as recycled plastics or composite materials made from reclaimed wood fibers and plastic.

In other aspects, the structural layer 104 can comprise a polymer composite formed from a polymer and at least one filler material. The addition of a filler material can add desired physical properties to the structural layer 104, such as texture, color, strength, reduced weight, or other physical properties. The polymer composite can comprise a filler material that is added to the polymer in a ratio by weight of between 1 percent by weight and 90 percent filler material to polymer. In further aspects, the filler material can comprise any amount of a powder, talc, calcium carbonate, calcium carbonate pellets, cellulose, sand, silica, magnesium oxide, aluminum oxide, clay, inorganic powder, a colorant, ground tire rubber, rubber, calcium sulfate, calcium silicate, barium sulfate, mica, kaolin, silicone dioxide, diatomaceous earth, minerals, fibrous glass, carbon fibers, glass, polymer beads, magnesium hydroxide, fly ash, polymer foam beads, masonry filler, wollastonite, short glass fibers, long glass fibers, glass beads, coal, dolomite, carbon black, silica, magnetite, hematite, halloysite, zinc oxide, titanium dioxide, $Al(OH)_3$, $Mg(OH)_2$, concrete filler, gravel, stone, sand, steel, aluminum, or any other material that can be added to the polymer of the structural layer 104. In alternative embodiments, organic filler, rice hulls, nut flour, wood flour, vegetable fibers, cotton fiber, starch, synthetic organic filler, rubber particles, chalk, quartz, granite, alumino-silicates, vermiculite, nepheline-senite, barium ferrite, barium titanate, molybdenum disulphide, potassium titanate, metal oxides, metal hydrates, metal powder, zinc, beryllium oxide, blowing agent, PBT, ceramics, or other materials that can be added to the polymer, can be used as the filler material. In another embodiment, glass fibers, carbon fibers, mineral fillers (e.g., calcium carbonate, talc, or mica), aramid fibers, glass beads, nanoclays, metal particles, natural fibers (e.g., hemp, jute, or flax), graphene, rubber particles, ceramic fillers (e.g., alumina or silica), recycled materials (e.g., plastic or rubber materials), wood fibers/flour, conductive fillers (e.g., carbon black or metal powders), flame retardant fillers (e.g., phosphorus-based compounds or halogenated additives) can be contemplated for use as the filler material.

In some embodiments, the filler material can have a size of up to 1 mm. The polymer composite can have filler material comprised of variously-sized substances from 1 micron to 1000 microns, 1 micron to 1 centimeter, or 10 mesh to 100 mesh, by way of non-limiting example. In an embodiment, the filler material can be added to the polymer in a ratio of 1 percent by weight up to 90 percent by weight of the polymer. In another embodiment, a ratio of between 30 percent by weight and 60 percent by weight of the polymer can be used for the filler material.

The sheathing system 100 can be milled or shaped into any desirable shape or size. Formed as a planar sheet (i.e. panel) in any one or more standard sizes (e.g., 1.319 m×2.438 m (4 ft.×8-ft.), 1.319 m×3.048 m (4 ft.×10 ft.), or 1.319 m×3.658 m (4 ft.×12 ft.)), the sheathing system 100 can be shaped or cut according to specific dimensions and/or design requirements (e.g., different geometric shapes). Using cutting or shaping tools available on a worksite (e.g., a circular saw) or precision tooling (e.g., a Computer Numerical Control (CNC) machine), each layer of the sheathing system 100 can be cut or milled accordingly.

Figure 12B:
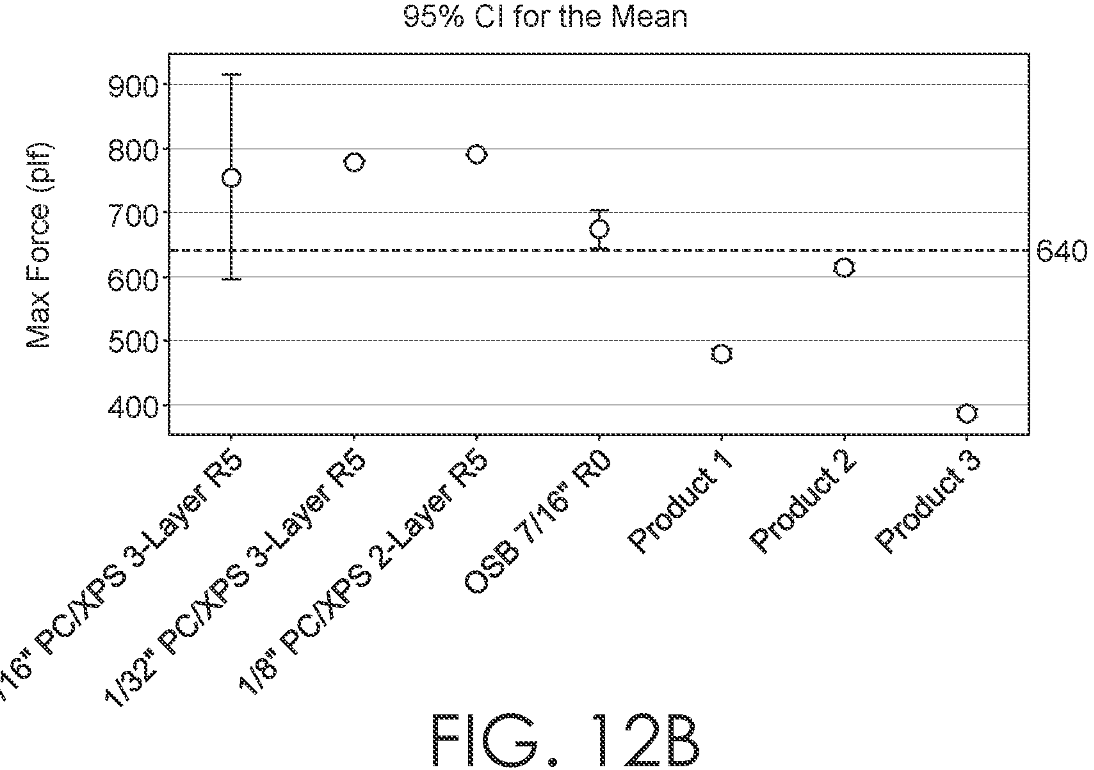

In an additional embodiment, the structural layer 104 can resist racking forces and exceed ASTM E72 industry standards for structural wall sheathing systems. The ASTM E72 standards determine the ability of the sheathing system 100 to deflect static load (i.e. resist racking). The resistance to racking for particular embodiments is described in further detail with respect to FIG. 12B. For example, in one embodiment, the sheathing system 100 can have the racking strength max force of greater than 640 pounds per linear foot (plf) according to the ASTM E72 test, which is greater than or equal to standard systems in the industry.

The structural layer 104 can be resistant to bulk water but permeable to water vapor. The structural layer 104 can be characterized by water vapor permeance in a range from about 0.1 U.S. perms to about 1.0 U.S. perms, and have a water vapor transmission rate from about 0.07 to about 7 $g/m^2/24$ hr. (at 73° F.-50% RH via ASTM E96 procedure A). Additional embodiments of the structural layer 104 have a water vapor permeance from about 0.1 to about 12 U.S. perms (at 73° F.-50% RH via ASTM E96 procedure B), and a liquid water transmission rate from about 1 to about 28 (grams/100 $in^2/24$ hr. via Cobb ring), per ASTM D5795.

Figures 3A, 3B:
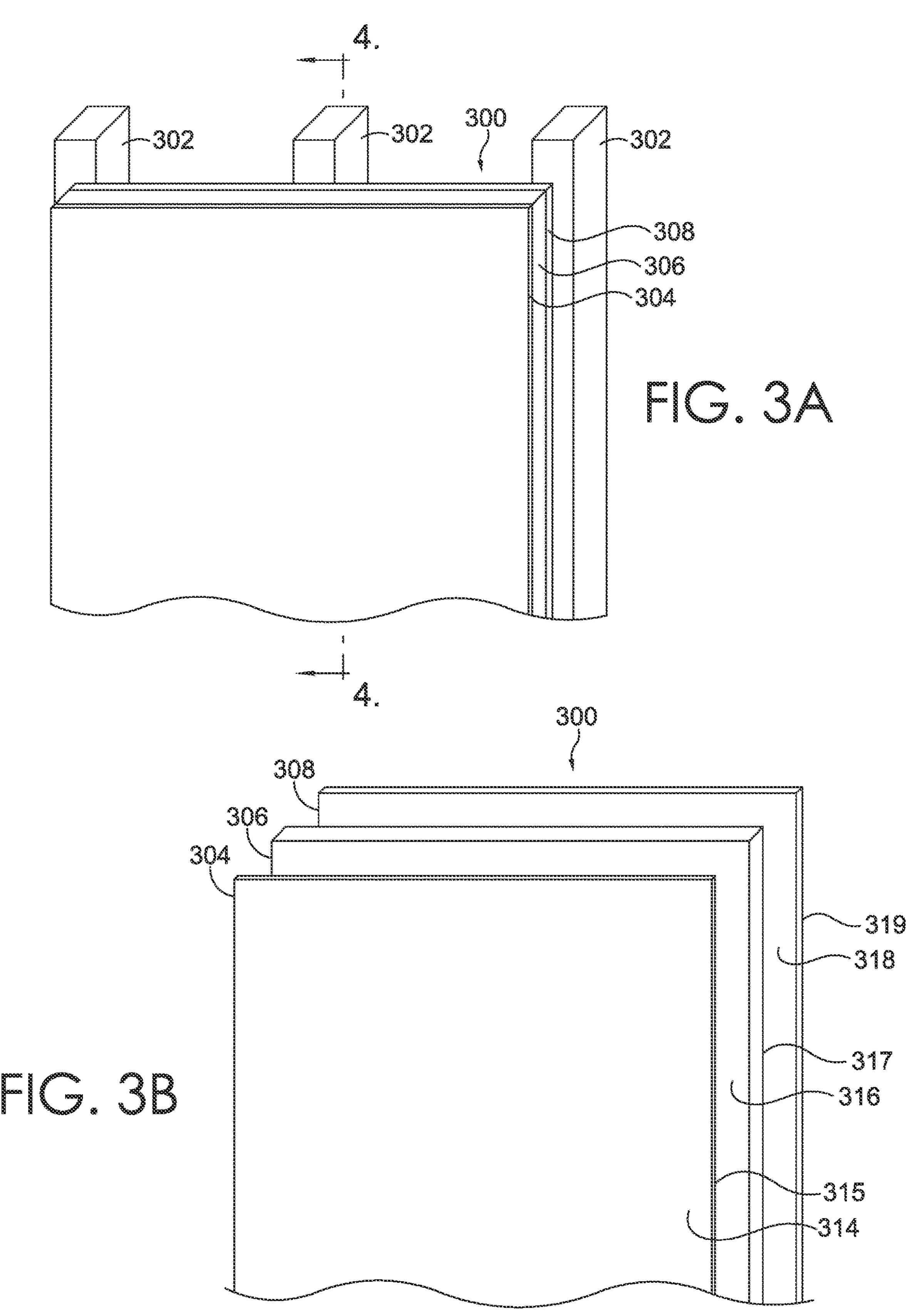
FIG. 3A depicts a perspective view of a three-dimensional sheathing system, in accordance with aspects hereof.
FIG. 3B depicts an exploded view of a three-dimensional sheathing system, in accordance with aspects hereof.

Turning now to FIG. 3A and FIG. 3B, a sheathing system 300 is illustrated having at least three layers. At a high level, the sheathing system 300 comprises the sheathing system 100 of FIGS. 1A-2B with the addition of a second structural layer 308; that is, the sheathing system 300 comprises a first structural layer 304, an insulation layer 306, and a second structural layer 308 (i.e., a "3-layer sheathing system"). Accordingly, the sheathing system 300 and each of the first structural layer 304 and the insulation layer 306 can have any one or more characteristics of the sheathing system 100, the structural layer 104, and the insulation layer 106, respectively, as described in relation to FIGS. 1A-2B. Additionally, the second structural layer 308 can have any one or more characteristics of the structural layer 104, as described in relation to FIGS. 1A-2B.

Figure 12C:
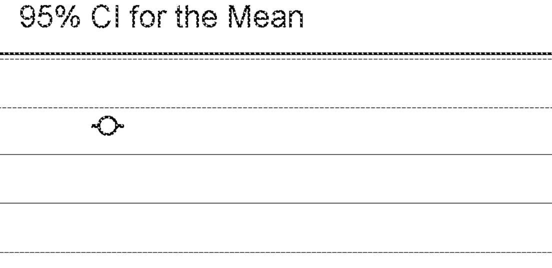
Figure 12D:
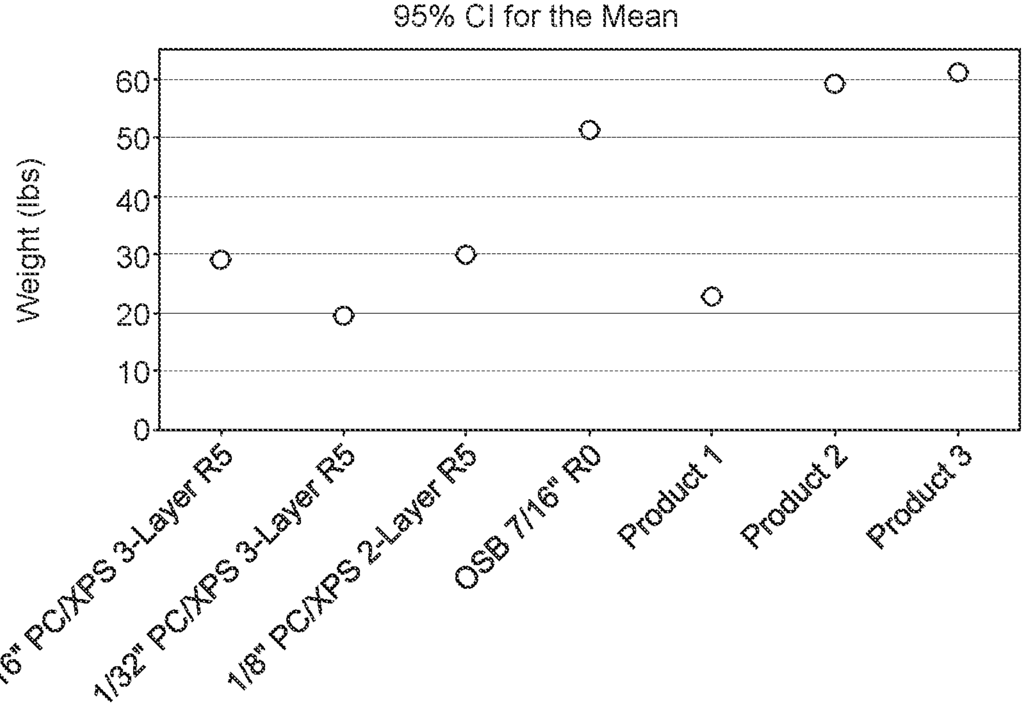
Figure 12E:
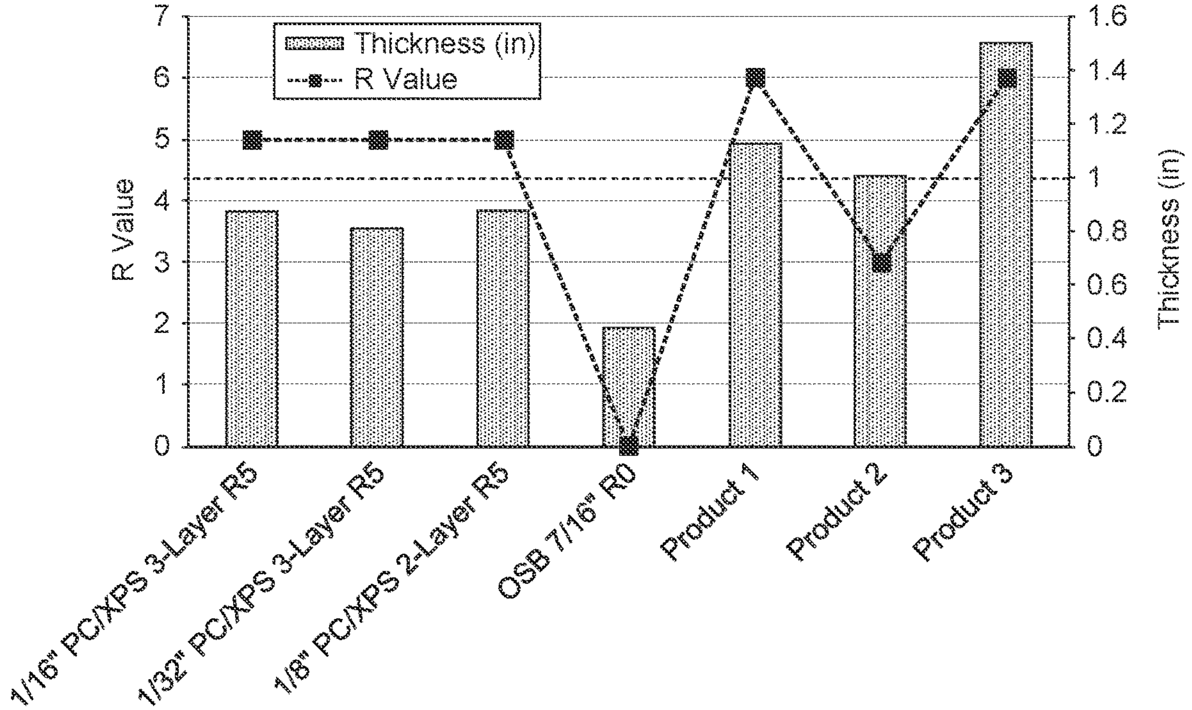
Figure 12F:
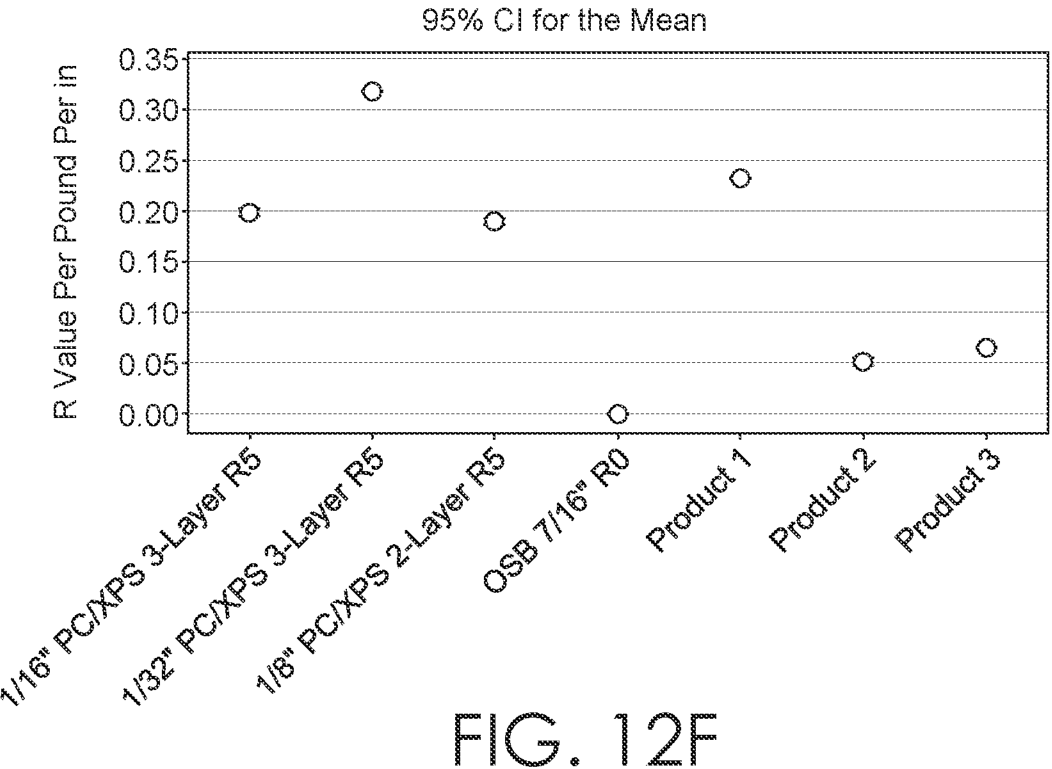
Figure 12G:
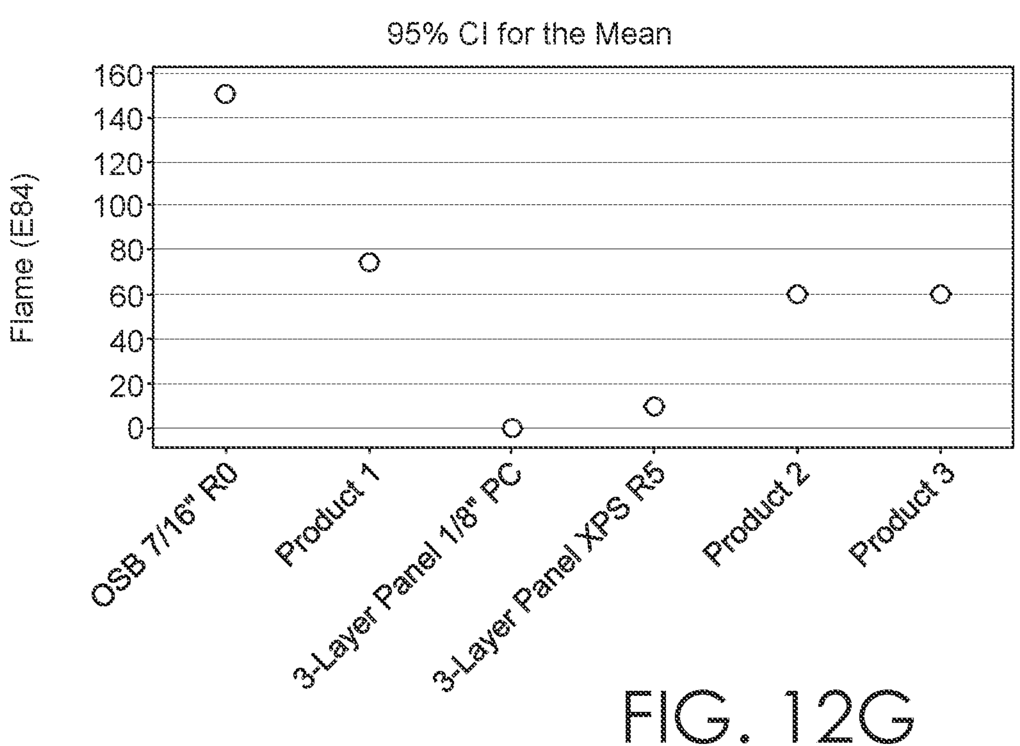
Figure 13A:
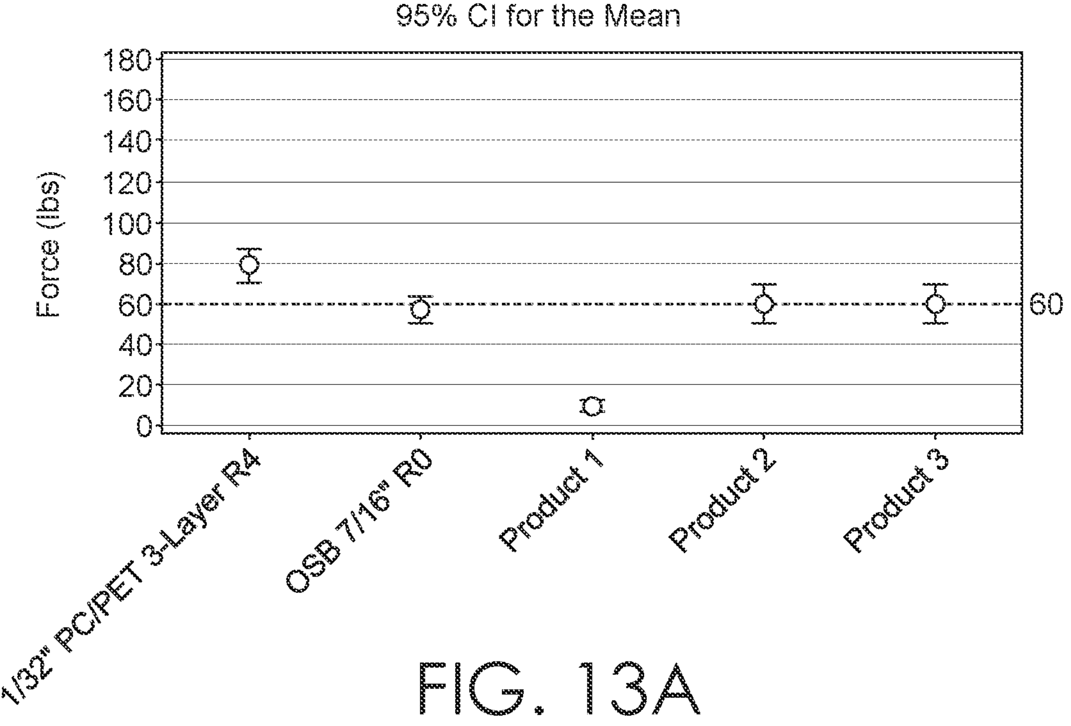
FIG. 13A through FIG. 13D depict exemplary physical data, in accordance with aspects hereof.
Figure 13B:
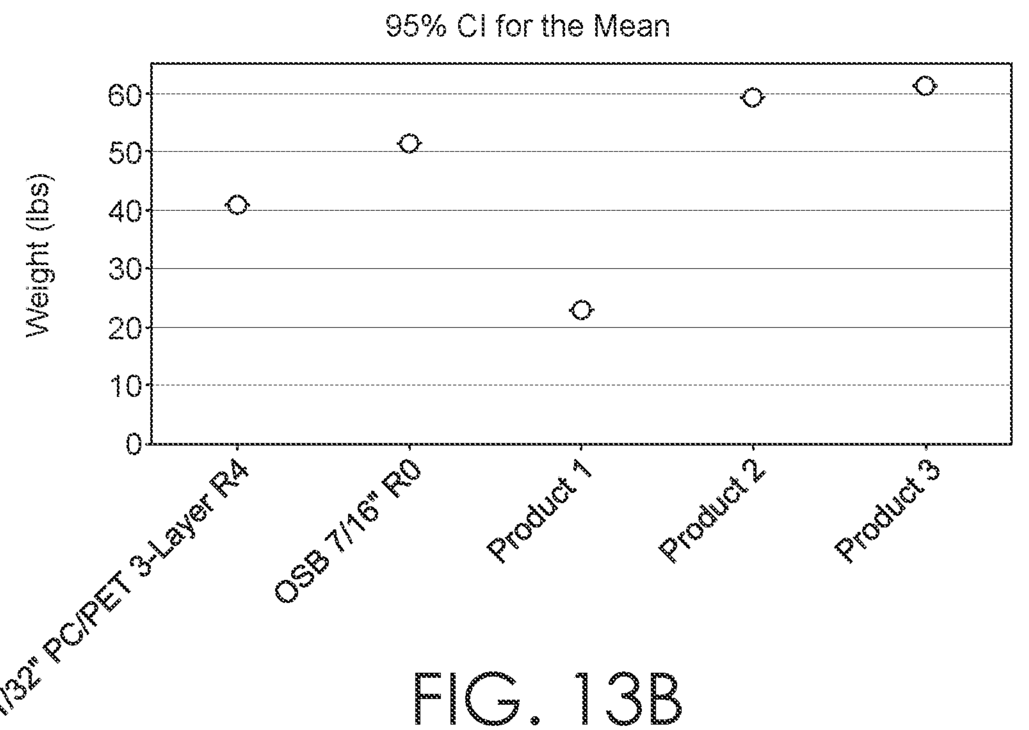
Figure 13C:
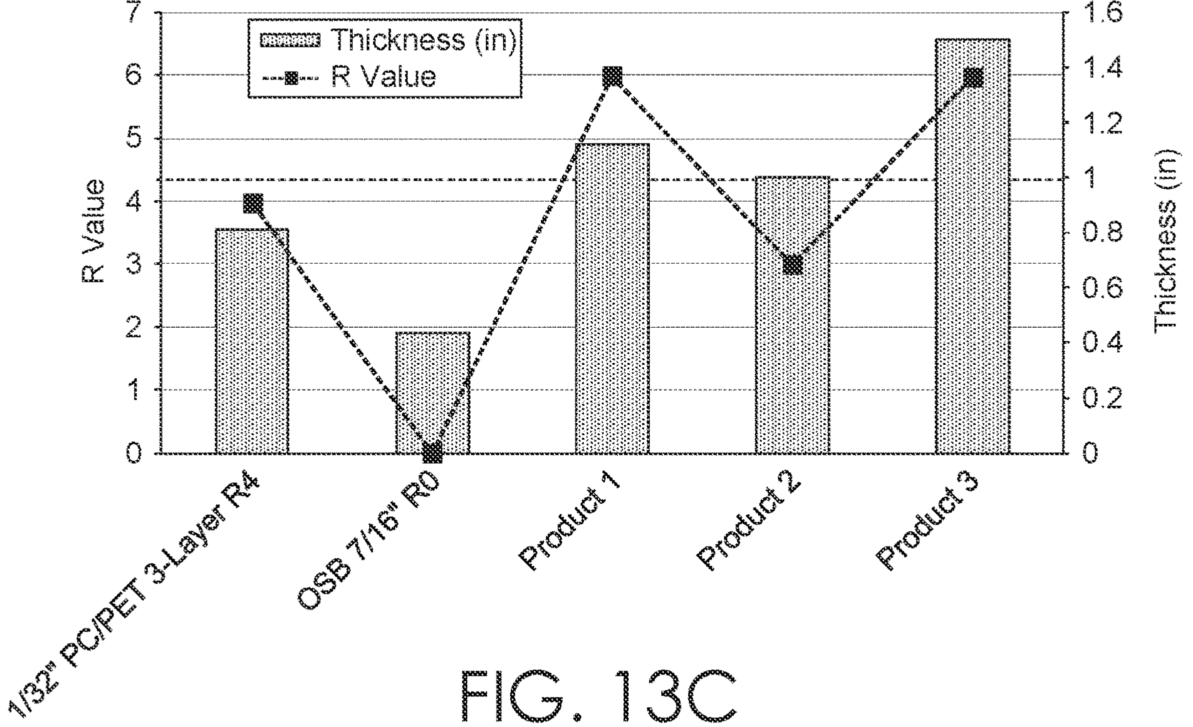
Figure 13D:
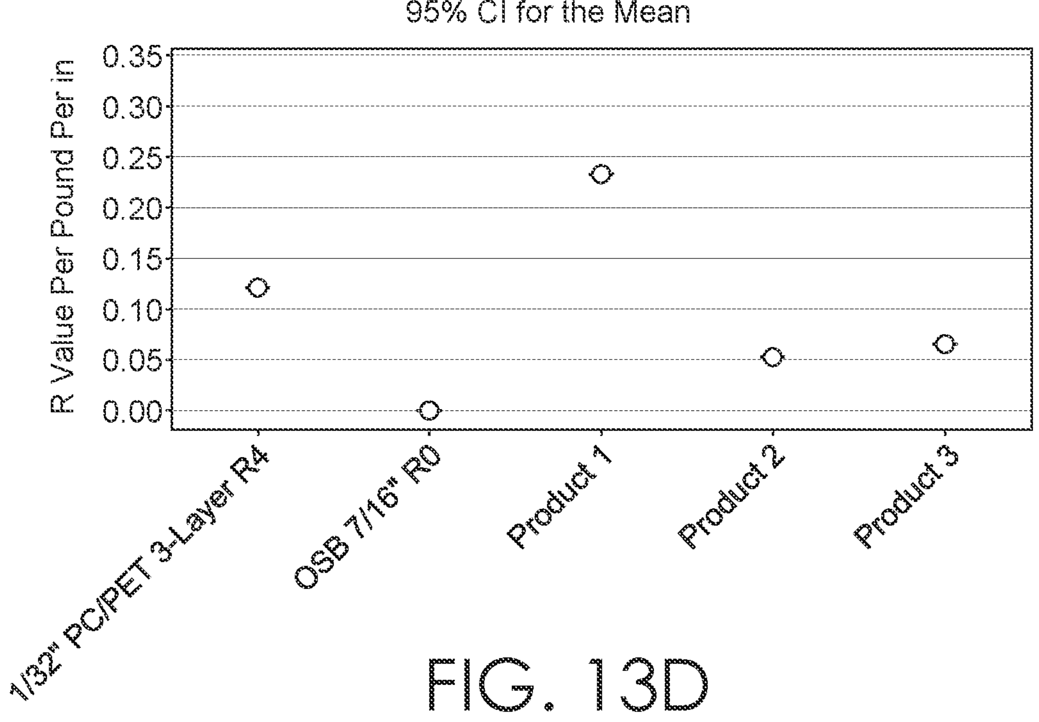
Figure 14A:
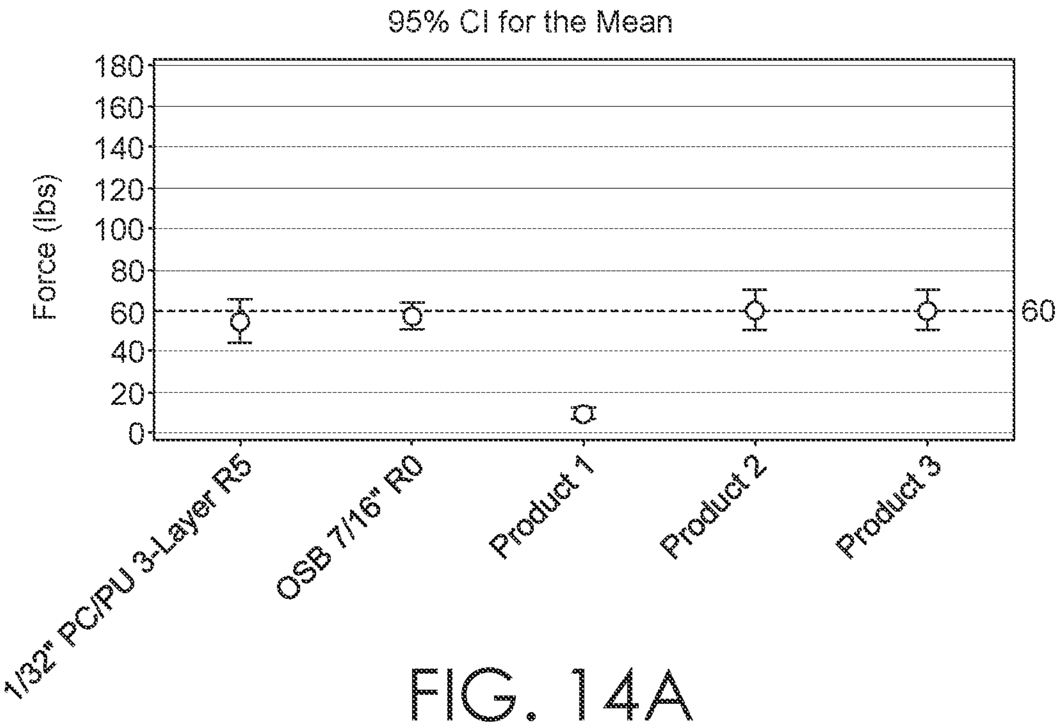
FIG. 14A through FIG. 14D depict exemplary physical data, in accordance with aspects hereof.
Figure 14B:
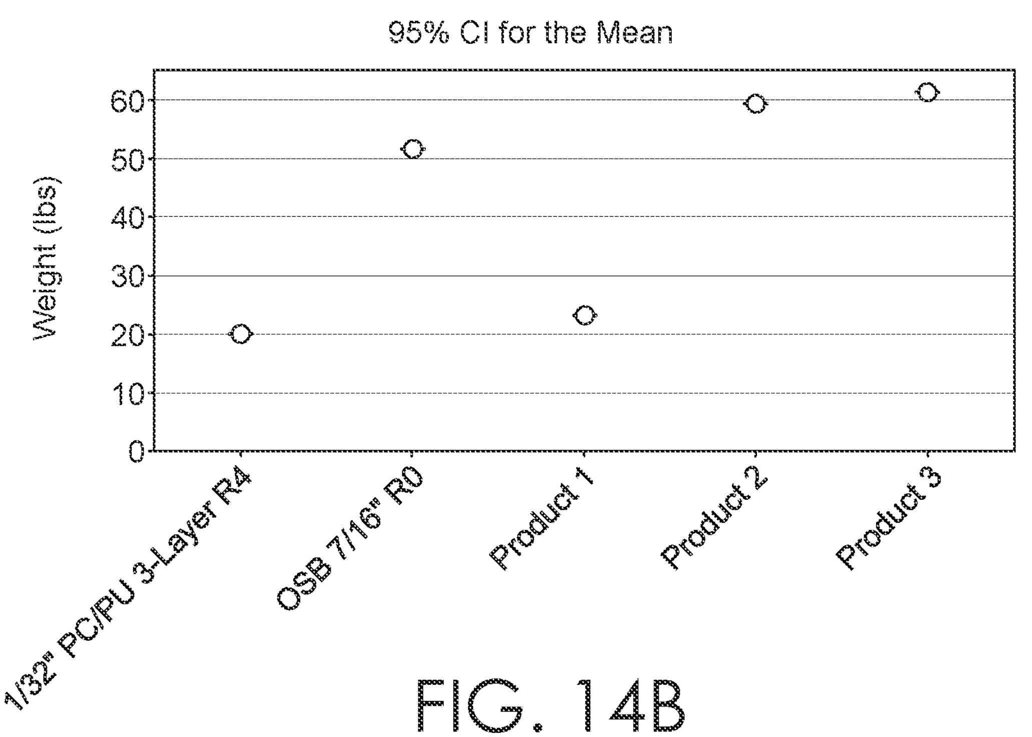
Figure 14C:
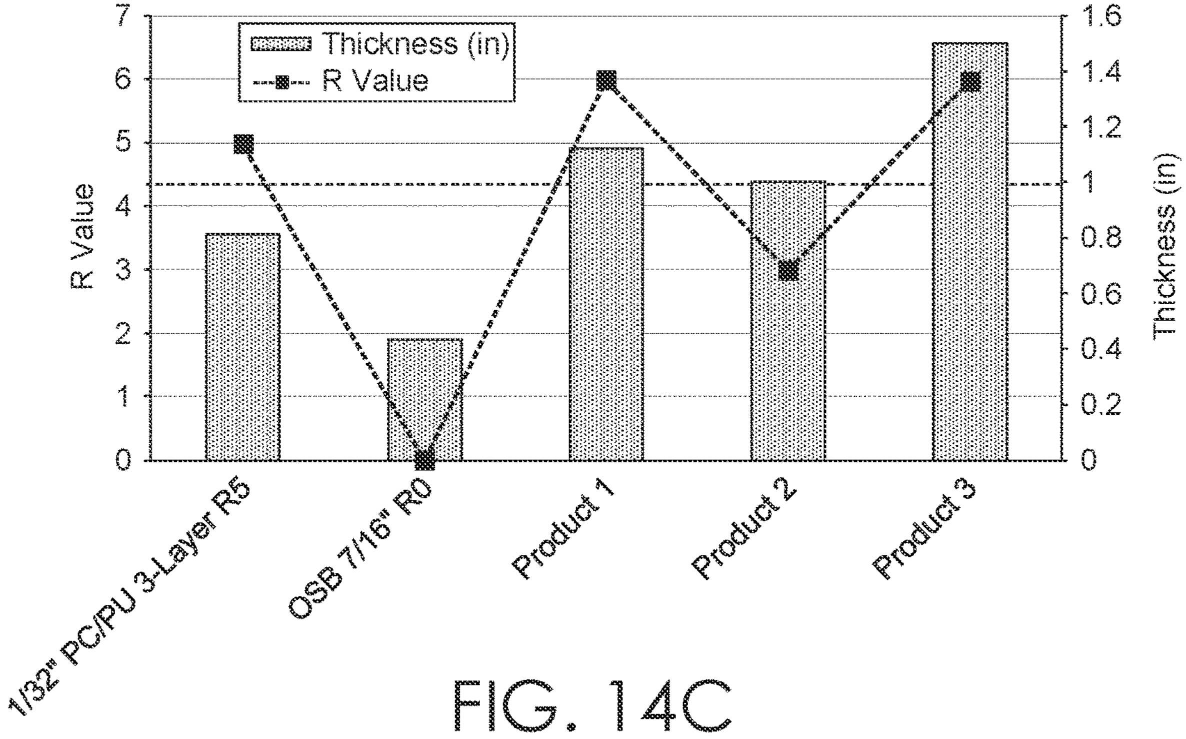
Figure 14D:
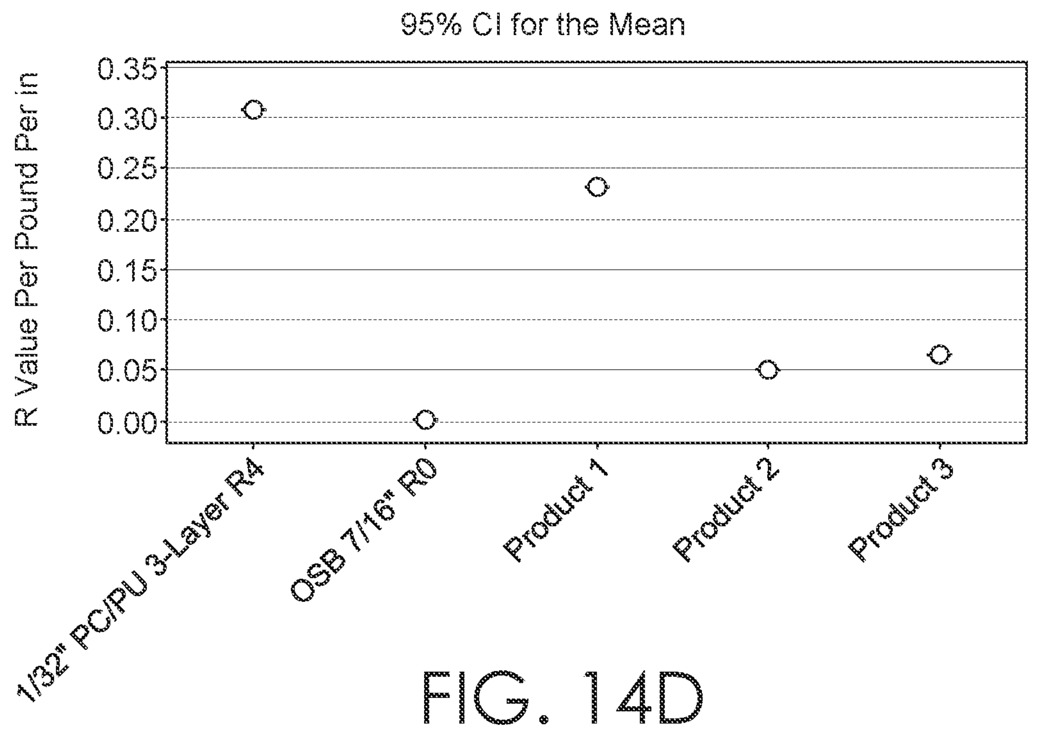
Figure 15:
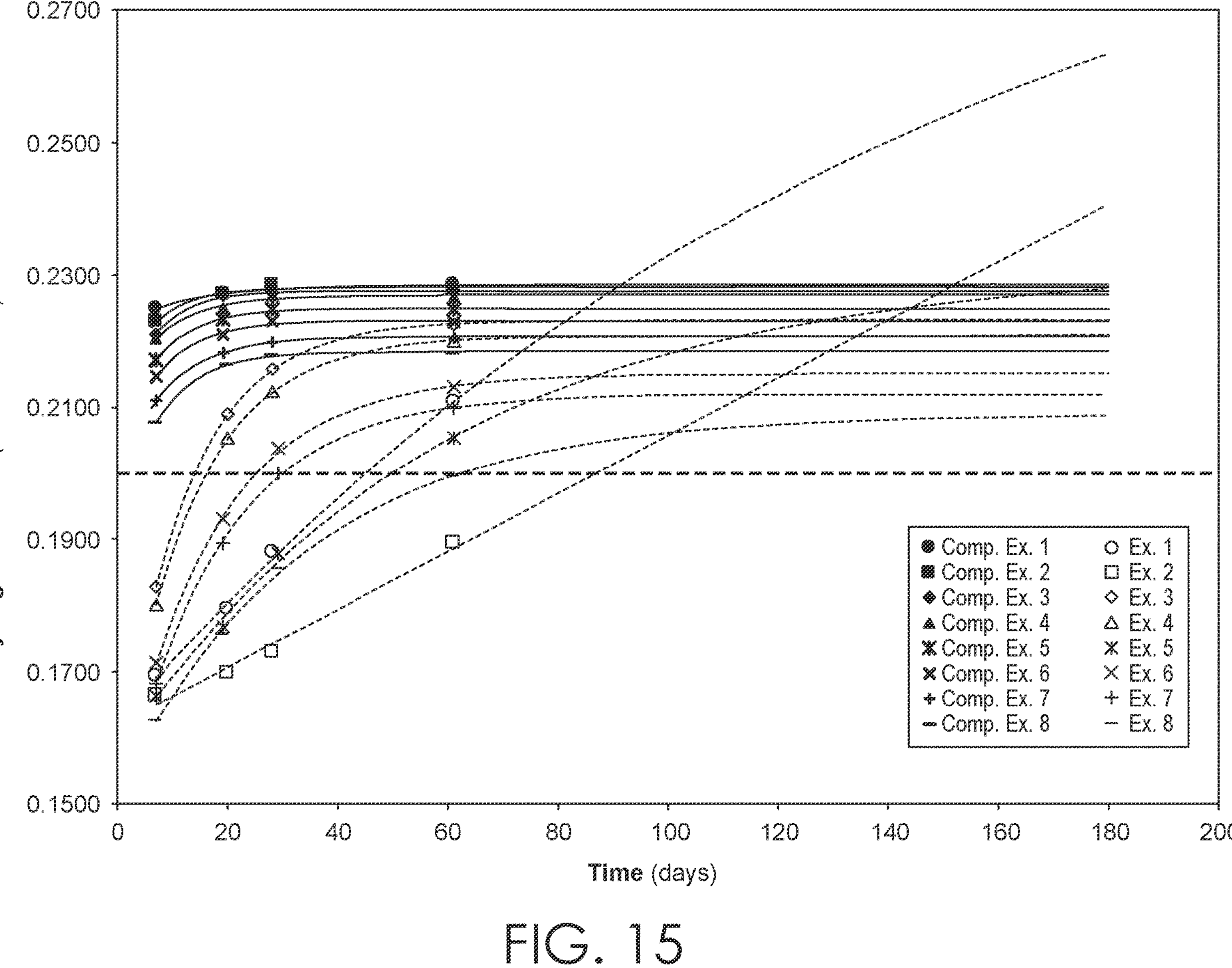
FIG. 15 is a graph showing the thermal conductivity k-value (y-axis) as a function of time (x-axis) for various barrier coating configurations according to Example 1.

The inclusion of both a first structural layer 304 and a second structural layer 308 can be advantageous as it provides weather resistance to both sides of the insulation layer 306. Additionally, with brief reference to FIG. 12C, the first structural layer 304 and the second structural layer 308 can provide improved racking resistance over a single structural layer. Other design and structural requirements for a particular intended use can make it advantageous to have a second structural layer rather than a single structural layer.

Looking back now to FIGS. 3A and 3B, examples of the sheathing system 300 are illustrated in accordance with an exemplary aspect hereof. As shown in FIG. 3B, the sheathing system 300 comprises a fourth surface 317 of the insulation layer 306 and a third surface 316 of the insulation layer 306 opposite the fourth surface 317. A thickness of the insulation layer 306 can be measured as a distance from the third surface 316 to the fourth surface 317. Further, the first structural layer 304 comprises a second surface 315 and a first surface 314 opposite the second surface 315. A thickness of the first structural layer 304 can be measured as a distance from the first surface 314 to the second surface 115. Additionally, the second structural layer 308 comprises a sixth surface 319 and a fifth surface 318 opposite the sixth surface 319. A thickness of the second structural layer 308 can be measured as a distance from the fifth surface 318 to the sixth surface 319.

The sheathing system 300 is formed by coupling the second surface 315 of the first structural layer 304 to the third surface 316 of the insulation layer 306. Additionally, the fourth surface 117 of the insulation layer 306 is coupled to the fifth surface 318 of the second structural layer 308. More specifically, the first structural layer 304 can be coupled to the insulation layer 306 by bonding, adhering, applying, or mechanically fastening one layer to the other. Additionally, the second structural layer 308 can be coupled to the insulation layer 306 by bonding, adhering, applying, or mechanically fastening one of the layers to the other. By way of example, the sheathing system 300 can be formed by applying a glue layer or adhesive to the second surface 315 of the first structural layer 304 or the third surface 316 of the insulation layer 306 and adhering one surface to the other. By way of further example, the sheathing system 300 can be formed by applying a glue layer or adhesive to the fourth surface 317 of the insulation layer 306 or the fourth surface 318 of the second structural layer 308 and adhering one surface to the other.

As discussed in regards to other aspects described herein, the ratio of thickness of the first structural layer 304 and the second structural layer 308 relative to the thickness of insulation layer 306 can vary based on an intended use of the disclosed sheathing system. For example, when greater structural strength is desired, such as in areas prone to high winds or seismic forces, the combined thickness of the first structural layer 304 and the second structural layer 308 can increase as a proportion of the overall thickness of the sheathing system, or the thickness as measured from the first surface 314 to the sixth surface 319. In a further example, when greater insulation is desired and strength can be sacrificed, such as in less temperate climates, the insulation layer can be a greater proportion of the overall thickness. In a preferred arrangement, the ratio of insulation layer 306 thickness relative to the combined thickness of the first structural layer 304 and the second structural layer 308 can be about 3:1. In an embodiment, a sheathing system 300 can have a ratio of insulation layer 306 thickness relative to a combined thickness of the first structural layer 304 and the second structural layer 308 of about 3:1 and an overall thickness of 1 inch. This embodiment would have a combined thickness of the first structural layer 304 and the second structural layer 308 of ¼ inch and a thickness of the insulation layer 306 of % inch. In some other embodiments, the ratio of insulation layer 306 thickness relative to a combined thickness of the first structural layer 304 and the second structural layer 308 can be 6:1, 5:1, 4:1, 2:1, 1.5:1, or 1:1, by way of non-limiting example. Additional ratios can be contemplated.

The purpose of the first structural layer 304 and the second structural layer 308 is to provide rigidity and structural support to the envelope of a building structure. Additionally, the material used for the first structural layer 304 and the second structural layer 308 can provide for other physical properties based on the intended use. For example, according to one or more design constraints, the sheathing system 300 can be spaced to have a particular external texture, weight, or other physical property. For example, in one embodiment the sheathing system 300 can require superior racking resistance due to high seismic activity. Additionally, the sheathing system 300 can require a particular texture, nail withdrawal force, or other physical properties to aid in the building envelope. Accordingly, the first structural layer 304 and the second structural layer 308 can be comprised of any one or more materials that resist racking forces, are lightweight, have one or more textures, resist nail withdrawal, or provide other desired physical properties. In one embodiment, both the first structural layer 304 and the second structural layer 308 can comprise the same material. In an alternative embodiment, if different physical properties are desired for the first structural layer 304 and the second structural layer 308, they can each be formed from different materials.

As described above, the first structural layer 304 and the second structural layer 308 can have differing physical requirements and thus can have differing thicknesses. In one example, the first structural layer 304 can be exposed to external impact forces and can require a thicker material to resist such an impact. Alternatively, the second structural layer 308 can not require such impact resistance and can thus be thinner than the first structural layer 304. As such, the first structural layer 304 can have a thickness in a range of 1/64 inch and 1 inch. The second structural layer 308 can have a thickness in a range of 1/64 inch and 1 inch. The insulation layer 306 can have a thickness in a range of ¼ inch and 1½ inches. The combined thickness of the first structural layer 304, the insulation layer 306, and the second structural layer 308 can be in a range of ½ inch and 2 inches. In an exemplary configuration, the thickness of the first structural layer 304, the insulation layer 306, and the second structural layer 308 is equal to or less than 1 inch, having an R-value of 5 or greater. Furthermore, alternative embodiments have an R-value-to-thickness ratio of at least 5, resulting in a 2-inch system with an R-value of 10.

Figure 4:
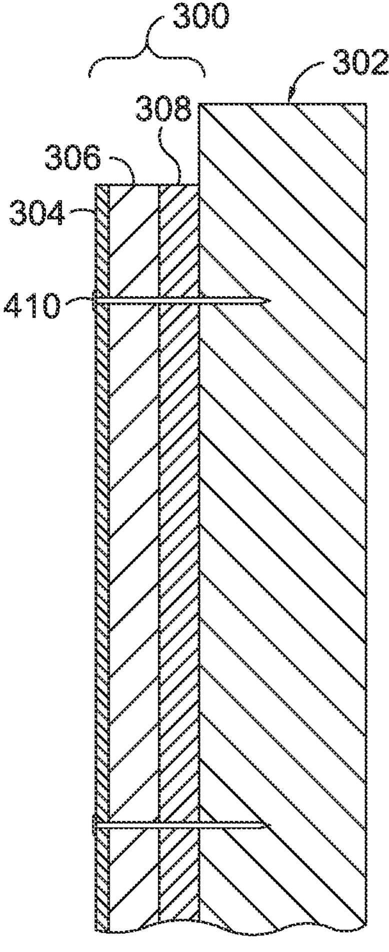
FIG. 4 depicts a cross-sectional view of a three-dimensional sheathing system, in accordance with aspects hereof.

Looking now to FIG. 4, a cross-sectional view of sheathing system 300 of FIG. 3A along a cutline (4. of FIG. 3A) is depicted in accordance with aspects hereof. Sheathing system 300 comprises at least the insulation layer 306 adhered to the first structural layer 304 and the second structural layer 308. The sheathing system 300 can be fastened to the framing structure 302 by use of a fastener 410. The fastener 410 can comprise fasteners, such as nails, screws, or any other suitable fastener known in the art. In one embodiment, the distance from an exterior-facing or outer surface of the first structural layer 304 to an inner-facing or inner surface of the structural layer 308 that is adjacent the framing structure 302 (i.e., the thickness of sheathing system 300) is one inch or less and has an R-value of 5 or greater. In another embodiment, the distance from the outer surface of the first structural layer 304 to the inner surface adjacent the framing structure 302 is 1.5 inches or less and an R-value of 7.5 or greater. In yet another embodiment, the distance from the outer surface of the structural layer 304 to the inner surface adjacent the framing structure 302 is not greater than two inches.

Figure 5:
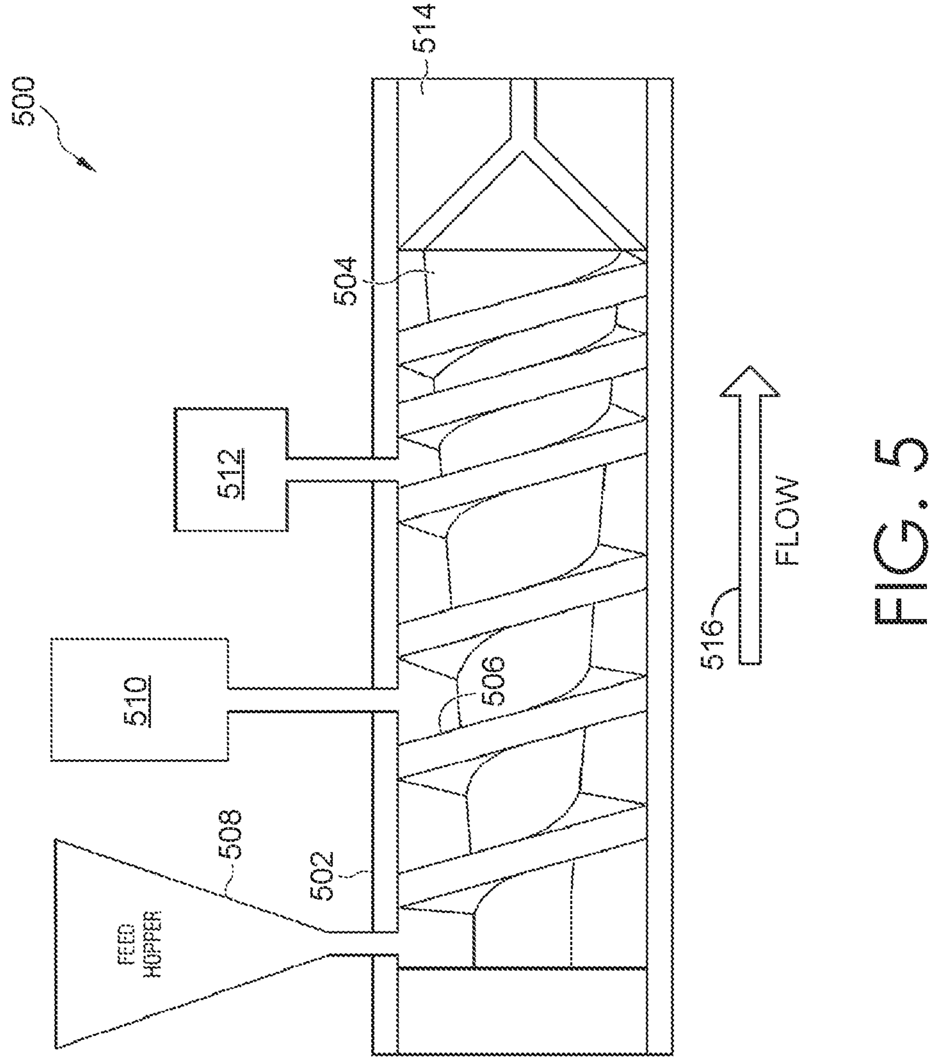
FIG. 5 is a schematic drawing of an exemplary extrusion apparatus useful for practicing methods according to one or more embodiments shown and described herein.

Continuing now with FIG. 5 which illustrates a traditional extrusion apparatus 500 useful for the production of polymer insulation layers, in accordance with the present disclosure. The extrusion apparatus 500 can comprise a single or double (not shown) screw 504 and barrel 502 surrounding on which a spiral flight 506 is provided. The spiral flight 506 is configured to compress, and thereby, heat material introduced into the screw extruder. As illustrated in FIG. 5, the polymer composition can be conveyed into the screw extruder as a flowable solid. By way of non-limiting example, a flowable solid can be conveyed into the screw extruder in the form of beads, granules, or pellets, or conveyed into the screw extruder as a liquid or semi-liquid melt from one or more (not shown) feed hoppers 508.

As the basic polymer composition advances in direction of flow 516 through the screw extruder, the decreasing spacing of the flight 506 defines a successively smaller space through which the polymer composition is forced by the rotation of the screw. This decreasing volume acts to increase the temperature of the polymer composition to obtain a polymer melt (if solid starting material was used) and/or to increase the temperature of the polymer melt.

As the polymer composition advances through the extrusion apparatus 500, one or more ports can be provided through the barrel 502 at port 510 and port 512 for injecting one or more blowing agents and optional additives into the polymer composition. In some embodiments, a barrier coating composition can be added through one or more of the ports, as will be described in greater detail below. Once the blowing agent(s) have been introduced into the polymer composition, the resulting mixture is subjected to some additional blending sufficient to distribute each of the blowing agents or optional additives generally uniformly throughout the polymer composition to obtain a polymer foamable composition.

The polymer foamable composition is then forced through an extrusion die 514 and exits the die into a region of reduced pressure (which can be below atmospheric pressure), thereby allowing the blowing agent to expand and produce a polymer foam material. This pressure reduction can be achieved gradually as the extruded polymer foamable composition advances through successively larger openings of the die or through some suitable apparatus (not shown) provided downstream of the extrusion die. The polymer foam material can also be subjected to additional processing, such as calendaring, water immersion, cooling sprays or other operations to control the thickness and other properties of the resulting foam insulation layer (referred to herein interchangeably as “foam product,” “foam insulation product,” “insulation layer,” and/or “insulation product”).

Figure 6:
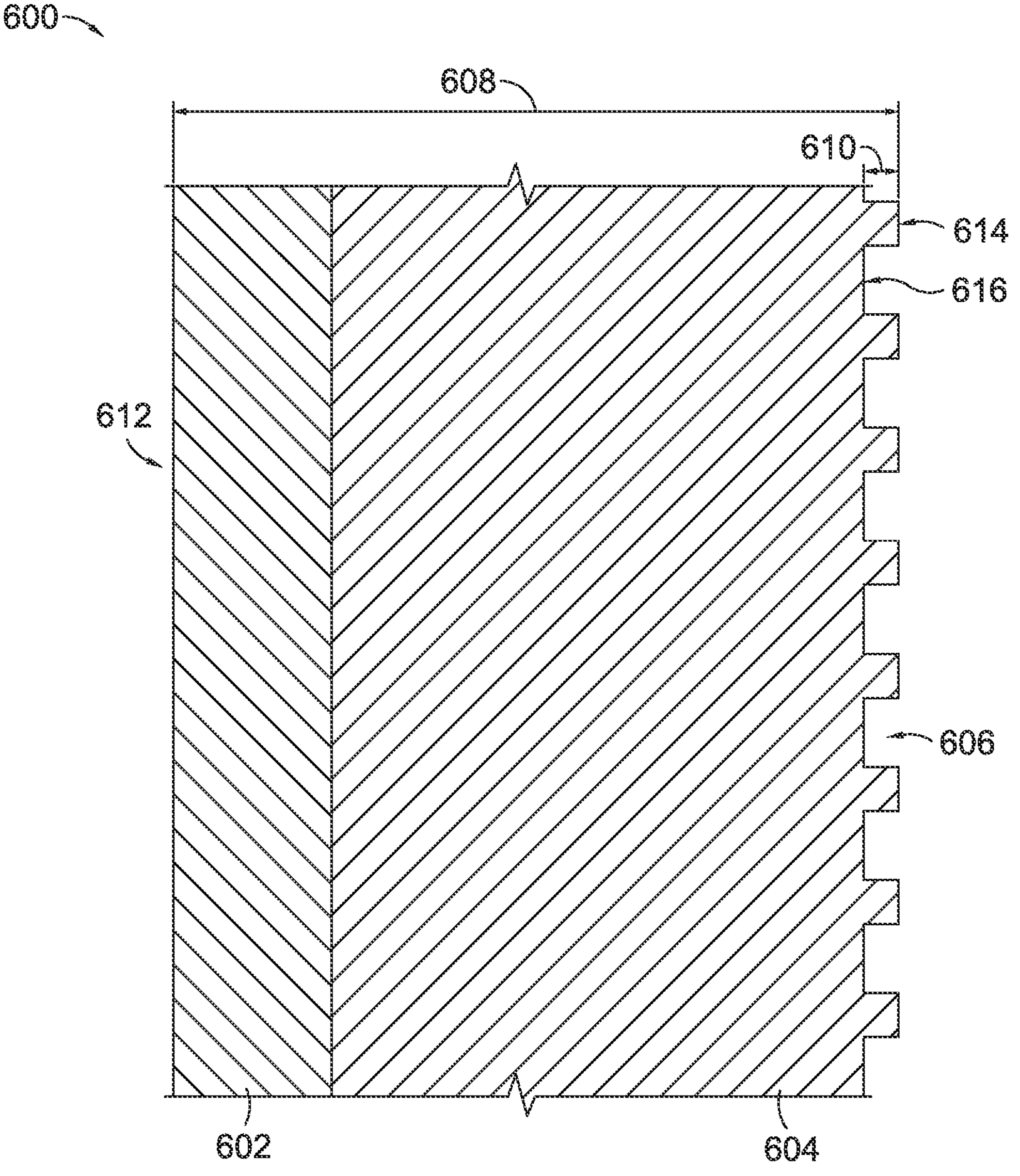
FIG. 6 depicts a cross-sectional view of a three-dimensional sheathing system, in accordance with aspects hereof.

Turning now to FIG. 6, FIG. 6 depicts a cross-section of a top-down view of an embodiment of sheathing system 600, prior to installation. The sheathing system 600 is illustrated having drainage channels or grooves to prevent moisture buildup. At a high level, the sheathing system 600 comprises the sheathing system 100 of FIGS. 1A-2B with the addition of a plurality of drainage groves 606; that is, the sheathing system 600 comprises a structural layer 602, an insulation layer 604, and the plurality of moisture drainage grooves 606. Accordingly, the sheathing system 600 and each of the structural layer 602 and the insulation layer 604 can have any one or more characteristics of the sheathing system 100, the structural layer 104, and the insulation layer 106, respectively, as described in relation to FIGS. 1A-2B. The plurality of drainage grooves 606 can be recessed within (or extend from) the insulation layer 604. The offset or recess distance formed by the drainage grooves 606 is depicted by a distance 610 that extends from a recess surface 616 to an outer surface 614 of the insulation layer 604. The distance 610 being in a range from 0.01 inches to 0.1 inches. In an embodiment, a distance 608 from an outer structural surface 612 to the outer insulation surface 614 is in a range from about one inch to about two inches.

Figure 7:
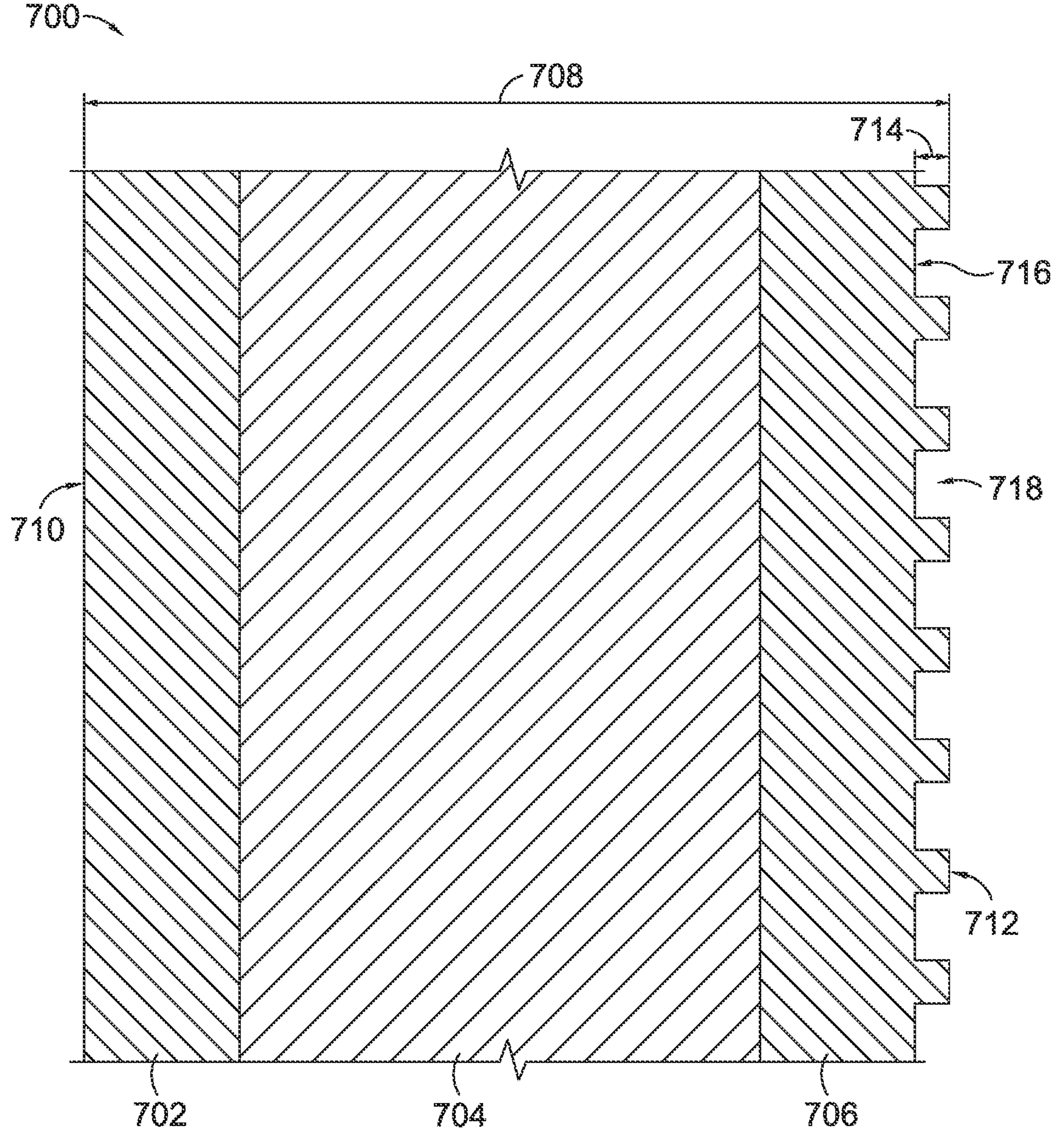
FIG. 7 depicts a cross-sectional view of a three-dimensional sheathing system, in accordance with aspects hereof.

FIG. 7 similarly depicts a cross-section of a top-down view of a sheathing system 700, comprising a first structural layer 702, an insulation layer 704, and a second structural layer 706. In addition, the second structural layer 706 can contain moisture drainage grooves 718. The insulation layer 704, the first structural layer 702, and the second structural layer 706 can include any of the properties previously described with respect to, for example, FIG. 3A, FIG. 3B, and FIG. 4. Accordingly, for the sake of brevity, a detailed description of insulation layer 704, the first structural layer 702, and the second structural layer 706 will not be repeated with respect to the sheathing system 700 illustrated in FIG. 7.

The drainage grooves 718 can be recessed within (or extend from) the second structural layer 706. The offset or recess distance formed by the drainage grooves 718 is depicted by a distance 714 that extends from a recess surface 716 to an extension surface 712 of the second structural layer 706. The distance 714 from the recess surface 716 to the extension surface 712 being in a range from 0.01 inches to 0.1 inches. In one embodiment, a distance 708 from an outer first structural layer surface 710 to the extension surface 712 is one inch or less. In additional embodiments, the number of drainage grooves 718 per foot of sheathing system 700 can be in a range from 1 drainage groove per foot to 12 drainage grooves per foot.

Similar to drainage grooves 608 described in FIG. 6, drainage grooves 718 are designed on the surface of the sheathing system 700 such that gravity allows for the drainage of water from the sheathing system 700. The drainage grooves 718 create pathways that guide water away from sheathing system 700 and away from the building envelope. The sheathing system 700 can comprise a series of drainage grooves 718 arranged vertically such that as water or moisture encounters the drainage grooves 718, gravity pulls the water down and away from the building envelope. In one embodiment, drainage grooves 718 can take the form of a square groove as depicted in FIG. 7. In an additional embodiment, drainage grooves 718 are V-shaped grooves, rectangular grooves, or curved grooves. Additional shapes can be contemplated for use as the drainage grooves 718.

The arrangement of drainage grooves 718 can be vertical in orientation such that water flows directly down. Additionally, the drainage grooves 718 can be oriented in a horizontal arrangement or parallel to the ground when the sheathing system 700 is installed. In a further embodiment, the drainage grooves 718 can be oriented in a diagonal arrangement, a radial arrangement, or a serpentine arrangement.

Figure 8:
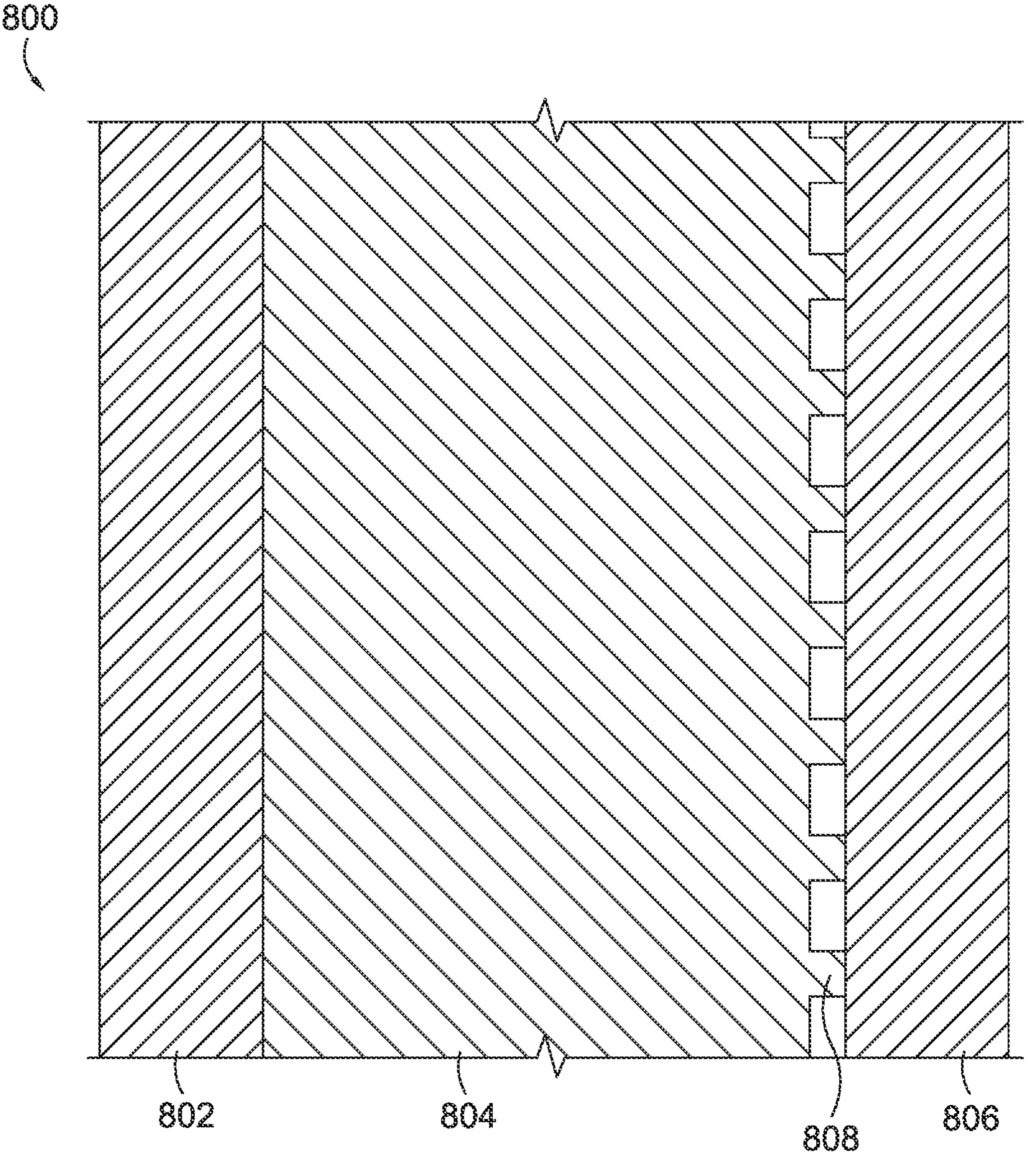
FIG. 8 depicts a cross-sectional view of a three-dimensional sheathing system, in accordance with aspects hereof.

Looking now to FIG. 8, FIG. 8 depicts a cross-section of a top-down view of a sheathing system 800 comprising a first structural layer 802, an insulation layer 804, and a second structural layer 806. In the illustrated embodiment, the insulation layer 804 contains drainage grooves 808, which allow moisture to flow between the second structural layer 806 and the insulation layer 804. The insulation layer 804, the second structural layer 806, and the first structural layer 802 can include the above-described barrier coating and/or any of the properties previously described with respect to, for example, FIG. 3A, FIG. 3B and FIG. 4. Accordingly, for the sake of brevity, a detailed description of insulation layer 804, second structural layer 806, and first structural layer 802, will not be repeated with respect to the sheathing system 800 illustrated in FIG. 8.

Similar to the drainage grooves 718 described with respect to FIG. 7, drainage grooves 808 are designed as part of the sheathing system 800 such that the force of gravity allows for the drainage of water from the sheathing system 800. As shown in FIG. 8, the drainage grooves 808 are part of the insulation layer 804 as a space between the insulation layer 804 and the second structural layer 806. The placement of the drainage grooves 808 allows for the extraction of any moisture that is between the insulation layer 804 and the second structural layer 806. The drainage grooves 808 create pathways that guide water away from sheathing system 800, away from the insulation layer 804, and away from the building envelope. The sheathing system 800 can comprise a series of drainage grooves 808 arranged vertically such that as water or moisture encounters the drainage grooves 808, gravity pulls the water down and away from the insulation layer 804. In one embodiment, drainage grooves 808 can take the form of a square groove as depicted in FIG. 8. In an additional embodiment, drainage grooves 808 are V-shaped grooves, rectangular grooves, or curved grooves.

Figure 9:
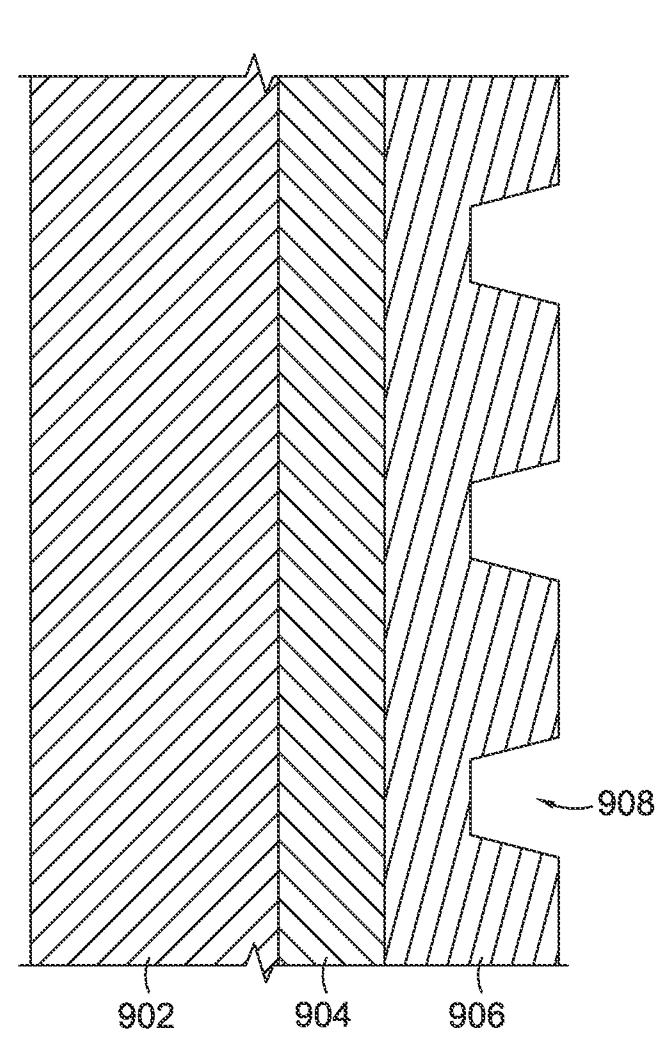
FIG. 9 depicts a cross-sectional view of a three-dimensional sheathing system, in accordance with aspects hereof.

Continuing now with reference to FIG. 9, a cross-section of a top-down view of an embodiment of a sheathing system 900 is shown. The sheathing system 900 comprises a first structural layer 902, an insulation layer 904, a second structural layer 906, and drainage grooves 908. The drainage grooves 908 provide a varied cross section with non-perpendicular surfaces. The pattern of the drainage grooves 908 are designed to improve flow of moisture next to the sheathing system 900 for eventual extraction from the sheathing system altogether. The insulation layer 904, the second structural layer 906, and the first structural layer 902 can include any of the properties previously described with respect to, for example, FIG. 3A, FIG. 3B and FIG. 4. Accordingly, for the sake of brevity, a detailed description of insulation layer 904, second structural layer 906, and first structural layer 902, will not be repeated with respect to the sheathing system 900 illustrated in FIG. 9.

Drainage grooves 908 are designed similar to drainage grooves 618 of FIG. 6. As part of the sheathing system 900, drainage grooves 908 allow gravity to cause the drainage of water from the sheathing system 900. The drainage grooves 908 create pathways that guide water away from sheathing system 900 and away from the building envelope. As shown in FIG. 9, the drainage grooves 908 can have surfaces that deviate from the perpendicular.

Figure 10A:
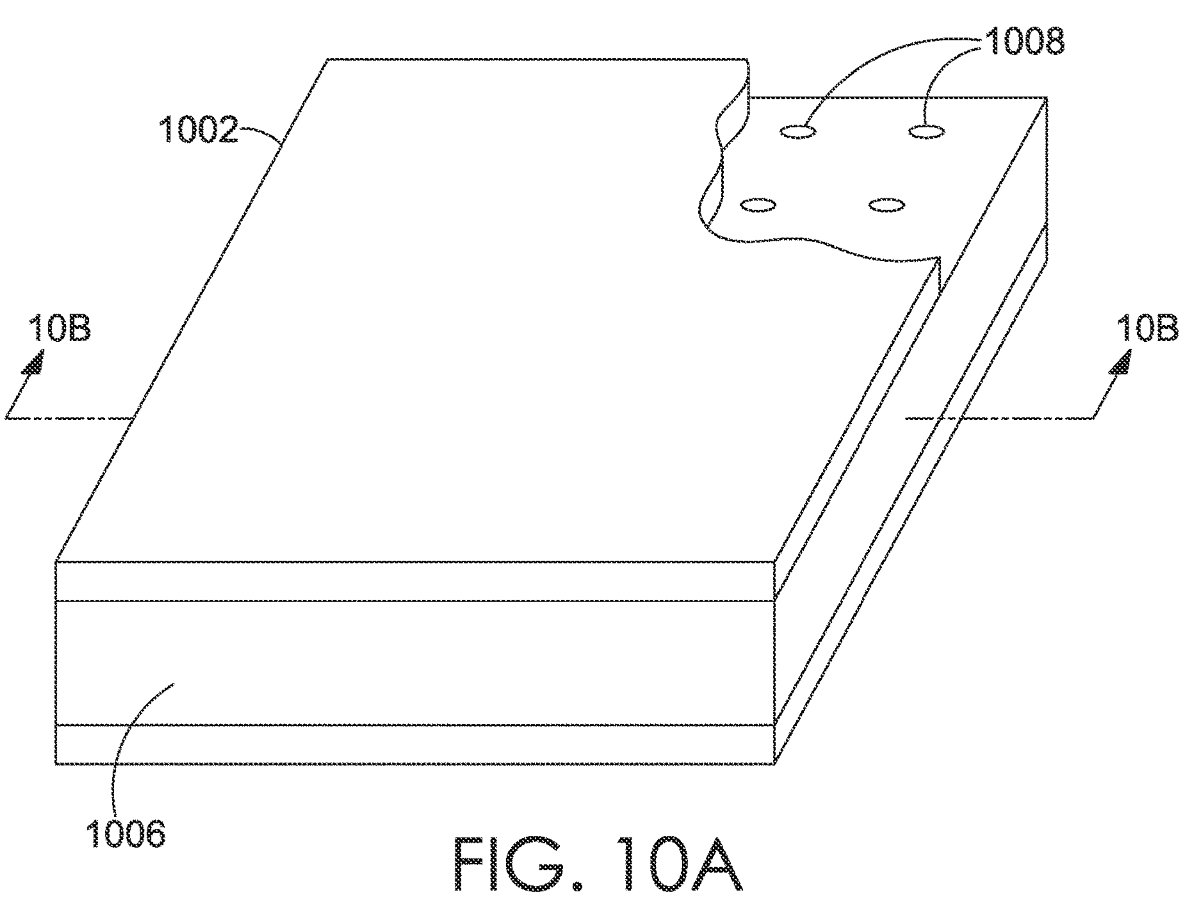
FIG. 10A depicts a perspective view of a three-dimensional sheathing system, in accordance with aspects hereof.
Figure 10B:
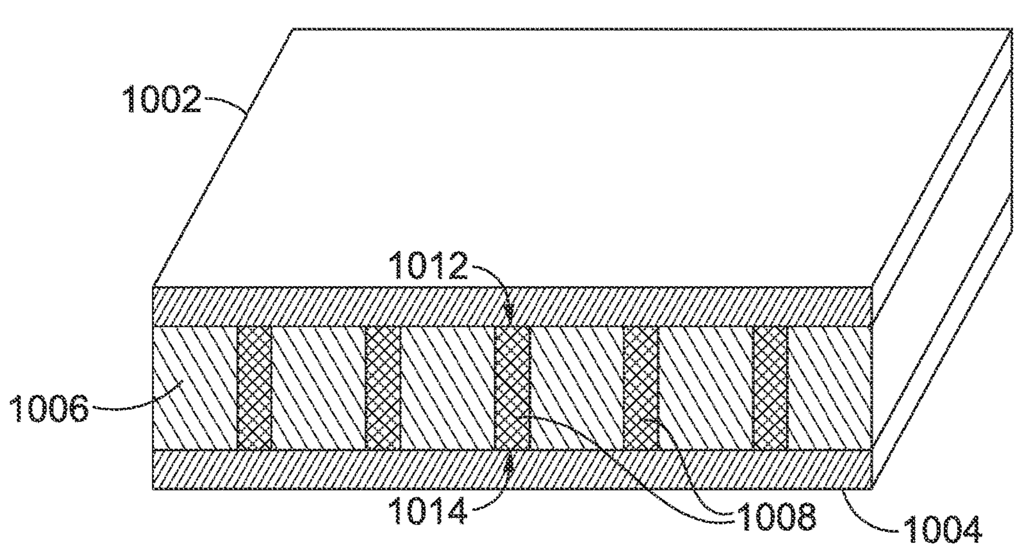
FIG. 10B depicts a cross-sectional view of a three-dimensional sheathing system, in accordance with aspects hereof.

Alternative embodiments for coupling a first structural layer 1002, an insulation layer 1006, and a second structural layer 1004 are depicted in FIGS. 10A and 10B. With specific reference to FIG. 10A, a perspective view of a sheathing system 1000 is shown in accordance with some embodiments. The sheathing system 1000 comprises a first structural layer 1002, a second structural layer 1004, an insulation layer 1006, and one or more connecting rods 1008. The connecting rods 1008 extending through the insulation layer 1006. The illustration of FIG. 10A has a cutout portion of the first structural layer 1002 exposing the connecting rods 1008 for purposes of illustration only. In one embodiment, the connecting rods 1008 extend from the first structural layer 1002 through the insulation layer 1006 to the second structural layer 1004. In some aspects, the rods 1008 can take the form of a cylinder, a plane, a prism, a bar, or other shape that can connect the first structural layer 1002 and the second structural layer 1004 together.

Turning now to FIG. 10B, FIG. 10B depicts a cross section of the sheathing system 1000 that incorporates the rods 1008, the first structural layer 1002, and the second structural layer 1004. The rods 1008 in the sheathing system 1000 can be made of high-strength and heat-resistant polymers. Various polymer materials can be utilized for the rods, depending on the specific requirements of the sheathing system 1000. For instance, engineering thermoplastics, such as nylon (e.g., nylon 6 or nylon 6/6), polypropylene, polycarbonate, or polyethylene terephthalate (PET) can be suitable options for the rods 1008.

In order to fuse the sheathing system 1000 together, a melting process can be used to secure the rods 1008 to the first structural layer 1002 and the second structural layer 1004. Additionally, the rods 1008 can comprise thermoplastic materials, wherein rods 1008 can be softened and fused during the assembly process. The melting process or a fusing process can involve the application of heat to the rods 1008, causing them to soften and melt slightly. The rods 1008 can penetrate the first structural layer 1002, the second structural layer 1004, and the insulation layer 1006, filling any gaps or voids between them. As the molten rods 1008 cool and solidify, they create a strong bond and form a fused connection, permanently securing the first structural layer 1002 and the second structural layer 1004 together at ends 1012 and 1014.

In some embodiments, a melting process can be achieved through various methods. One approach is to use heated metal plates or heated molds that are pressed against the first structural layer 1002 and the second structural layer 1004. The heat from the plates or molds transfers to the rods 1008 at ends 1012 and 1014, causing them to melt and fuse with the first structural layer 1002 and the second structural layer 1004. Alternatively, localized heat sources, such as hot air or infrared heating, can be directed at specific areas where the rods 1008 are inserted, enabling selective melting and fusion.

In other embodiments, the sheathing system 1000 can comprise rods 1008 made of metal, which provide a robust and durable solution for connecting the first structural layer 1002, the second structural layer 1004, and the insulation layer 1006. Metal rods offer high strength, rigidity, and resistance to various environmental conditions. Metals utilized for this purpose include stainless steel, aluminum, or steel alloys.

In some other embodiments, the rods 1008 can have various diameters and lengths to accommodate different panel sizes and design requirements. The ends 1014 and 1012 of the rods can be threaded, allowing them to be easily inserted and securely fastened to the structural layers. Alternatively, the rods 1008 can be designed with enlarged heads or flanges that mechanically lock into the outer surfaces of the layers, providing a secure connection without the need for additional fasteners.

In an additional embodiment, the rods 1008 can have a flanged or enlarged portion on the end 1014 such that the rods 1008 holds the insulation layer 1006 to the second structural layer 1004. The rods 1008 can then be connected to the first structural layer 1002 and the second structural layer 1004 by means of melting, fusing, or other means.

Figure 11A:
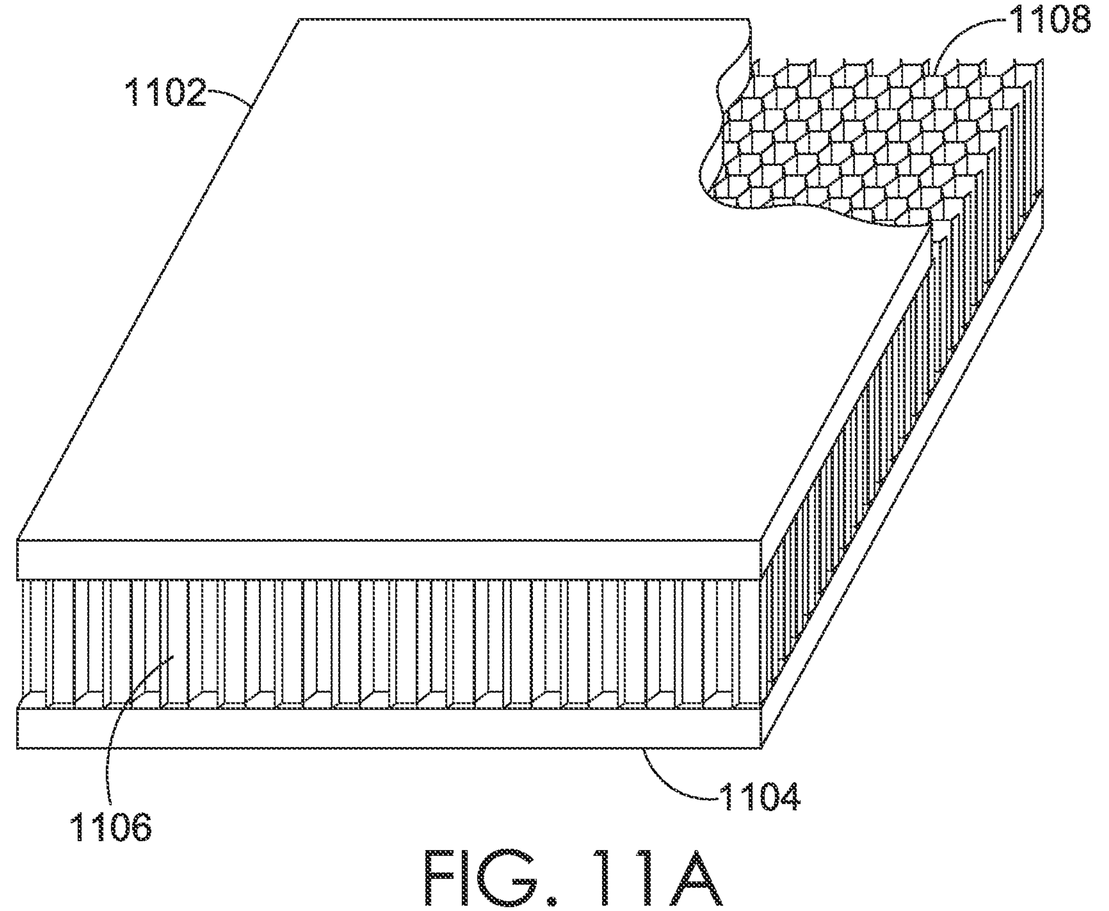
FIG. 11A depicts a cross-sectional view of a three-dimensional sheathing system, in accordance with aspects hereof.
Figure 11B:
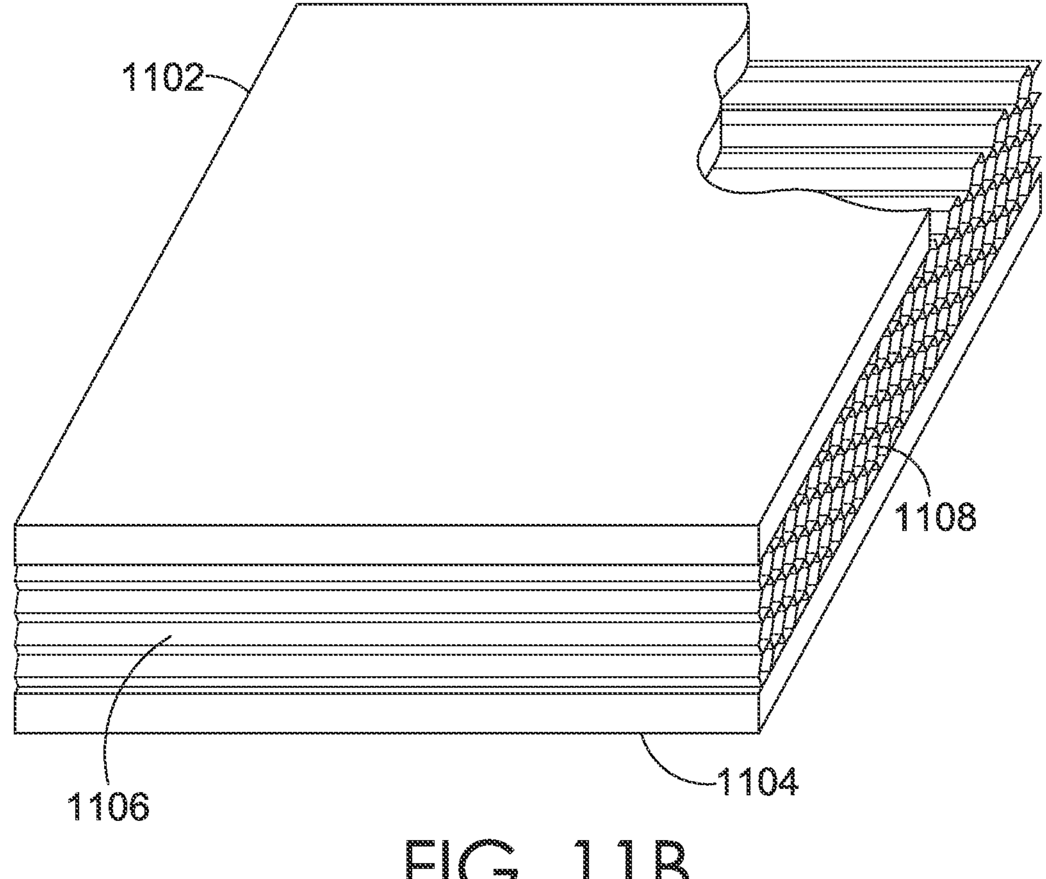
FIG. 11B depicts a cross-sectional view of a three-dimensional sheathing system, in accordance with aspects hereof.

Turning now to FIG. 11A and FIG. 11B, which depict cross-sectional views of the sheathing system 1100. The sheathing system 1100 in FIG. 11A and FIG. 11B comprises a first structural layer 1102, a second structural layer 1104, and a support layer 1106. The first structural layer 1102 and the second structural layer 1104 may have any of the characteristics of the first structural layer 304 and the second structural layer 308, respectively, as previously described in relation to FIG. 3A, FIG. 3B, and FIG. 4. Accordingly, for the sake of brevity, a detailed description of the first structural layer 1102 and the second structural layer 1104 will not be repeated with respect to the sheathing system 1100 illustrated in FIG. 11A and FIG. 11B.

Between the first structural layer 1102 and the second structural layer 1104 is support layer 1106. The support layer 1106 comprises a series of walls or structures that separate the first structural layer 1102 and the second structural layer 1104. As shown in FIG. 11A, the support layer 1106 can have a series of walls that extend perpendicular from the first structural layer 1102 to the second structural layer 1104. The support layer 1106 creates void portions that extend from the first structural layer 1102 to the second structural layer 1104, such as insulation void portion 1108. The insulation void portion 1108, as shown in FIG. 11A can be oriented perpendicular to the first structural layer 1102 and the second structural layer 1104. In another embodiment, as shown in FIG. 11B, the support layer 1106 can have a series of walls or structures that extend from the first structural layer 1102 to the second structural layer 1104. The support layer 1106 creates elongated hexagonal spaces or void portions that are parallel with the first structural layer 1102 and the second structural layer 1104, such as insulation void portion 1108. The insulation void portion 1108, as shown in FIG. 11B can be oriented parallel to the first structural layer 1102 and the second structural layer 1104.

The support layer 1106 can be comprised of any material that may be used or formed into a wall or support structure. For example, the support layer 1106 can be comprised of polycarbonate, polyurethane, metal, wood, or any other structurally supportive material, as required by the intended use of the support layer 1106.

The insulation void portion 1108 refers to the space or cavity created by the support layer 1106 of the sheathing system 1100. The insulation void portion 1108 can be filled with insulation material to ensure that the insulation material is properly contained within the panel. In some embodiments, the insulation material can comprise various insulating substances such as foam, fiberglass, or polymer-based insulation. The insulation void portion 1108 can be filled using spray foam, polyisocyanurate, EPS, recycled XPS, XPS, or other insulation materials. These materials can be sprayed, poured, or stuffed into the insulation void portions 1108. As can be seen in FIG. 11A, with the insulation void portion 1108 perpendicular to the first structural layer 1102 and the second structural layer 1104, the insulation void portion 1108 can be filled when one or more of the structural layers is not secured to the sheathing system 1100. However, as can be seen in FIG. 11B, having the insulation void portion 1108 parallel to the first structural layer 1102 and the second structural layer 1104, the insulation void portion 1108 can be filled when the sheathing system 1100 is completely assembled.

In some embodiments, the support layer 1106 in the sheathing system 1100 can be designed with a honeycomb pattern, creating a series of interconnected, hexagonal-shaped cells or chambers that form a regular and uniform structure throughout the support layer. A plurality of hexagonal cells or chambers created by the support layer 1106 produces a network of interconnected walls that distribute applied loads and stresses evenly across the sheathing system 1100, improving its structural integrity. As shown in FIG. 11A, the hexagonal cells or insulation voids 1108 can be oriented such that the openings of the insulation voids 1108 are adjacent to or facing the first structural layer 1102 and the second structural layer. Additionally, as shown in FIG. 11B, the hexagonal cells or insulation voids 1108 can be oriented such that the openings of the insulation voids 1108 are perpendicular to the first structural layer 1102 and to the second structural layer.

In addition to the honeycomb pattern, in is contemplated that various other patterns can be employed in the support layer 1106 of the sheathing system 1100. These patterns offer different structural characteristics and can be selected based on specific design requirements and desired performance attributes. Other patterns can include, for instance: a square grid pattern with a series of interconnected square cells that form a grid-like structure; a triangular truss pattern that consists of interconnected triangular cells that create a truss-like framework; a diamond pattern that features interconnected diamond-shaped cells that form a repeating pattern; or a hexagonal grid pattern that, similar to the honeycomb pattern, consists of interconnected hexagonal cells. However, unlike the honeycomb pattern, the hexagonal grid does not form a continuous network of cells but rather a grid-like arrangement. In another embodiment, the support layer 1106 may include a random pattern that is a non-repetitive arrangement of cells or voids. The support layer can be designed with varying sizes and shapes of voids, providing flexibility in material distribution and load-bearing capabilities.

The inventive aspects of the present disclosure have been described above both generically and with regard to various exemplary embodiments. Although the general aspects have been set forth in what is believed to be exemplary illustrative embodiments, a wide variety of alternatives known to those of skill in the art can be selected within the disclosure. Additionally, the following data and examples related to embodiments described herein are meant to better illustrate the present invention and are not intended to limit the general aspects thereof.

Example 1

Extruded polystyrene foam samples were prepared using a co-rotating twin screw extrusion foam manufacturing line. Polystyrene was melted in the extruder and mixed with an injected blowing agent composition to form a homogeneous foamable composition. The foamable composition for Comparative Examples 1-8 and Examples 1-8 (excluding the blowing agent) included 100 wt. % polystyrene and flame retardant masterbatch. The foamable composition for Comparative examples 1-8 and Examples 1 and 8 (excluding the blowing agent) included polystyrene, flame retardant masterbatch, and graphite (or infrared attenuating agent) masterbatch. A blowing agent blend was included at a generally constant total amount across all samples. The blowing agent blends are provided below in Table 2 (based on the total weight of the foamable composition) and generally included a fluorinated alkene and/or $CO_2$, whereby the concentration of fluorinated alkene was gradually reduced and replaced with $CO_2$. A solubilizer, methyl formate, was included with the blowing agent blend, to solubilize the blowing agent with the polystyrene resin. The foamable compositions were then extruded to produce 1-inch XPS foam samples, each having a density of about 2.1-2.2 lb/ft$^3$.

Upon formation, the XPS foam samples were coated on all surfaces with a partially crystalline PVDC-based barrier coating composition at the coat weights detailed below in Table 3.

TABLE 2

| Sample No. | HFO (wt. %) | $CO_2$ (wt. %) | Methyl formate (wt. %) | IAA (wt. %) | Flame retardant (wt. %) |
|---|---|---|---|---|---|
| Comp. Ex. 1 | 0.00 | 3.31 | 1.50 | 0.60 | 1.00 |
| Comp. Ex. 2 | 0.20 | 3.21 | 1.50 | 0.60 | 1.00 |
| Comp. Ex. 3 | 0.40 | 3.11 | 1.50 | 0.60 | 1.00 |
| Comp. Ex. 4 | 0.60 | 3.01 | 1.50 | 0.60 | 1.00 |
| Comp. Ex. 5 | 0.80 | 2.91 | 1.50 | 0.60 | 1.00 |
| Comp. Ex. 6 | 1.00 | 2.81 | 1.50 | 0.60 | 1.00 |
| Comp. Ex. 7 | 1.25 | 2.69 | 1.50 | 0.60 | 1.00 |
| Comp. Ex. 8 | 1.50 | 2.56 | 1.50 | 0.60 | 1.00 |
| 1 | 0.00 | 3.31 | 1.50 | 0.60 | 1.00 |
| 2 | 0.20 | 3.21 | 1.50 | 0.60 | 1.00 |
| 3 | 0.40 | 3.11 | 1.50 | 0.60 | 1.00 |
| 4 | 0.60 | 3.01 | 1.50 | 0.60 | 1.00 |
| 5 | 0.80 | 2.91 | 1.50 | 0.60 | 1.00 |
| 6 | 1.00 | 2.81 | 1.50 | 0.60 | 1.00 |
| 7 | 1.25 | 2.69 | 1.50 | 0.60 | 1.00 |
| 8 | 1.50 | 2.56 | 1.50 | 0.60 | 1.00 |

Properties of each of the samples are provided in Table 3 below. For each of the examples, the thermal conductivity was measured at approximately 7 days, 20 days, 30 days, 60 days, 120 days and 180 day time intervals. The 180 days k-values (Btu·in/h·ft$^2$·° F.) are reported in Table 3. R-values at 180 days were calculated from the reciprocal of the 180 days k values, and are also reported in Table 3, along with compressive strength and compressive modulus (measured in accordance with ASTM C578 and CAN UL S701), and open cell content (%).

TABLE 3

Properties of XPS samples with PVDC-based barrier coating

| Sample No. | Final Coat Weight (g) | 180-days k-values (Btu · in/h · ft$^2$ · ° F.) | 180-days R/in | Compressive Strength (psi) | Compressive Modulus (psi) | Open Cell (%) |
|---|---|---|---|---|---|---|
| Comp. Ex. 1 | — | 0.2279 | 4.39 | 44.5 | 1626 | 2.57 |
| Comp. Ex. 2 | — | 0.2277 | 4.39 | 48.0 | 1745 | 2.93 |
| Comp. Ex. 3 | — | 0.2273 | 4.40 | 47.9 | 1933 | 1.04 |
| Comp. Ex. 4 | — | 0.2263 | 4.42 | 46.6 | 1987 | 0.7 |
| Comp. Ex. 5 | — | 0.2243 | 4.46 | 45.9 | 1953 | 2.41 |
| Comp. Ex. 6 | — | 0.2224 | 4.50 | 44.6 | 1869 | 1.22 |
| Comp. Ex. 7 | — | 0.2203 | 4.54 | 45.7 | 1923 | 2.48 |
| Comp. Ex. 8 | — | 0.2184 | 4.58 | 44.5 | 1839 | 1.17 |
| Ex. 1 | 5.13 (~23.66 g/m$^2$) | 0.2244 | 4.46 | 44.5 | 1626 | 2.57 |
| Ex. 2 | 4.99 (~23.66 g/m$^2$) | 0.2147 | 4.66 | 48.0 | 1745 | 2.93 |
| Ex. 3 | 5.11 (~23.02 g/m$^2$) | 0.2192 | 4.56 | 47.9 | 1933 | 1.04 |
| Ex. 4 | 5.13 (~23.66 g/m$^2$) | 0.2256 | 4.43 | 46.6 | 1987 | 0.7 |
| Ex. 5 | 4.28 (~19.74 g/m$^2$) | 0.2192 | 4.56 | 45.9 | 1953 | 2.41 |
| Ex. 6 | 3.84 (~17.71 g/m$^2$) | 0.2212 | 4.52 | 44.6 | 1869 | 1.22 |
| Ex. 7 | 4.05 (~18.68 g/m$^2$) | 0.2179 | 4.59 | 45.7 | 1923 | 2.48 |
| Ex. 8 | 4.80 (~22.14 g/m$^2$) | 0.2127 | 4.70 | 44.5 | 1839 | 1.17 |

For the samples tested in this Example, an R-value of 5 is achieved at a thermal conductivity of 0.20 Btu·in/h·ft$^2$·° F. or below. As shown in FIG. 2, replacing the HFO with increasing amounts of $CO_2$ in uncoated XPS foam samples increases the k-values across the board and does not achieve an R-value of 5 or greater even after only 7 days. However, each of Examples 1-8 achieve an R-5 insulation value after 7 days and Examples 2 and 8 maintained the R-5 insulation value even after 60 days. As both Example 2 and 8 included an unconventionally high concentration of $CO_2$, the results confirm that use of the subject barrier coating composition in coat weights below 30 g/m$^2$ facilitate the production of R-5 XPS insulation products with a majority of the blowing agent comprising $CO_2$, and minimal, if any HFO.

Figure 16:
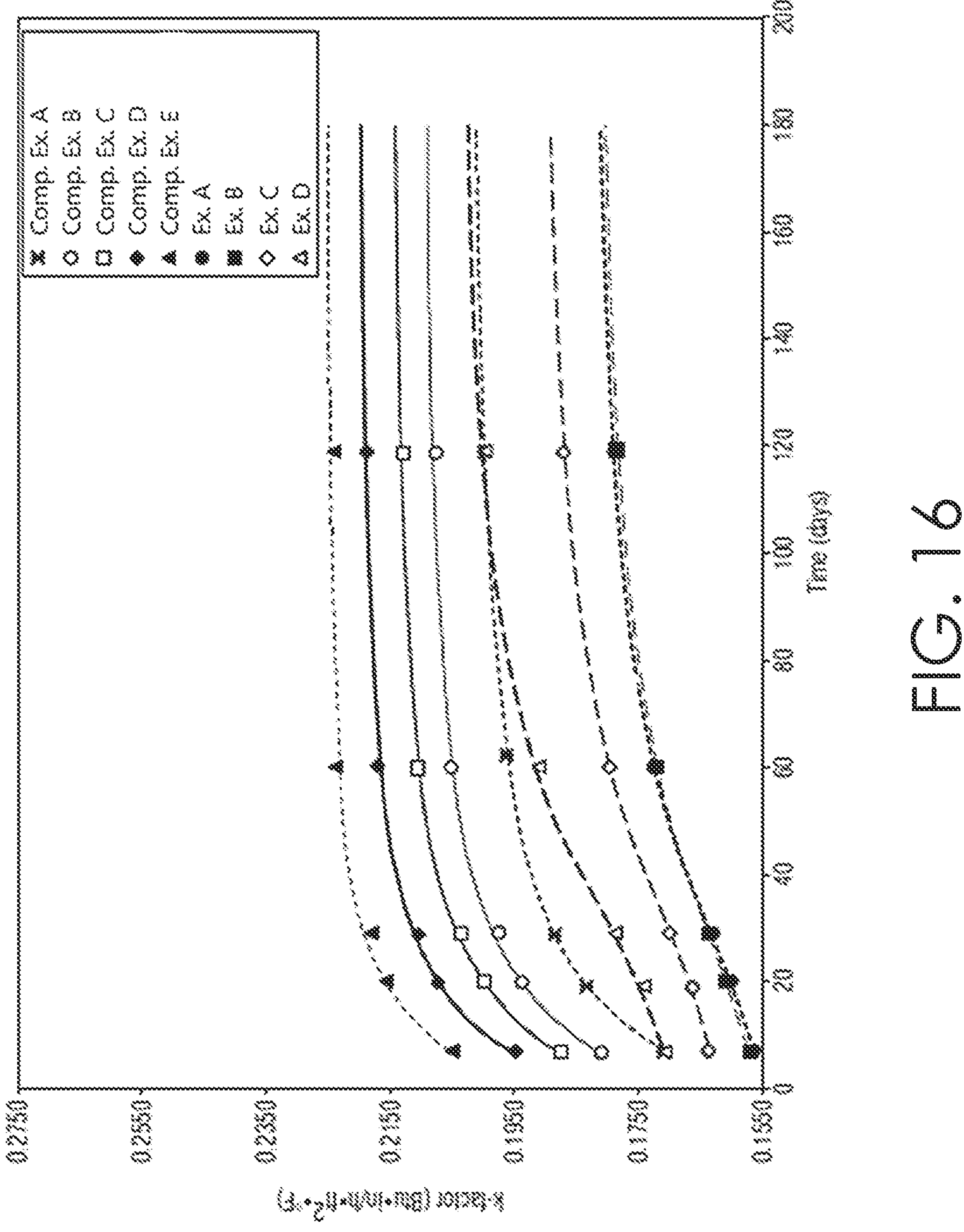
FIG. 16 is a graph showing the thermal conductivity k-value (y-axis) as a function of time (x-axis) for various barrier coating configurations according to Example 2.

FIG. 16 further illustrates the improvement in k-value over time that the barrier coating provides XPS foam samples. Namely, the coating is effective at low coat weights (such as below 30 g/m2) to significantly improve k-value for XPS foams and particularly make it possible to produce an XPS foam product with an R-value of at least 5, while using a blowing agent comprising a majority $CO_2$, rather than a fluorinated alkene.

Example 2

Extruded polystyrene foam samples were prepared using a co-rotating twin screw extrusion foam line. Polystyrene was melted in the extruder and mixed with an injected blowing agent composition to form a homogeneous foamable composition. The foamable composition for Comparative Samples B-E and Samples A-D (excluding the blowing agent) included polystyrene and flame retardant masterbatch. The foamable composition for Comparative Samples A and F and Samples F and G (excluding the blowing agent) included 100 wt. % polystyrene, flame retardant masterbatch, and graphite masterbatch. A blowing agent blend was included at a constant total amount across all samples. The blowing agent blend included a 30-40 wt. % of a fluorinated alkene and 60-70 wt. % of a fluorinated alkane, with the remainder of the blowing agent blend being $CO_2$. As the amount of fluorinated alkene was reduced, the amount of $CO_2$ was increased to maintain a constant level of total blowing agent. The foamable compositions were then extruded to produce 1-inch XPS foam samples, each having a density of about 1.83 pcf.

For coated samples, a barrier coating composition comprising PVOH (an aqueous dispersion of polyvinyl alcohol) was applied. Properties of each of the samples are provided in Table 4 below.

TABLE 4

Properties of XPS samples with PVOH-based barrier coating

| Sample No. | Fluorinated Alkene (wt. %) | IAA | Coating Composition | Final Coat Weight (g) | 180-days k-value (Btu · in/h · ft$^2$ · ° F.) | 180-days R/in |
|---|---|---|---|---|---|---|
| Comp. Ex. A | 3.0 | Yes | None | — | 0.2009 | 4.98 |
| Comp. Ex. B | 3.0 | No | None | — | 0.2111 | 4.79 |
| Comp. Ex. C | 2.5 | No | None | — | 0.2175 | 4.67 |
| Comp. Ex. D | 2.0 | No | None | — | 0.2210 | 4.56 |
| Comp. Ex. E | 1.5 | No | None | — | 0.2262 | 4.45 |
| Ex. A | 3.0 | No | Yes | 15.50 (71.50 g/m$^2$) | 0.1833 | 5.52 |
| Ex. B | 2.5 | No | Yes | 14.49 (66.84 g/m$^2$) | 0.1827 | 5.55 |
| Ex. C | 2.0 | No | Yes | 14.24 (65.69 g/m$^2$) | 0.1911 | 5.28 |
| Ex. D | 1.5 | No | Yes | 13.90 (64.12 g/m$^2$) | 0.2019 | 4.95 |
| Comp. Ex. F | 1.5 | Yes | No | — | 0.2163 | 4.67 |
| Ex. F | 3.0 | Yes | Yes | 11.79 (54.39 g/m$^2$) | 0.1755 | 5.78 |
| Ex. G | 1.5 | Yes | Yes | 13.74 (63.38 g/m$^2$) | 0.1868 | 5.45 |

As shown in Table 4, reducing the concentration of fluorinated alkene from 3 wt. % to 1.5 wt. % in uncoated foam samples increases the 180-day k-value from 0.2009 to 0.2247 Btu*in/h*ft$^2$*° F., and decreases the sample's R-value to below 4.5. However, when the foam samples were coated with the barrier coating composition, the samples were able to achieve an insulation value of R-5 even as the concentration of fluorinated alkene dropped below 2 wt. %.

Figure 18:
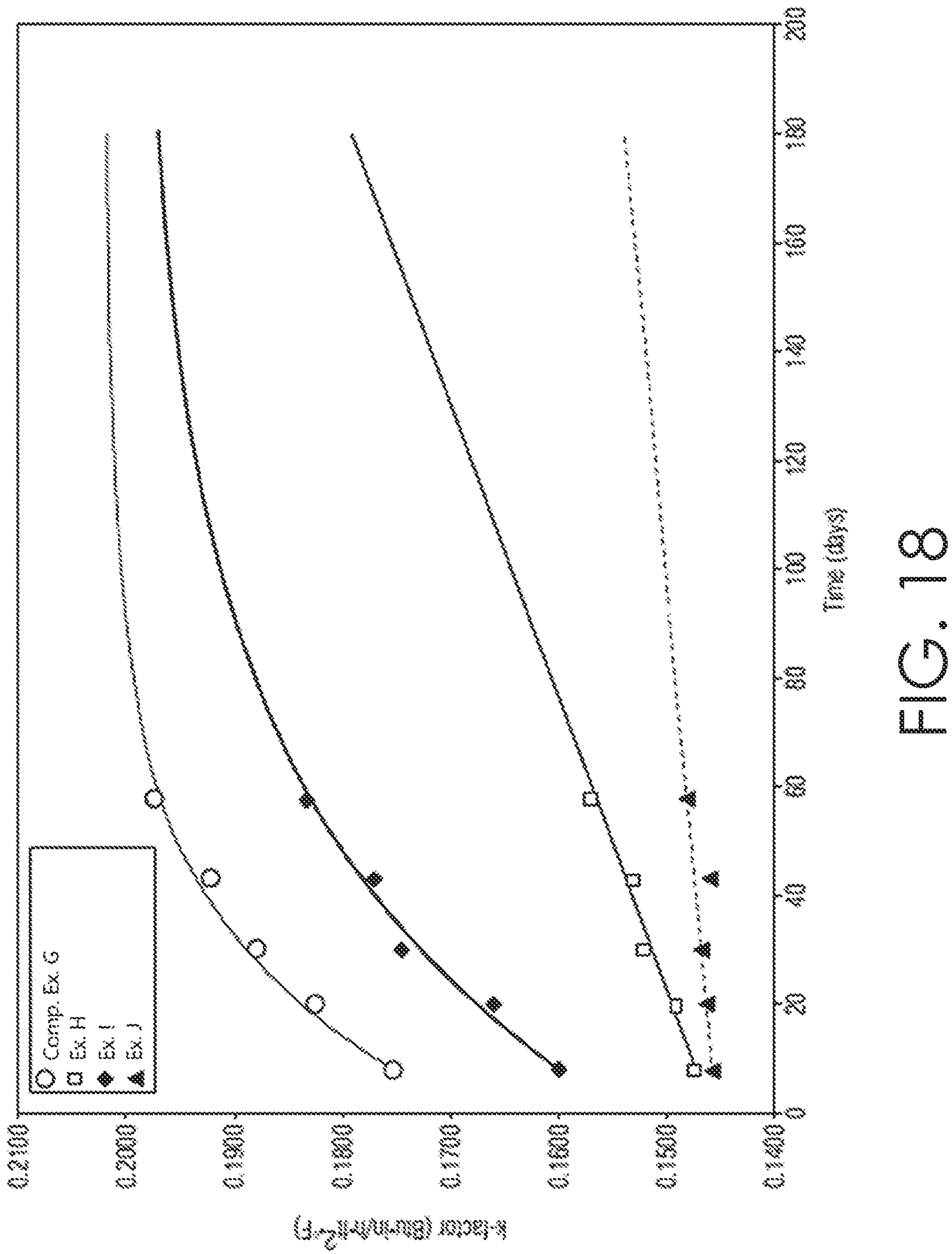
FIG. 18 is a graph showing the thermal conductivity k-value (y-axis) as a function of time (x-axis) for various PVDC coat weight configurations according to Example 3.

Additionally, the removal of graphite from the foam composition led to an increased k-factor (Comparative Examples B-E as compared to Comparative Example A), with an increased amount of fluorinated alkene blowing agent having less of an increase. However, the use of a PVOH-based barrier coating on the foam (Examples A-D) reduced the k-factor to an amount below the control (Comparative Sample A). As shown in FIG. 18, the PVOH coating also provides improved insulation properties for foams including an infrared attenuating agent (graphite) (Samples F and G).

Figure 17:
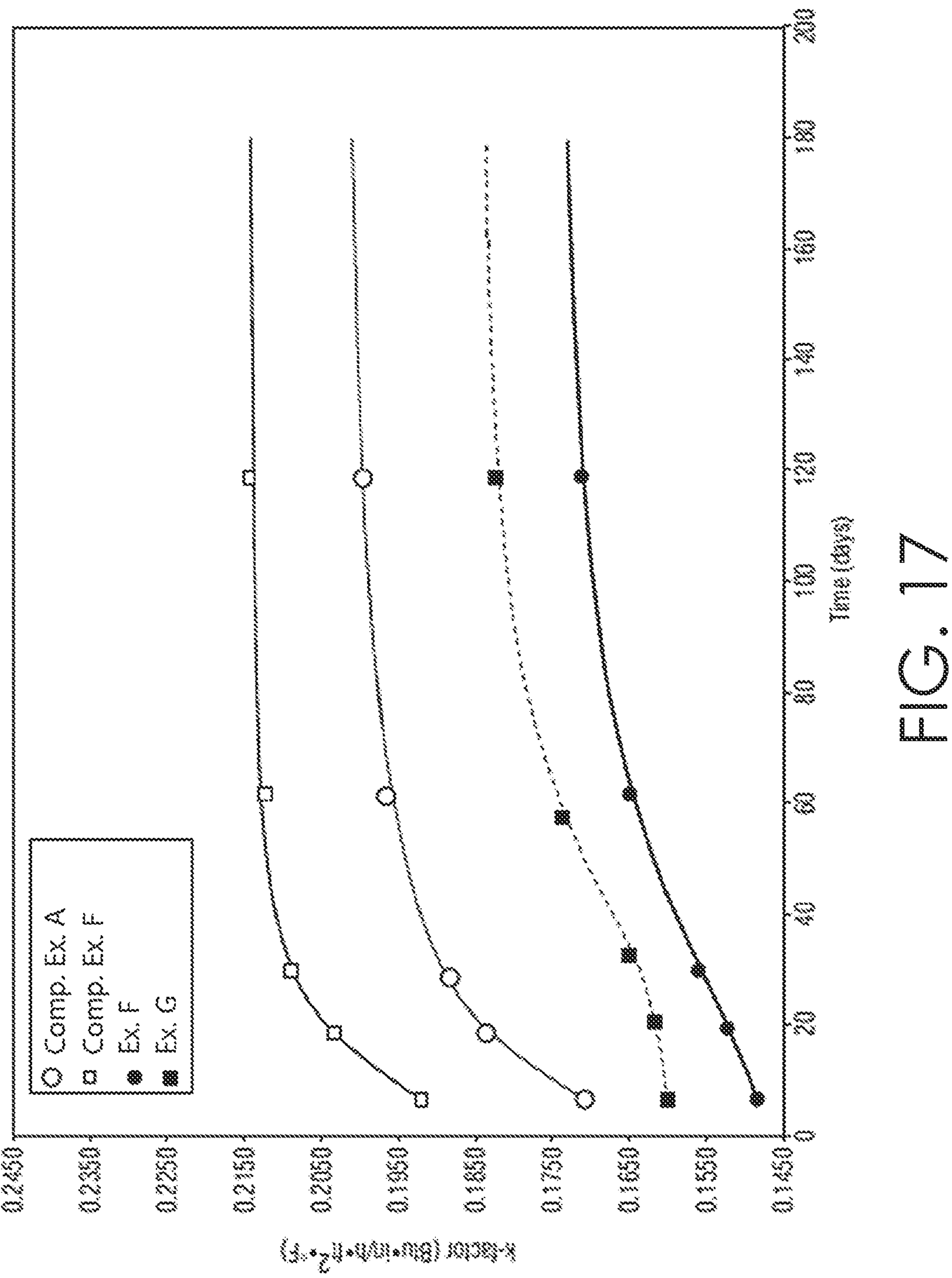
FIG. 17 is a graph showing the thermal conductivity k-value (y-axis) as a function of time (x-axis) for various barrier coating configurations according to Example 2.

Notably, in FIGS. 16 and 17, a combination of a PVOH coating with increased levels of fluorinated alkene blowing agent yielded the greatest improvement in insulation properties. However, FIGS. 16 and 17 demonstrate that less blowing agent can be used to achieve the same or improved insulation properties.

Example 3

A barrier coating composition comprising DIOFAN® A050 (a PVDC dispersion containing about 58 wt. % solids commercially available from Solvay) was applied with a brush to various surfaces of 1-inch XPS foam samples at various coat weights, as set forth in Table 5 below. The XPS foam was formed using a blowing agent composition comprising a blend of HFO-1336mzz-Z and HFC-152a.

TABLE 5

| Sample No. | Coating | Final Coat Weight | 180 days k-value (Btu * in/ h * ft$^2$ * ° F.) | 180 days R/in |
|---|---|---|---|---|
| Comp. Ex G | No Coating | (g) | 0.2017 | 4.96 |
| Ex. H | PVDC-based | 2.32 (~10.7 g/m$^2$) | 0.1969 | 5.08 |
| Ex. I | PVDC-based | 4.71 ((~21.73 g · m$^2$) | 0.1790 | 5.59 |
| Ex. J | PVDC-based | 7.12 (~32.85 g/m$^2$) | 0.1538 | 6.50 |

Figure 19:
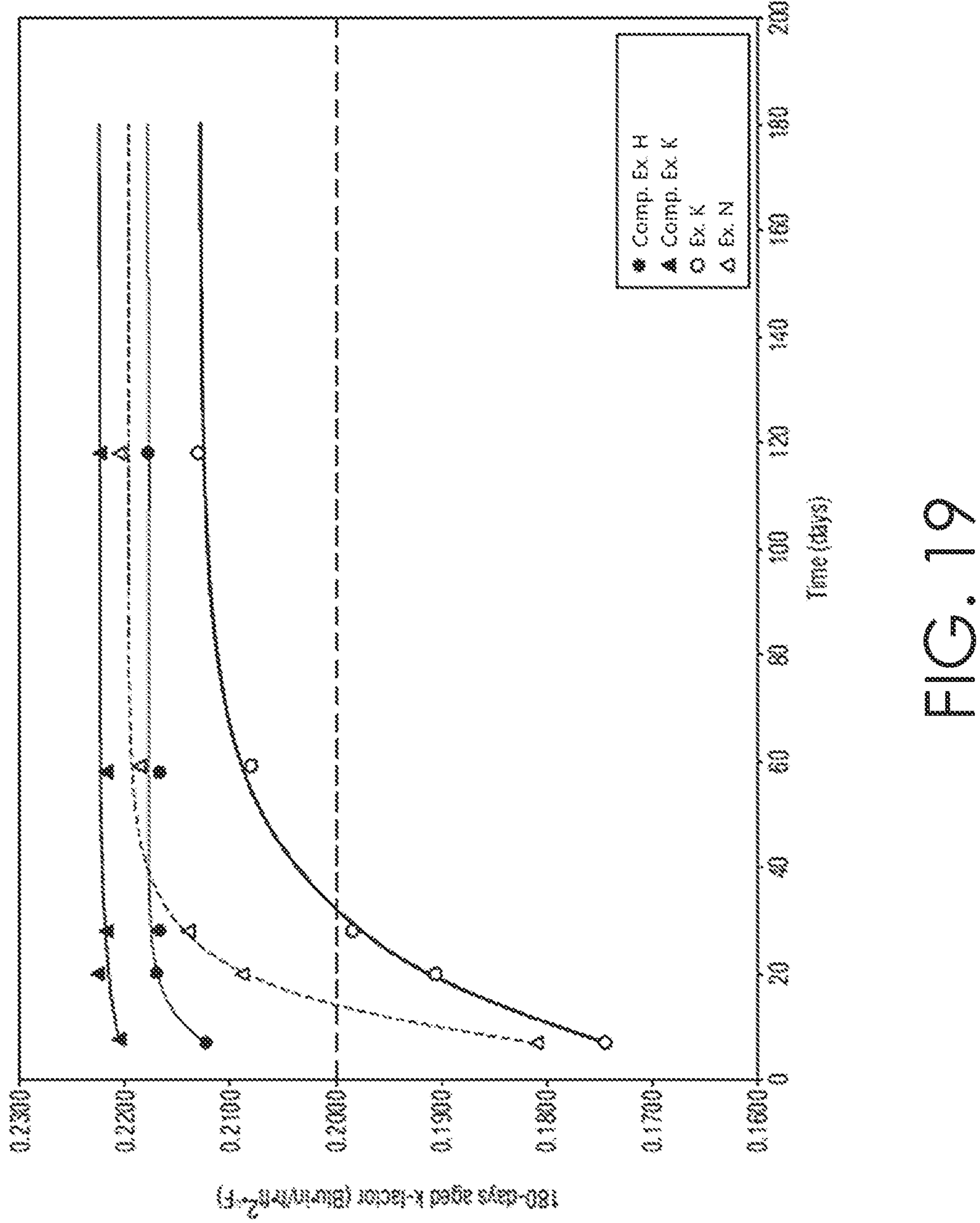
FIG. 19 is a graph showing the thermal conductivity k-value (y-axis) as a function of time (x-axis) for various samples according to Example 4.

As shown in Table 5 and FIG. 19, the effectiveness of the barrier coating at significantly slowing the diffusion rates of the blowing agents increased with increased coating weight, as indicated by the improved R-values and reduced 180 day k-values, as compared to the control (Comparative Ex. G).

Example 4

Extruded polystyrene foams including various blowing agent compositions were prepared and coated with the barrier coating composition in accordance with aspects and embodiments of the present disclosure to evaluate the effects of the barrier coating on the thermal conductivity properties of the foams. Each of the foamable compositions are provided below in Table 6.

TABLE 6

| Sample No. | $CO_2$ (wt. %) | Isobutane (wt. %) | IAA (wt. %) | Flame Retardant (wt. %) | Density (lb/ft$^3$) |
|---|---|---|---|---|---|
| Comp. Ex. H | 3.31 | 1.00 | 0.50 | 1.00 | 2.71 |
| Comp. Ex. I | 3.31 | 0.75 | 0.50 | 1.00 | 2.57 |
| Comp. Ex. J | 3.31 | 0.50 | 0.50 | 1.00 | 2.41 |
| Comp. Ex. K | 3.31 | 0.25 | 0.50 | 1.00 | 2.31 |
| Comp. Ex. L | 3.31 | 0.13 | 0.50 | 1.00 | 2.16 |
| Ex. K | 3.31 | 1.00 | 0.50 | 1.00 | 2.05 |
| Ex. L | 3.31 | 0.75 | 0.50 | 1.00 | 2.71 |
| Ex. M | 3.31 | 0.50 | 0.50 | 1.00 | 2.57 |
| Ex. N | 3.31 | 0.25 | 0.50 | 1.00 | 2.41 |
| Ex. O | 3.31 | 0.13 | 0.50 | 1.00 | 2.31 |
| Ex. P | 3.31 | 0.50 | 0.50 | 1.00 | 2.16 |
| Ex. Q | 3.31 | 0.50 | 0.50 | 1.00 | 2.05 |
| Ex. R | 3.31 | 0.50 | 0.50 | 1.00 | 1.94 |
| Ex. S | 3.31 | 0.50 | 0.50 | 1.00 | 1.83 |
| Ex. T | 3.31 | 0.50 | 0.50 | 1.00 | 1.72 |

To the foam products in Examples K-O, a barrier coating including DIOFAN® A050 was applied to all surfaces of the foam sample, including the edges, in various coat weights. Comparative Samples H-L were the control samples, and no barrier coating was applied. Example P was coated with a DIOFAN® A050-based coating on each major surface (e.g., top and bottom), but not the minor surfaces. Examples Q-S were coated on the top and bottom surfaces, along with one, two, and three minor surfaces, respectively. Example T was coated only the four minor surfaces.

For each Example, the thermal conductivity was measured at approximately 7 day, 20 day, 30 day, 60 day, 120 day, and 180 day time intervals. The thermal conductivity (k-values) (Btu·in/h·ft$^2$·° F.) are reported in Table 7. R-values at 180 days were calculated from the reciprocal of the 180 days thermal conductivities and are also reported in Table 7.

TABLE 7

| Sample No. | Coating | Coated Surfaces | Final Coat Weight (g) | 180 days k-value (Btu * in/ h * ft$^2$ * ° F.) | 180-days R/in |
|---|---|---|---|---|---|
| Comp. Ex. H | No Coating | — | — | 0.2174 | 4.60 |
| Comp. Ex. I | No Coating | — | — | 0.2173 | 4.60 |
| Comp. Ex. J | No Coating | — | — | 0.2189 | 4.57 |
| Comp. Ex. K | No Coating | — | — | 0.2220 | 4.50 |
| Comp. Ex. L | No Coating | — | — | 0.2222 | 4.50 |
| Ex. K | PVDC-based | Top/Bottom/4 edges | 5.61 (~25.88 g/m$^2$) | 0.2142 | 4.67 |
| Ex. L | PVDC-based | Top/Bottom/4 edges | 6.23 (~28.74 g/m$^2$) | 0.2124 | 4.71 |
| Ex. M | PVDC-based | Top/Bottom/4 edges | 5.16 (~23.80 g/m$^2$) | 0.2125 | 4.71 |
| Ex. N | PVDC-based | Top/Bottom/4 edges | 3.56 (~16.42 g/m$^2$) | 0.2211 | 4.52 |
| Ex. O | PVDC-based | Top/Bottom/4 edges | 6.21 (~28.65 g/m$^2$) | 0.2216 | 4.51 |
| Ex. P | PVDC-based | Top/Bottom | 4.01 (~18.50 g/m$^2$) | 0.2111 | 4.74 |
| Ex. Q | PVDC-based | Top/Bottom/1 edge | 4.58 (~21.13 g/m$^2$) | 0.2127 | 4.70 |
| Ex. R | PVDC-based | Top/Bottom/2 edges | 4.69 (~21.64 g/m$^2$) | 0.2139 | 4.68 |
| Ex. S | PVDC-based | Top/Bottom/3 edges | 4.02 (~18.54 g/m$^2$) | 0.2183 | 4.58 |
| Ex. T | PVDC-based | 4 edges only | 1.26 (~5.95 g/m$^2$) | 0.2189 | 4.57 |

Figure 20:
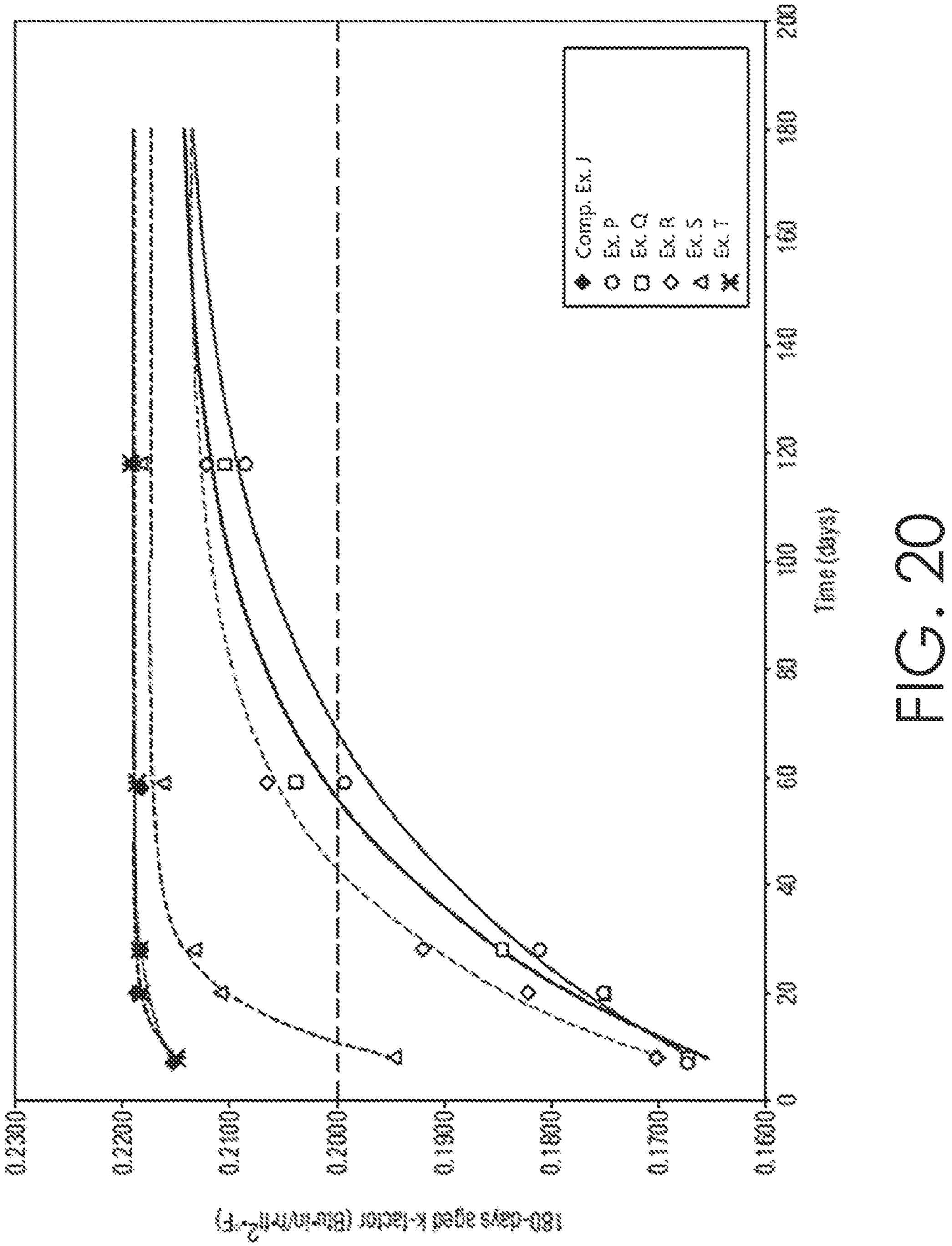
FIG. 20 is a graph showing the thermal conductivity k-value (y-axis) as a function of time (x-axis) for various samples including 0.50 wt. % isobutane and various barrier coating configurations according to Example 4.

FIG. 20 illustrates the measured thermal conductivity (k-factor) (y-axis) as a function of time in days (x-axis) for samples including blowing agents comprising both 1 wt. % isobutane and 0.25 wt. % isobutane, both with and without the barrier coating (Comparative Examples H and K and Examples K and N). As can be seen in Table 7 and FIG. 20, the application of the DIOFAN® A050-based coating is effective to reduce the thermal conductivity of the polymer insulation layer such that the polymer insulation layer has an R-value of 5 or greater over a longer period of time, as compared to an otherwise identical but uncoated polymer insulation layer. Particularly, for the samples tested in this example, an R-value of 5 is achieved at a thermal conductivity of 0.20 Btu·in/h·ft$^2$·° F. or below. As shown in Table 7, not a single Comparative Example achieved an R-value of 5 at any time point. However, each of K-S achieved an R-value of 5 at $k_7$ and Examples K-M and P-R achieved an R-value of 5 at $k_{30}$, and Sample P achieved an R-value of 5 at $k_{60}$, which is a significant improvement over the Comparative Samples and supports the conclusion that a polymer insulation layer formed with $CO_2$ (excluding any fluorinated alkenes) can achieve an R-5 insulation value, when manufactured with a barrier coating composition as disclosed herein.

Figure 21:
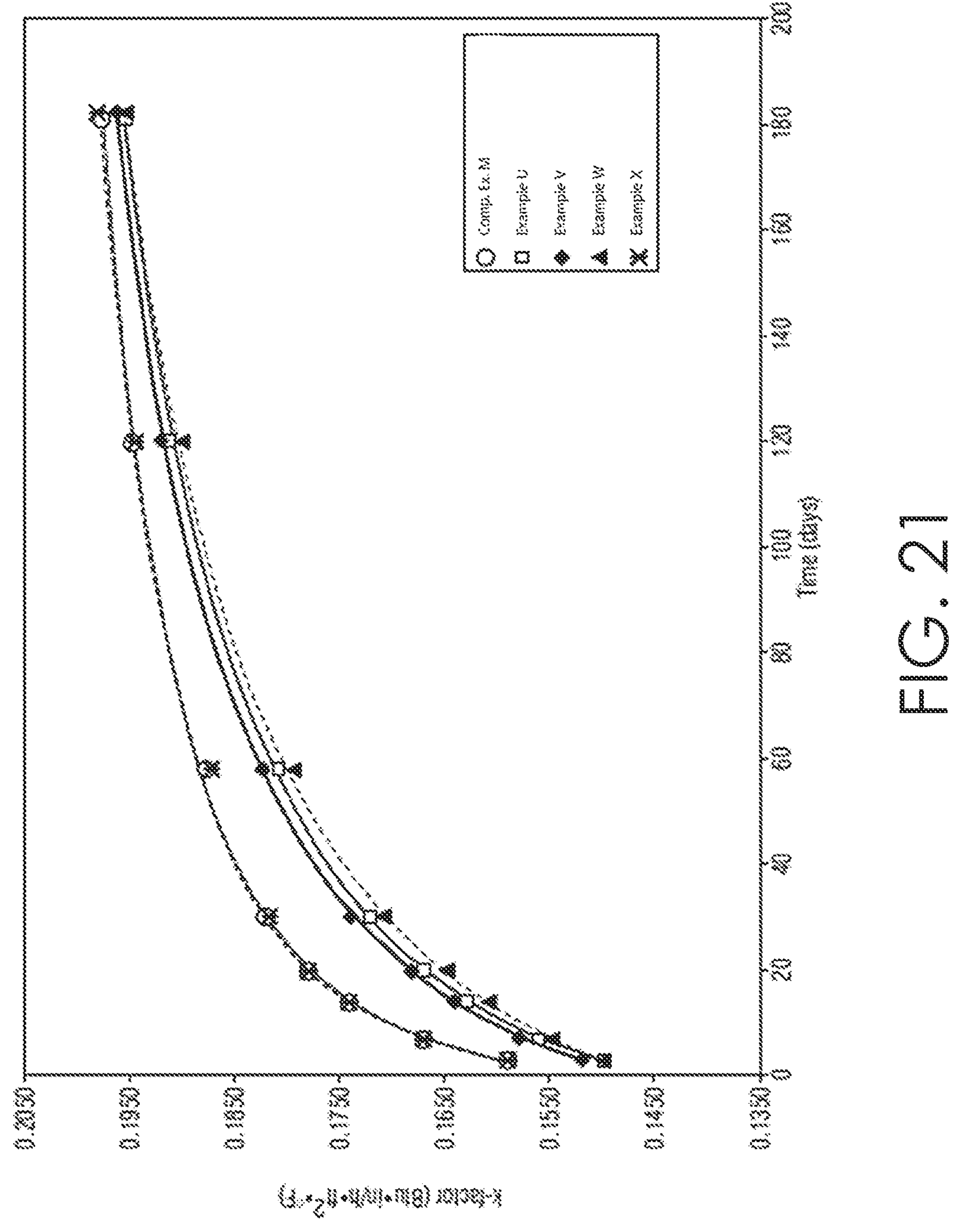
FIG. 21 is a graph showing the thermal conductivity k-value (y-axis) as a function of time (x-axis) for various samples according to Example 5.

FIG. 21 illustrates the measured thermal conductivity (k-factor) (y-axis) as a function of time in days (x-axis) for samples including 0.50 wt. % isobutane and with various surfaces having the barrier coating thereon (Comparative Example J and Examples P-T). As shown in FIG. 21, application of the barrier coating to the major surfaces of the polymer insulation layer has the biggest impact, while coating the only the edges has almost no impact (See, Example T).

Example 5

A barrier coating composition comprising an aqueous dispersion of styrene butadiene rubber was brushed onto one or more surfaces of 1-inch samples of extruded polystyrene foam and dried to form a barrier coated polystyrene foam. The polystyrene foam was formed using a blowing agent composition comprising a blend of HFO-1336mzz-Z and HFC-152a. Locations of the application of the barrier coating composition are provided below in Table 8.

TABLE 8

| Sample No. | Coated Surfaces | 180 days k-value (Btu * in/ h * ft$^2$ * ° F.) | 180 days R/in |
|---|---|---|---|
| Comp. Ex. M | No coating | 0.1976 | 5.06 |
| Ex. U | Top/bottom/4 edges | 0.1954 | 5.12 |
| Ex. V | Top and bottom only | 0.1963 | 5.09 |
| Ex. W | Top/bottom/3 edges | 0.1956 | 5.11 |
| Ex. X | 4 edges only | 0.1981 | 5.05 |

Figure 22:
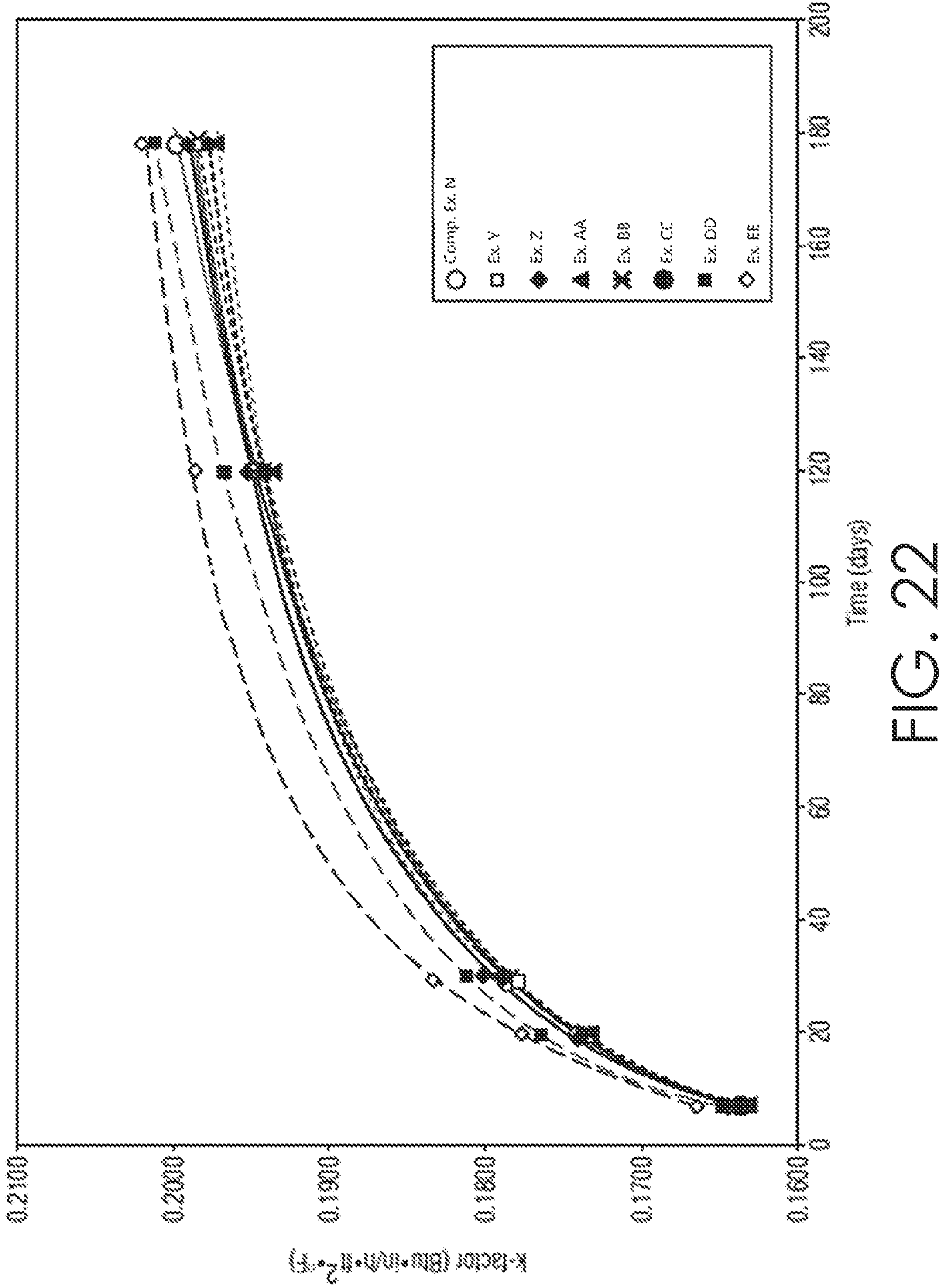
FIG. 22 is a graph showing the thermal conductivity k-value (y-axis) as a function of time (x-axis) for various concentrations of the barrier coating composition injected into the extrusion apparatus according to Example 6.

As illustrated in FIG. 22, each of samples that had at least the top and bottom coated (Samples U-W) with the barrier coating composition exhibited improved thermal properties (lower k-value and increased R-value) as compared to the control sample (Comp. Ex. M) and the sample with only the edges coated (Sample X).

Example 6

Extruded polystyrene foam samples were prepared using a co-rotating twin screw single extrusion foam manufacturing line. Polystyrene was melted in the extruder and mixed with an injected blowing agent composition to form a homogeneous foamable composition. The foamable composition (excluding the blowing agent) included polystyrene, flame retardant masterbatch, and graphite masterbatch, and is reported as the "solids" in Table 9 below. An aqueous dispersion of styrene butadiene rubber (50 wt. % solids in water) was injected directly into the extruder at various concentrations. The polystyrene foam was formed using a blowing agent composition comprising a blend of HFO-1336mzz-Z and HFC-152a in a constant amount across all samples. The foamable compositions were then extruded to produce 1-inch XPS foam samples. Each of the foamable compositions are provided below in Table 9.

TABLE 9

| Sample No. | Solids (wt. %) | SBR (wt. %) |
|---|---|---|
| Comp. Ex. N | 100 | 0.00 |
| Ex. Y | 99.95 | 0.05 |
| Ex. Z | 99.90 | 0.10 |
| Ex. AA | 99.85 | 0.15 |
| Ex. BB | 99.80 | 0.20 |
| Ex. CC | 99.75 | 0.25 |
| Ex. DD | 99.62 | 0.38 |
| Ex. EE | 99.50 | 0.50 |

Table 10, below, lists the properties of the resulting XPS foam samples.

TABLE 10

| Sample No. | Density (lb/ft$^3$) | 180 days k-value (Btu · in/h · ft$^2$ · ° F.) | 180 days R/in | Avg. Cell Sizes (mm) | Open Cells (%) | Compressive Strength (psi) | Compressive Modulus (psi) |
|---|---|---|---|---|---|---|---|
| Comp. Ex. N | 2.27 | 0.1997 | 5.01 | 0.18 | 1.5 | 42.6 | 1180 |
| Ex. Y | 2.24 | 0.1986 | 5.04 | 0.17 | 1.96 | 43.9 | 1187 |
| Ex. Z | 2.23 | 0.1991 | 5.02 | 0.17 | 0.44 | 44.7 | 1256 |
| Ex. AA | 2.17 | 0.1973 | 5.07 | 0.19 | 1.73 | 42.9 | 1269 |
| Ex. BB | 2.19 | 0.1983 | 5.04 | 0.17 | 1.19 | 44.3 | 1234 |
| Ex. CC | 2.19 | 0.1976 | 5.06 | 0.17 | 1.70 | 45.6 | 1352 |
| Ex. DD | 2.16 | 0.2011 | 4.97 | 0.17 | 0.36 | 47.3 | 1491 |
| Ex. EE | 2.30 | 0.2018 | 4.96 | 0.17 | 1.17 | 55.0 | 2015 |

Figure 23:
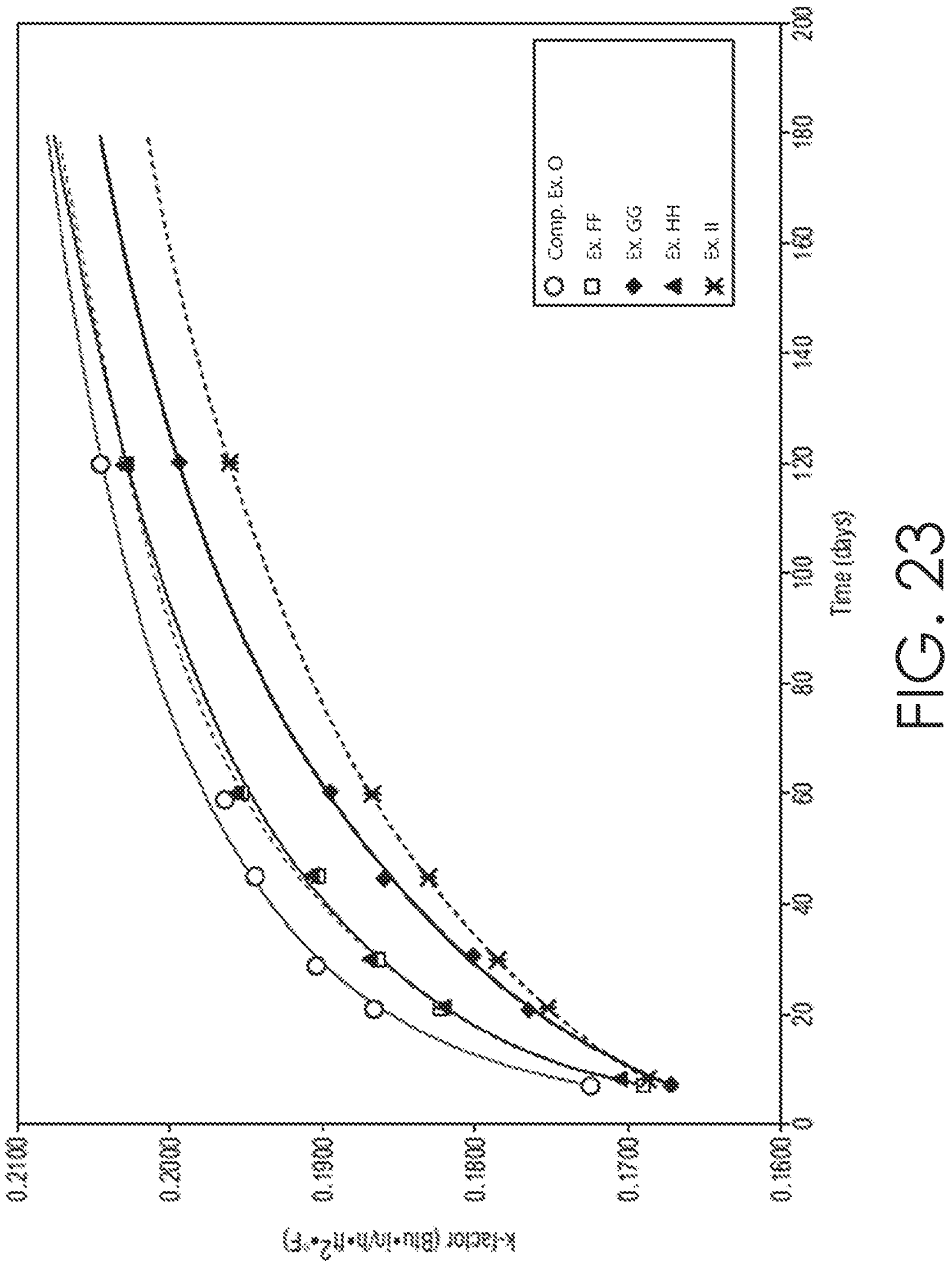
FIG. 23 is a graph showing the thermal conductivity k-value (y-axis) as a function of time (x-axis) for various barrier coating configurations with Coating A according to Example 7.

As shown in Table 10 and FIG. 23, XPS foam produced including SBR dispersion in amounts from 0.05 wt. % to 0.25 wt. % demonstrated improved insulation properties (e.g., a lower k-value) as compared to the control (Comp. Example N). Additionally, the data presented in Table 9 illustrates that the barrier coating composition can be injected during the foaming process without negatively impacting the foam properties. For example, the compressive strength and compressive modulus for each of the examples was increased as compared to the control sample (Comp. Example N).

Example 7

Varying amounts of one of two barrier coatings (an aqueous dispersion of ethylene vinyl alcohol (EVOH) or an aqueous dispersion of polyvinyl alcohol (PVOH)) were applied with a brush to various surfaces of 1-inch XPS foam samples. Locations of the application of the barrier coating composition are provided below in Table 11.

TABLE 11

| Sample No. | Coated Surfaces | Coating Composition | Final Coat Weight(g) | 180-days k-value (Btu * in/ h * ft$^2$ * ° F.) | 180-days R/in |
|---|---|---|---|---|---|
| Comp. Ex. O | No coating | N/A | 0.00 | 0.2134 | 4.69 |
| Ex. FF | Top/bottom/4 edges | EVOH | 7.40 (~34.14 g/m$^2$) | 0.2077 | 4.81 |
| Ex. GG | Top/4 edges | EVOH | 18.01 (~83.08 g/m$^2$) | 0.1955 | 5.12 |
| Ex. HH | Top only | EVOH | 4.51 (~20.81 g/m$^2$) | 0.2087 | 4.79 |
| Ex. II | Top/bottom/4 edges | EVOH | 17.30 (~79.81 g/m$^2$) | 0.1910 | 5.24 |
| Ex. JJ | Top/bottom/4 edges | PVOH | 8.39 (~38.70 g/m$^2$) | 0.1860 | 5.38 |
| Ex. KK | Top/4 edges | PVOH | 11.23 (~51.81 g/m$^2$) | 0.1787 | 5.60 |
| Ex. LL | Top only | PVOH | 7.98 (~36.81 g/m$^2$) | 0.1736 | 5.76 |
| Ex. MM | Top/bottom/4 edges | PVOH | 8.00 (~36.91 g/m$^2$) | 0.1959 | 5.11 |

Figure 24:
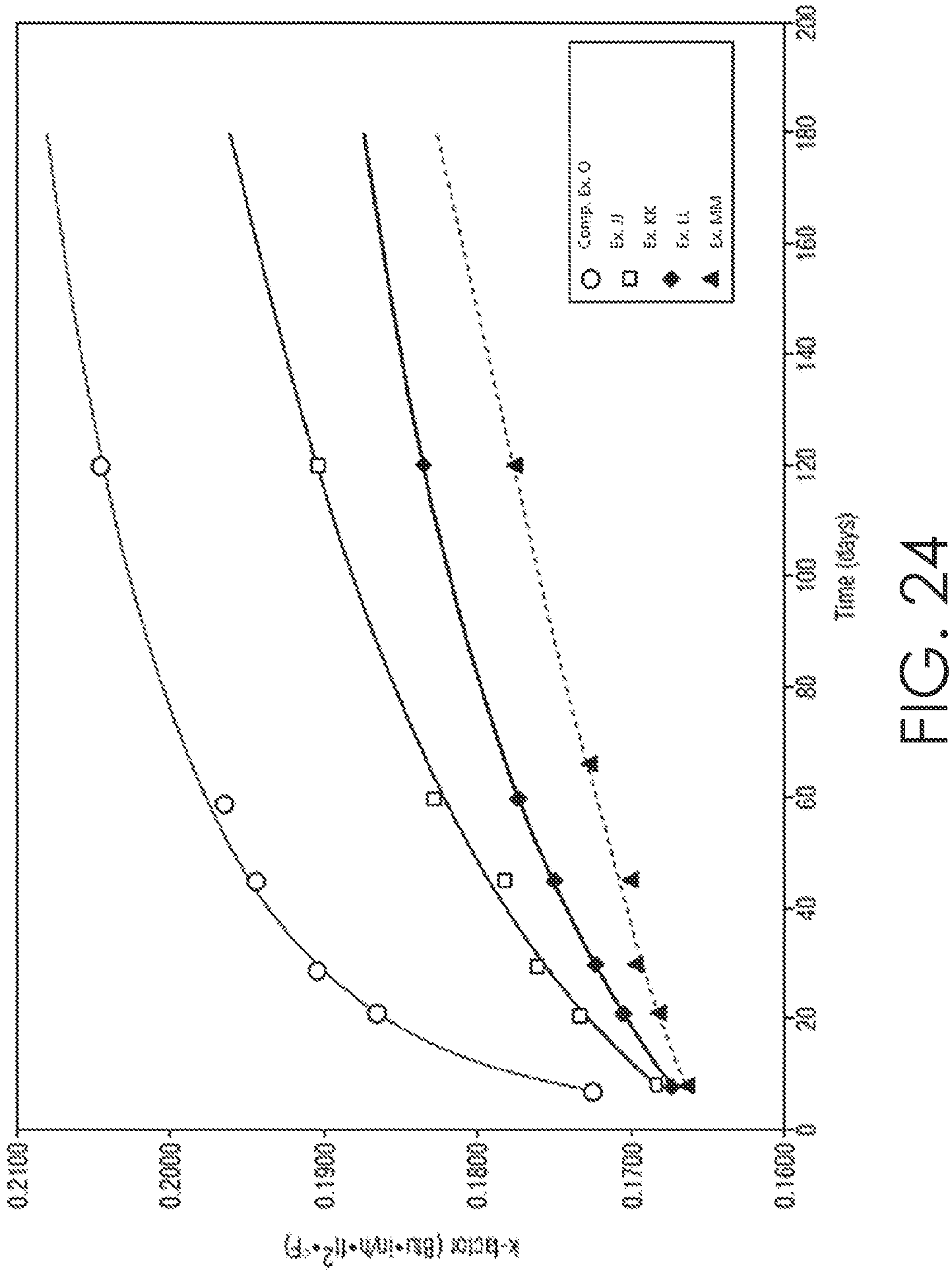
FIG. 24 is a graph showing the thermal conductivity k-value (y-axis) as a function of time (x-axis) for various barrier coating configurations with Coating B according to Example 7.
Figure 25:
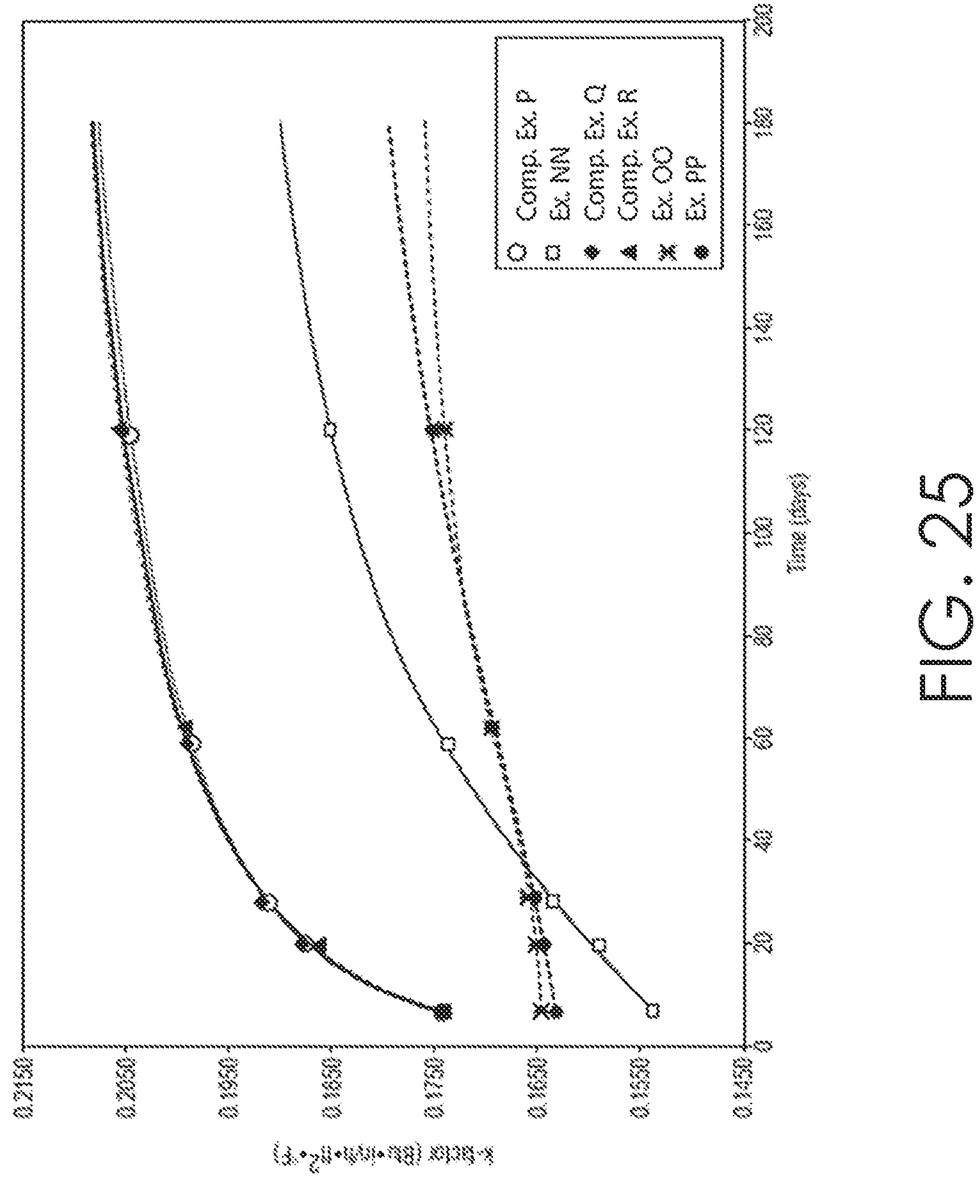
FIG. 25 is a graph showing the thermal conductivity k-value (y-axis) as a function of time (x-axis) for various samples according to Example 8.

As shown in Table 11 and FIGS. 24-25, both the EVOH and PVOH coatings were effective at significantly slowing the diffusion rates of the blowing agents, as indicated by the improved R-values and reduced 180 day k-values, as compared to the control (Comp. Example O). For Example LL, PVOH improved the R-value of the foam sample by about 23%, as compared to the control (Comp. Example O). Additionally, the results show that it is not necessarily true that more coating leads to better thermal conductivity. Rather, Example LL, having about 36.81 g/m2 of coating applied to the sample demonstrates a better 180-day thermal conductivity value than Examples KK, JJ, and MM, each having a heavier application of PVOH-based barrier coating. Thus, a balance must be struck between coat weight and impact to the foam product's thermal conductivity to achieve optimal performance.

Example 8

Various barrier coatings and barrier coating combinations were applied to 1-inch XPS foam samples, as set forth in Table 12 below. PUD 1 and PUD 2 are two different commercially available polyurethane dispersions. For Samples OO and PP, the PVOH coating system was applied to the foam surface first and allowed to dry and then the PUD 1 or PUD 2 were applied to the top of the PVOH coating.

TABLE 12

| Sample No. | Coating | 180 days k-value (Btu * in/ h * ft$^2$ * ° F.) | 180 days R/in |
|---|---|---|---|
| Comp. Ex. P | None | 0.2078 | 4.81 |
| Ex. NN | PVOH | 0.1901 | 5.26 |
| Comp. Ex. Q | PUD1 | 0.2084 | 4.80 |
| Comp. Ex. R | PUD2 | 0.2086 | 4.79 |
| Ex. OO | PVOH + PUD1 | 0.1759 | 5.69 |
| Ex. PP | PVOH + PUD2 | 0.1795 | 5.57 |

Figure 26:
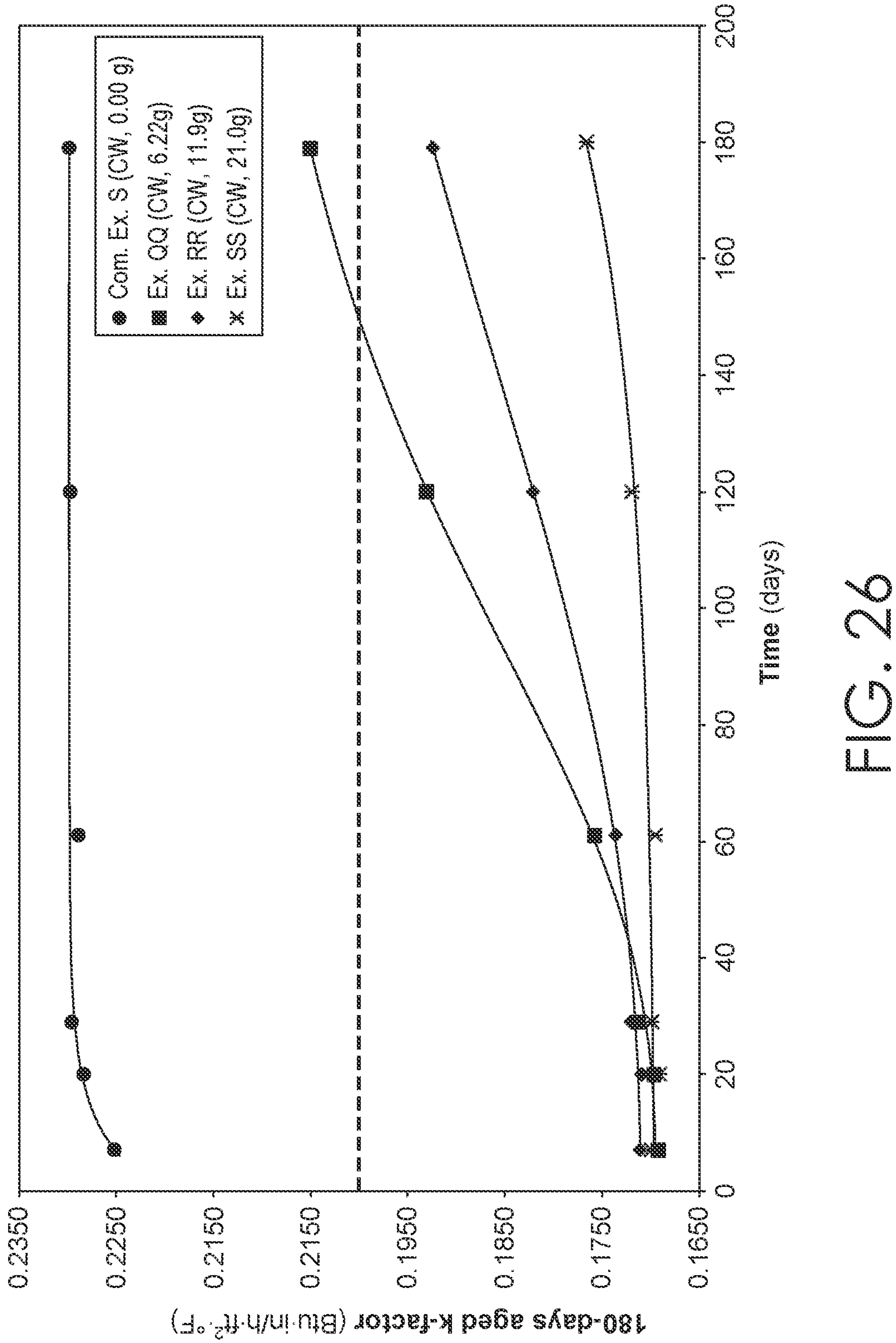
FIG. 26 is a graph showing the thermal conductivity k-value (y-axis) as a function of time (x-axis) for various samples according to Example 9.

As shown in FIG. 26, the PUD 1 and PUD 2 applied coatings by themselves (Comp. Examples Q and R, respectively) did not provide any barrier properties to the foam. However, when applied to the surface of the applied PVOH coating (Samples OO and PP, respectively), they enhanced the barrier properties of the PVOH coating (Sample NN). Without being bound by theory, it is believed that the application of a PUD or hydrophobic coating to a PVOH or EVOH coating, which tend to be more hydrophilic and susceptible to moisture, can protect the hydrophilic coating and enhance the resistant properties of the hydrophilic coating.

Example 9

Extruded polystyrene foams including various blowing agent compositions were prepared and coated with the barrier coating composition in accordance with aspects and embodiments of the present disclosure to evaluate the effects of the barrier coating on the thermal conductivity properties of the foams. Each of the foamable compositions are provided below in Table 13.

TABLE 13

| Sample No. | $CO_2$ (wt. %) | Methyl Formate (wt. %) | IAA (wt. %) | Flame Retardant (wt. %) | Density (lb/ft$^3$) |
|---|---|---|---|---|---|
| Comp. Ex. S | 3.31 | 1.50 | 0.60 | 1.00 | 2.27 |
| Ex. QQ | 3.31 | 1.50 | 0.60 | 1.00 | 2.27 |
| Ex. RR | 3.31 | 1.50 | 0.60 | 1.00 | 2.27 |
| Ex. SS | 3.31 | 1.50 | 0.60 | 1.00 | 2.27 |

A barrier coating composition comprising DIOFAN® A050 (a PVDC dispersion containing about 58 wt. % solids commercially available from Solvay) was applied with a brush to various surfaces of 1-inch XPS foam samples at various coat weights, as set forth in Table 14 below.

TABLE 14

| Sample No. | Coating | Final Coat Weight (g) | 180 days k-value (Btu * in/ h * ft$^2$ * ° F.) | 180 days R/in |
|---|---|---|---|---|
| Comp. Ex. S | No Coating | — | 0.2298 | 4.35 |
| Ex. QQ | PVDC-based | 6.22 (~28.69 g/m$^2$) | 0.2050 | 4.88 |
| Ex. RR | PVDC-based | 11.93 (~55.03 g/m$^2$) | 0.1970 | 5.20 |
| Ex. SS | PVDC-based | 21.03 (~95.21 g/m$^2$) | 0.1766 | 5.66 |

As shown in Table 14 and FIG. 27, the effectiveness of the barrier coating at significantly slowing the diffusion rates of the blowing agents increased with increased coating weight, as indicated by the improved R-values and reduced 180 day k-values, as compared to the control.

Although the present invention has been described with reference to particular means, materials and embodiments, from the foregoing description, one skilled in the art can easily ascertain the essential characteristics of the present invention and various changes and modifications can be made to adapt the various uses and characteristics without departing from the spirit and scope of the present invention as described above and set forth in the attached claims.

From the foregoing, it will be seen that this invention is one well-adapted to attain all the ends and objects hereinabove set forth together with other advantages which are obvious and which are inherent to the structure.

It will be understood that certain features and subcombinations are of utility and can be employed without reference to other features and subcombinations. This is contemplated by and is within the scope of the claims.

While specific elements and steps are discussed in connection to one another, it is understood that any element and/or steps provided herein is contemplated as being combinable with any other elements and/or steps regardless of explicit provision of the same while still being within the scope provided herein. Since many possible embodiments can be made of the disclosure without departing from the scope thereof, it is to be understood that all matter herein set forth or shown in the accompanying drawings is to be interpreted as illustrative and not in a limiting sense.

The invention claimed is:

1. A sheathing system to externally envelope at least a portion of a building structure, the system comprising:

a first structural layer having a first surface and a second surface opposite the first surface;

a second structural layer having a fifth surface and a sixth surface opposite the fifth surface;

an insulation layer having a third surface and a fourth surface opposite the third surface, the third surface of the insulation layer being at least partially secured to the second surface of the first structural layer and the fifth surface of the second structural layer being at least partially secured to the fourth surface of the insulation layer, the insulation layer being formed from a foamable composition comprising:

a) a matrix composition, and b) a blowing agent composition comprising less than 3.5 wt. % of a fluorinated alkene, based on a total weight of the foamable composition; and a barrier coating applied to at least one surface of the insulation layer in a total amount between 3 $g/m^2$ to 225 $g/m^2$, the barrier coating being formed from a barrier coating composition comprising:

40 wt. % to 99.9 wt. % of a barrier polymer, based on a total solids content of the barrier coating composition, the barrier polymer having a minimum degree of crystallinity of 10%, and 0.1 wt. % to 20 wt. % of at least one additive, wherein the barrier coating composition has a surface tension no greater than 40 mN/m, and wherein the sheathing system has a 180-day R/in value of at least 4.8.

2. The sheathing system of claim 1, wherein the sheathing system has a distance from the first surface of the first structural layer to the sixth surface of the second structural layer of no greater than 1.5 inches.

3. The sheathing system of claim 1, wherein the sheathing system has a racking performance of greater than 640 plf.

4. The sheathing system of claim 1, wherein the first structural layer comprises a polymer material, said polymer material comprising any one or more of polycarbonate, polyester, polypropylene, polymethyl methacrylate, poly vinyl chloride, high density polyethylene, and copolymers thereof.

5. The sheathing system of claim 1, wherein the second structural layer comprises a polymer material, said polymer material comprising any one or more of polycarbonate, polyester, polypropylene, polymethyl methacrylate, poly vinyl chloride, high density polyethylene, and copolymers thereof.

6. The sheathing system of claim 1, wherein the sheathing system has a weight between 10 pounds and 45 pounds.

7. The sheathing system of claim 1, wherein the blowing agent composition comprises at least 2 wt. % of $CO_2$ and less than 3 wt. % of the fluorinated alkene, based on the total weight of the foamable composition.

8. The sheathing system of claim 1, wherein the blowing agent composition comprises at least 2.5 wt. % of $CO_2$ and less than 2 wt. % of a fluorinated alkene, based on the total weight of the foamable composition.

9. The sheathing system of claim 1, wherein the blowing agent further comprises methyl formate.

10. The sheathing system of claim 1, wherein the foamable composition includes a total blowing agent concentration between 2.5 wt. % and 6.5 wt. %.

11. The sheathing system of claim 1, wherein the barrier coating composition has a viscosity no greater than 250 cP at 30% solids.

12. The sheathing system of claim 1, wherein the barrier polymer comprises any one or more of poly (vinylidene chloride), polyvinyl alcohol, poly (ethylene-co-vinyl alcohol), poly (vinylidene fluoride), polyurethane, styrene butadiene, polyvinyl chloride, poly (acrylates), polyamides, polyesters, polystyrene, polyglycolic acid, poly (ethylene 2,5-furandicarboxylate), poly (butylene succinate), bio-based ethylene, and copolymers thereof.

13. The sheathing system of claim 1, wherein the barrier polymer has a minimum degree of crystallinity of 30%.

14. The sheathing system of claim 1, wherein the additive comprises one or more of a processing aid, wetting agent, rheology modifier, defoaming agent, silicone, matting agent, polydimethylsiloxane, pH adjuster; UV stabilizer; and hydrophobized silica.

15. The sheathing system of claim 1, wherein the additive includes a rheology modifier present in an amount between 0.1 wt. % and 15 wt. %, based on the total solids content of the barrier coating.

16. The sheathing system of claim 1, wherein the additive includes at least one wetting agent present in an amount between 0.005 wt. % and 8 wt. %, based on the total solids content of the barrier coating.

17. The sheathing system of claim 1, wherein the additive includes at least one UV stabilizer present in an amount between 0.05 wt. % and 12 wt. %, based on the total solids content of the barrier coating.

18. The sheathing system of claim 1, wherein the barrier coating further comprises, based on a total solids content of the barrier coating:

40 wt. % to 99 wt. % solids of a barrier polymer;

0.1 wt. % to 15 wt. % solids of a rheology modifier;

0.005 wt. % to 8 wt. % solids of a wetting agent;

0.05 wt. % to 8 wt. % solids of a pH adjuster; and 0.05 wt. % to 12 wt. % solids of at least one UV stabilizer.

19. The sheathing system of claim 1, wherein the barrier coating has a pH between 4 and 7.

20. The sheathing system of claim 1, wherein the barrier coating is present on each surface of the insulation layer.

21. The sheathing system of claim 1, wherein the matrix material is a matrix polymer, selected from the group consisting of alkenyl aromatic polymers, styrenic polymers, styrenic copolymers, styrenic block copolymers, polyolefins, halogenated vinyl polymers, acrylonitrile copolymers, polycarbonates, polyisocyanurates, polyesters, polyacrylates, polyurethanes, phenolics, polysulfone, polyphenylene sulfide, acetal resins, polyamides, polyaramides, polyimides, polyetherimides, rubber modified polymers, thermoplastic polymer blends, and combinations thereof.

22. A sheathing system to externally envelope at least a portion of a building structure, the system comprising:

a first structural layer having a first surface and a second surface opposite the first surface;

a second structural layer having a fifth surface and a sixth surface opposite the fifth surface;

an insulation layer having a third surface and a fourth surface opposite the third surface, the third surface of the insulation layer being at least partially secured to the second surface of the first structural layer and the fifth surface of the second structural layer being at least partially secured to the fourth surface of the insulation layer, the insulation layer being formed from a foamable composition comprising:

a) a polymer matrix composition; and b) a blowing agent composition comprising 3 wt. % or less of a fluorinated alkene and at least 1.5 wt. % CO2, based on a total weight of the foamable composition; and a barrier coating present on each surface of the insulation layer in a total amount between 3 $g/m^2$ and 225 $g/m^2$, the barrier coating being formed from a barrier coating composition comprising a semi-crystalline polymer and at least one wetting agent, the barrier coating composition having a surface tension no greater than 10 mN/m above a surface energy of the polymer foam and a viscosity between 50 cP and 175 cP at 30% solids or less, wherein the sheathing system has an 180-day R/in value of at least 4.8 and a compressive strength between 10 and 110 psi, measured in accordance with ASTM C578.

23. The sheathing system of claim 22, wherein the sheathing system has a distance from the first surface of the first structural layer to the sixth surface of the second structural layer of no greater than 1.5 inches.

24. The sheathing system of claim 22, wherein the sheathing system has a racking performance of greater than 640 plf.

25. The sheathing system of claim 22, wherein the first structural layer comprises a polymer material, said polymer material comprising any one or more of polycarbonate, polyester, polypropylene, polymethyl methacrylate, poly vinyl chloride, high density polyethylene, and copolymers thereof.

26. The sheathing system of claim 22, wherein the second structural layer comprises a polymer material, said polymer material comprising any one or more of polycarbonate, polyester, polypropylene, polymethyl methacrylate, poly vinyl chloride, high density polyethylene, and copolymers thereof.

27. The sheathing system of claim 22, wherein the sheathing system has a weight between 10 pounds and 45 pounds.

28. The sheathing system of claim 22, wherein the blowing agent composition comprises less than 2 wt. % of a fluorinated alkene at least 2.5 wt. % of $CO_2$, based on the total weight of the foamable composition.

29. The sheathing system of claim 22, wherein the blowing agent further comprises methyl formate.

30. The sheathing system of claim 22, wherein the foamable polymer composition includes a total blowing agent concentration between 2.5 wt. % and 6.5 wt. %.

31. The sheathing system of claim 22, wherein the barrier coating composition has a viscosity no greater than 150 cP at 30% solids.

32. The sheathing system of claim 22, wherein the barrier polymer comprises any one or more of poly (vinylidene chloride), polyvinyl alcohol, poly (ethylene-co-vinyl alcohol), poly (vinylidene fluoride), polyurethane, styrene butadiene, polyvinyl chloride, poly (acrylates), polyamides, polyesters, polystyrene, polyglycolic acid, poly (ethylene 2,5-furandicarboxylate), poly (butylene succinate), bio-based ethylene, and copolymers thereof.

33. The sheathing system of claim 22, wherein the barrier polymer has a minimum degree of crystallinity of 30%.

34. The sheathing system of claim 22, wherein the wetting agent is present in an amount between 0.005 wt. % and 8 wt. % solids, based on the total solids content of the barrier coating.

35. The sheathing system of claim 22, wherein the barrier coating composition further includes at least one additive, the additive comprising a processing aid, rheology modifier, defoaming agent, silicone, polydimethylsiloxane, pH adjuster, UV stabilizer, hydrophobized silica, or mixtures thereof.

36. The sheathing system of claim 35, wherein the additive includes a rheology modifier present in an amount between 0.1 wt. % and 12 wt. % solids, based on the total solids content of the barrier coating.

37. The sheathing system of claim 35, wherein the additive includes a UV stabilizer present in an amount between 0.05 wt. % and 12 wt. % solids, based on the total solids content of the barrier coating.

38. The sheathing system of claim 22, wherein the barrier coating further comprises, based on a total solids content of the barrier coating:

40 wt. % to 99 wt. % solids of a barrier polymer;

0.1 wt. % to 15 wt. % solids of a rheology modifier;

0.005 wt. % to 8 wt. % solids of a wetting agent;

0.05 wt. % to 8 wt. % solids of a pH adjuster; and 0.05 wt. % to 12 wt. % solids of at least one UV stabilizer.

39. The sheathing system of claim 22, wherein the barrier coating has a pH between 4 and 7.

40. The sheathing system of claim 22, wherein the sheathing system has an R-value after 180 days of at least 5.0 per inch.

41. The sheathing system of claim 22, wherein the barrier coating is present on each surface of the foam product.

* * * * *